(12) United States Patent
Yang

(10) Patent No.: US 10,963,733 B2
(45) Date of Patent: Mar. 30, 2021

(54) ASSOCIATING SPATIAL POINT SETS WITH CANDIDATE CORRESPONDENCES

(71) Applicant: Tianzhi Yang, San Jose, CA (US)

(72) Inventor: Tianzhi Yang, San Jose, CA (US)

(*) Notice: Subject to any disclaimer, the term of this patent is extended or adjusted under 35 U.S.C. 154(b) by 58 days.

(21) Appl. No.: 16/442,911

(22) Filed: Jun. 17, 2019

(65) Prior Publication Data

US 2020/0394444 A1 Dec. 17, 2020

(51) Int. Cl.
| | |
|---|---|
| *G06K 9/46* | (2006.01) |
| *G06K 9/50* | (2006.01) |
| *G06K 9/62* | (2006.01) |
| *G06F 17/16* | (2006.01) |
| *G06K 9/00* | (2006.01) |

(52) U.S. Cl.
CPC ............ *G06K 9/6211* (2013.01); *G06F 17/16* (2013.01); *G06K 9/00805* (2013.01); *G06K 9/6215* (2013.01); *G06K 9/6224* (2013.01)

(58) Field of Classification Search
CPC ............ G06K 9/6211; G06K 9/00805; G06K 9/6215; G06K 9/6224; G06F 17/16
USPC .......................... 382/201, 103, 154, 131, 294
See application file for complete search history.

(56) References Cited

U.S. PATENT DOCUMENTS

| | | | | |
|---|---|---|---|---|
| 6,272,245 B1 * | 8/2001 | Lin | ..................... | G06K 9/00463 |
| | | | | 382/135 |
| 6,640,201 B1 * | 10/2003 | Hahlweg | .............. | G06K 9/6206 |
| | | | | 382/294 |
| 6,853,373 B2 * | 2/2005 | Williams | ................ | G06T 17/20 |
| | | | | 345/419 |
| 7,003,156 B1 * | 2/2006 | Yamamoto | ............... | G06K 9/38 |
| | | | | 382/181 |
| 7,010,158 B2 * | 3/2006 | Cahill | ................ | G06K 9/00201 |
| | | | | 345/419 |

(Continued)

OTHER PUBLICATIONS

Yang et al. An Affine Energy Model for Image Registration Using Markov Chain Monte Carlo. Technical Report.

(Continued)

*Primary Examiner* — Marceau Milord

(57) ABSTRACT

A computer implemented method for generating a one-to-one mapping between a first spatial point set and a second spatial point set in nD, n=2 or 3, comprising receiving a first and a second spatial point sets in nD and a plurality of candidate correspondences; computing unit conflict lists for the candidate correspondences; generating one or more MatchPairs between the first and the second point sets; computing local distance measures for the MatchPairs; converting the local distance measures to weights; computing conflict lists for pairs of the MatchPairs by taking the bitwise ORs of their candidate correspondences' unit conflict lists; computing correspondence lists for the MatchPairs; computing compatibilities between pairs of the MatchPairs by examining for each pair the bitwise AND of one's correspondence list and the other's conflict list; constructing a vertex-weighted undirected graph with its nodes corresponding to the MatchPairs, its edges representing the compatibilities, and its graph vertices assigned the weights; computing a maximum-weight clique of the vertex-weighted undirected graph; and merging the maximum-weight clique to generate the one-to-one mapping.

14 Claims, 28 Drawing Sheets

(56) References Cited

U.S. PATENT DOCUMENTS

| | | | | |
|---|---|---|---|---|
| 7,373,275 | B2* | 5/2008 | Kraft | G06K 9/6206 382/209 |
| 8,144,947 | B2* | 3/2012 | Kletter | G06K 9/6282 382/124 |
| 8,233,722 | B2 | 7/2012 | Kletter et al. | |
| 8,401,242 | B2* | 3/2013 | Newcombe | A63F 13/42 382/107 |
| 8,515,159 | B2* | 8/2013 | Snavely | G06K 9/32 382/154 |
| 8,571,351 | B2* | 10/2013 | Yang | G06K 9/6211 382/294 |
| 8,792,963 | B2* | 7/2014 | Zhao | A61B 5/061 600/424 |
| 8,811,772 | B2* | 8/2014 | Yang | G06K 9/6211 382/294 |
| 8,867,827 | B2* | 10/2014 | Yeatman, Jr. | H04N 13/275 382/154 |
| 9,020,274 | B2 | 4/2015 | Xiong et al. | |
| 9,280,831 | B1* | 3/2016 | Harary | G06K 9/4638 |
| 2010/0310177 | A1* | 12/2010 | Xiong | G06K 9/6211 382/201 |
| 2012/0275722 | A1* | 11/2012 | Yang | G06K 9/6211 382/294 |
| 2012/0314974 | A1* | 12/2012 | Yang | G06T 7/33 382/294 |

OTHER PUBLICATIONS

Timothy R. Linden. A Triangulation-Based Approach to Nonrigid Image Registration. Masters Thesis (Wright State University). 2011.

Seetharaman et al. A piecewise affine model for image registration in nonrigid motion analysis. Proc 2000 IEEE Int Conf Image Processing.

Ourselin et al. Reconstructing a 3D structure from serial histological sections, Image and Vision Computing 19(1-2):25-31.

Pavel Maur. Delaunay Triangulation in 3D, Technical Report No. DCSE/TR-2002-02.

Joe Barry. Three-dimensional Triangulations from Local Transformations. SIAM J. Sci. and Stat. Comput., 10(4), 718-741.

Memoli et al. Comparing Point Clouds. Second Eurographics Symposium on Geometry Proc, Nice, France, Jul. 8-10, 2004.

Convex hull algorithms. In Wikipedia. Retrieved Apr. 20, 2019, from https://en.wikipedia.org/wiki/Convex_hull_algorithms.

Patric R.J. Ostergard. A fast algorithm for the maximum clique problem. Discrete Appl. Math. 120, 1-3 (Aug. 2002), 197-207.

Patric R.J. Ostergard. A new algorithm for the maximum-weight clique problem. Nordic J. of Computing 8, 4 (Dec. 2001), 424-436.

Ostergard et al. wclique.c. Retrieved Apr. 21, 2019, from http://ftp.gnu.org/gnu/glpk/glpk-4.65.tar.gz.

S. Busygin. A new trust region technique for the maximum weight clique problem. Disc. Appl. Math. 154, 15 (Oct. 2006), 2080-2096.

Guibas et al. Primitives for the manipulation of general subdivisions and the computation of Voronoi. ACM Trans. Graph. 4, 2 (Apr. 1985), 74-123.

Kim et al. "Multiple Hypothesis Tracking Revisited." 2015 IEEE International Conference on Computer Vision (ICCV) (2015): 4696-4704.

Michael M. Kazhdan. Convex Hulls (3D), course material for "Introduction to Computational Geometry" Spring 2016.

David G. Lowe. Distinctive Image Features from Scale-Invariant Keypoints. Int. J. Comput. Vision 60, 2 (Nov. 2004), 91-110.

Bruno Levy. Answer to stackoverflow question "Intersection between line and triangle in 3D". Retrieved from Stackoverflow on May 9, 2019.

Multiple Object Tracking. Matlab Online Documentation. Retrieved from mathworks.com on May 8, 2019.

W. Pullan, Optimisation of unweighted/weighted maximum independent sets and minimum vertex covers, Disc. Optim. 6, 2, 214-219, May 2019.

W. Pullan, Phased local search for the maximum clique problem, J Comb Optim (Nov. 2006) vol. 12, Issue 3, pp. 303-323.

Mitchnull. Generating combinations in c++. Retrieved May 3, 2019 from stackprinter.com.

Nlucaroni. Algorithm to return all combinations of k elements from n. Retrieved May 9, 2019, from Stackprinter.com.

D. Huber. Automatic 3D Modeling Using Range Images Obtained from Unknown Viewpoints. Proc. 3rd Int Conf on 3-D Digital Imaging and Modeling, 2001, 153-160.

Andrew E. Johnson. "Spin-Images: A Representation for 3-D Surface Matching." (1997). PhD thesis. Carnegie Mellon University.

Direct linear transformation. In Wikipedia. Retrieved Apr. 23, 2019, from https://en.wikipedia.org/wiki/Direct_linear_transformation.

Rob et al. How can I create cartesian product of vector of vectors?. Retrieved May 31, 2019, from Stackprinter.com.

Spatial descriptive statistics. In Wikipedia. Retrieved Jun. 8, 2019, from https://en.wikipedia.org/wiki/Spatial_descriptive_statistics.

* cited by examiner

ASSOCIATING SPATIAL POINT SETS WITH CANDIDATE CORRESPONDENCES

CROSS-REFERENCE TO RELATED APPLICATIONS

This application is related to U.S. application Ser. No. 16/428,970 filed on Jun. 1, 2019.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND—PRIOR ART

The following is a tabulation of some prior art that presently appears relevant:

U.S. Patents

| Pat. No. | Kind Code | Issue Date | Patentee |
| --- | --- | --- | --- |
| 6,640,201 | B1 | Oct. 28, 2003 | Hahlweg |
| 7,373,275 | B2 | May 13, 2008 | Kraft |
| 9,020,274 | B2 | Apr. 28, 2015 | Xiong et al. |
| 8,811,772 | B2 | Aug. 19, 2014 | Yang |
| 8,571,351 | B2 | Oct. 19, 2013 | Yang |
| 8,233,722 | B2 | Jul. 31, 2012 | Kletter et al. |
| 8,144,947 | B2 | Mar. 27, 2012 | Kletter et al. |
| 6,272,245 | B1 | Aug. 7, 2001 | Lin |
| 7,010,158 | B2 | Mar. 7, 2006 | Cahill et al. |

Nonpatent Literature Documents

Yang, Tianzhi and Keyes, David E. (2008). An Affine Energy Model for Image Registration Using Markov Chain Monte Carlo. Submitted to SIAM Journal of Imaging Sciences in July 2008, in March 2009 we were told that it was rejected, in the mean while it has been placed on the first author's web page (http://www.columbia.edu/~ty2109) for a while, then removed.

Linden, Timothy R. (2011). A Triangulation-Based Approach to Nonrigid Image Registration. Masters Thesis (Wright State University). [online] [retrieved on Jan. 31 2012] Retrievable from http://rave.ohiolink.edu/etdc/view?acc_num=wright1310502150.

Seetharaman, G., G. Gasperas, et al. (2000). A piecewise affine model for image registration in nonrigid motion analysis. Proceedings 2000 International Conference on Image Processing. (Cat. No. 00CH37101)

Ourselin, S., A. Roche, et al. (2001). Reconstructing a 3D structure from serial histological sections. Image and Vision Computing 19(1-2): 25-31.

Pavel Maur, (2002). Delaunay Triangulation in 3D, Technical Report No. DCSE/TR-2002-02. Retrieved Apr. 20, 2019, from https://www.kiv.zcu.cz/site/documents/verejne/vyzkum/publikace/technicke-zpravy/2002/tr-2002-02.pdf.

Joe, Barry. (1989). Three-Dimensional Triangulations from Local Transformations. SIAM J. Sci. and Stat. Comput., 10(4), 718-741.

Mémoli, Facundo and Guillermo Sapiro. "Comparing Point Clouds." Second Eurographics Symposium on Geometry Processing, Nice, France, Jul. 8-10, 2004.

Convex hull algorithms. In Wikipedia. Retrieved Apr. 20, 2019, from https://en.wikipedia.orewiki/Convex_hull_algorithms.

Patric R. J. Östergård. A fast algorithm for the maximum clique problem. Discrete Applied Mathematics, Volume 120, Issues 1-3, 15 Aug. 2002, Pages 197-207.

Patric R. J. Östergård. A New Algorithm For The Maximum-Weight Clique Problem. Electronic Notes in Discrete Mathematics Volume 3, May 1999, Pages 153-156.

Patric R. J. Östergård, Andrew Makhorin. wclique.c. Retrieved Apr. 21, 2019, from http://ftp.gnu.org/gnu/glpk/glpk-4.65.tar.gz.

Stanislav Busygin. A new trust region technique for the maximum weight clique problem. Discrete Applied Mathematics, Volume 154, Issue 15, 1 Oct. 2006, Pages 2080-2096.

Leonidas Guibas, Jorge Stolfi. (1985). Primitives for the manipulation of general subdivisions and the computation of Voronoi. ACM Transactions on Graphics. 4 (2): 74-123.

Kim, Chanho & Li, Fuxin & Ciptadi, Arridhana & Rehg, James. (2015). Multiple Hypothesis Tracking Revisited. 2015 IEEE International Conference on Computer Vision (ICCV) (2015): 4696-4704.

Michael Misha Kazhdan. Convex Hulls (3D), course material for "Introduction to Computational Geometry" Spring 2016. Retrieved May 1, 2019, from https://www.cs.jhu.edu/misha/Spring16/09.pdf Lowe, D. G. Distinctive Image Features from Scale-Invariant Keypoints. Int. J. Comput. Vision 60, 2 (November 2004), 91-110.

Bruno Levy. Answer to stackoverflow question "Intersection between line and triangle in 3D". In Stackoverflow. Retrieved May 9, 2019, from http://www.stackprinter.com/export?question=42740765&service=stackoverflow.

Multiple Object Tracking. Matlab Online Documentation. Retrieved May 8, 2019, from https://www.mathworks.com/help/vision/ug/multiple-object-tracking.html.

Wayne Pullan, Optimisation of unweighted/weighted maximum independent sets and minimum vertex covers, Discrete Optimization, Volume 6, Issue 2, 2009, Pages 214-219.

Wayne Pullan, Phased local search for the maximum clique problem, Journal of Combinatorial Optimization, November 2006, Volume 12, Issue 3, Pages 303-323.

Mitchnull. Generating combinations in c++. Answers to a stackoverflow question. Retrieved May 3, 2019, from http://www.stackprinter.com/export?question=9430568&service=stackoverflow.

Nlucaroni. Algorithm to return all combinations of k elements from n. Answers to a Stackoverflow question. Retrieved May 9, 2019, from http://www.stackprinter.com/export?question=127704&service=stackoverflow.

D. F. Huber. Automatic 3D modeling using range images obtained from unknown viewpoints. Proceedings Third International Conference on 3-D Digital Imaging and Modeling, Quebec City, Quebec, Canada, 2001, pp. 153-160.

Johnson, Andrew Edie. "Spin-Images: A Representation for 3-D Surface Matching." (1997). PhD thesis, Robotics Institute, Carnegie Mellon University. [online] [retrieved on May 29 2019] Retrievable from http://www.ri.cmu.edu/pub_files/pub2/johnson_andrew_1997_3/johnson_andrew_1997_3.pdf.

Direct linear transformation. In Wikipedia. Retrieved Apr. 23, 2019, from https://en.wikipedia.org/wiki/Direct_linear_transformation.

Rob et al. How can I create cartesian product of vector of vectors?. Answers to a stackoverflow question. Retrieved May 31, 2019, from http://www.stackprinter.com/export?question=5279051&service=stackoverflow.

Spatial descriptive statistics. In Wikipedia. Retrieved Jun. 8, 2019, from https://en.wikipedia.org/wiki/Spatial_descriptive_statistics.

In image registration, one wants to align a template image with a reference image. In feature-based image registration methods, a finite set of feature points is selected from each image, then the features points of the template image are mapped to those of the reference image. A feature point typically represents an outstanding feature of an image, e.g. a corner of a shape, local maxima and minima of differences of Gaussians, and a point of maximal curvature. Feature points are usually 2D or 3D spatial points that carry with them feature specific information in addition to their coordinates.

Feature-based image registration methods can be used when deformations are relatively large; on the other hand, non-parametric registration methods, such as the elastic and the fluid registration methods, are used when deformations are small. Because of this, feature-based registration is sometimes carried out as a pre-processing step that precedes non-parametric registration.

Besides, the matching of spatial point sets is an important problem in various computer vision and pattern recognition areas such as motion tracking, localization, shape matching, and industrial inspection. In such applications, digital images are captured using various devices such as medical imaging machines, digital cameras, Radars, Lidars, or any other devices that converts physical signals into images reflecting the spatial distribution of the physical signals. For example the MRI machine that uses a powerful magnetic field to produce greyscale images, and the infrared camera that generates images based on infrared radiations. As another example, being widely used in Robotics and Self-Driving Vehicle applications, RGBD cameras are used to get color images as well as depth maps. A depth map may contain distance information from targets to a plane that's parallel to the image plane and passing through the camera center. To generate a depth map, various hardwares and algorithms have been developed. For example, the Intel RealSense D400 camera uses the active stereoscopy technology, where a light projector projects light patterns onto objects and capture the same patterns using two cameras from different perspectives. The depth information is computed using triangulation. In comparison, the StereoLabs ZED uses the passive stereoscopy technology, where it tries to match natural patterns at key points in natural environments using triangulation. The Kinect V2 uses the Time-Of-Flight (TOF) technology, where a receiver receives photons emitted from a light transmitter and then reflected back from subjects' surfaces. The delay is used to compute the depth. The Orbbec Astra S camera employs the structured light technology, where a laser projector projects structured patterns that is triangulated using a camera. As another example, Radar uses an antenna to transmit and receive radio waves. In addition to the depth, It can directly measure velocity using the Doppler effect. Radar is suitable for self-driving vehicles when harsh weather conditions prevents other technologies from fully functioning.

Often captured signals are extracted to a measurement point set using various interest point or bounding box detectors (e.g. the SIFT, SURF, various corner or blob detectors, various object detection neural networks etc.), and the problem becomes matching the measurement point set with a given point set. For example, in multi-object tracking (MOT), Bayesian Filters are assigned to objects that it tracks. At each time step, the filters are used to generate a set of predictions for the objects based on their past trajectories and elapsed times. The predictions are often given as statistical distributions with means and covariances. Examples of Bayesian Filters are the Kalman Filter, the Extended Kalman Filter, the Unscented Kalman Filter, and the Particle Filter, etc. Measurement points are matched with the predictions. This step is also called data association. Finally, the coordinates of the centroids of the detections are used to update the filter. See "Multiple Object Tracking" retrieved from Matlab Online Documentation for an example.

In localization, a vehicle can use a Bayesian Filter to estimate its own pose. The Bayesian Filter frequently predicts new poses for the vehicle using the vehicle's own readings and actuations, where such readings could include for example previous poses, various odometry readings, GPS readings etc., and such actuations could be given in the form of linear and angular accelerations, forces and torques combined with a dynamic model of the vehicle, etc. Combine these information with elapsed times, the vehicle can predict its current pose, which is typically represented as a statistical distribution. This can be used to either transform a set of landmarks in a digital map that is downloaded or computed ahead of time from the map's frame to the vehicle's frame and to be matched with measured landmarks. Alternatively measurements can be transformed from the vehicle's frame to the map's frame to be matched with the landmarks. The coordinates of the associated measurements are then used to update the Bayesian Filter to update the estimation.

As another example, data association can be applied to multi-sensor data fusion. In Localization or MOT, when multiple sensors are used, one often needs to identify measurements generated by the different sensors. This is not straight forward due to the presence of noises in measurements.

One simple approach for data association is to use the Nearest Neighbor Association algorithm, which involves choosing for each landmark the closest measurement. Referring to FIG. 1, there is shown an example where there is a vehicle 50. Landmarks 54, 58, 64, and 68 are obtained from a digital map stored in memory, and 52, 56, 60, 62, and 66 are obtained from vehicle 50's measurements. The Nearest Neighbor Association algorithm associates measurement 52 with landmark 54, measurement 60 with landmark 58, measurement 62 with landmark 64, and measurement 66 with landmark 68. But if one takes into account the geometry, landmark 58 is probably more likely to be associated with measurement 56.

To match two spatial point sets usually involves minimizing an energy function, that is, select from a set of candidate mappings a mapping that minimizes the energy function. Since the problem has received a lot of attentions in the computer vision community, many energy functions has been proposed. For example, the Hausdorff distance has been used by many authors to match two point clouds.

Another widely used distance is the bottleneck distance, which is the maximum distance between any two matched points.

Given an energy function, sometimes an optimal mapping can be obtained that minimizes the energy function. For example when the number of candidate mappings is small, then one can do an exhaustive search. Efficient optimization methods are applicable when the energy function is linear with linear constraints, or sometimes when the energy function is quadratic. On the other hand, if the number of candidate mappings is large and the energy landscape is rough with lots of local minima (or maxima), then sometimes the practice is to use heuristics. Examples include Simulated Annealing (SA), Generic Algorithm (GA), Tabu Search (TS), and the greedy algorithm.

It is understood that heuristics usually are not guaranteed to generate the best solutions for complex problems, hence most of the times the target is rather a solution that is hopefully close to the best one. In recent years, hybrid methods that combine two or more methods have been applied in different areas such as the designing of mobile networks and power systems. For example, a greedy simulated annealing algorithm combines a greedy local search method with SA to improve the convergence speed.

Underlying some existing methods for matching spatial point sets is the assumption that either it is the same set of objects that appear in both images and their spatial arrangements are by and large the same (e.g. medical images, static images of landscape, buildings, mountains, multi-sensor images), or the noises are relatively small. Such noises may come from occlusions, distortions, or relative motions. In some situations such assumption is valid, but new methods need to be developed for less ideal situations. For example, when a template image presents two cars and a reference image shows only one, when objects undergo relative motions, or when objects are partially occluded in a reference image while they are fully revealed in a template image.

In medical imaging literatures, matching of point sets usually precedes finer registration techniques that establishes pixel-level correspondences. The matching of point sets is usually carried out by a least square regression or its variations, based on the assumption that there exists a global affine transformation. For example, in Seetharaman (2000), the global affine transformation is estimated by using a scatter matrix, which measures how the point sets as a whole are distributed in space; local points are then matched by a nearest-neighbor technique. Using an iterative scheme, the Block matching method in "Reconstructing a 3D structure from serial histological sections" by Ourselin et al. (2001) repeats the regression step multiple times. In image alignment, for example in "Distinctive Image Features from Scale-Invariant Keypoints" by Lowe (Int. J. Comput. Vision 60(2): 91-110, 2004), candidate point correspondences are first identified by comparing features, then a least square problem is solved to extract the parameters of an affine-transformation, again based on the assumption that most candidates more or less comply with a global affine transformation.

In U.S. Pat. No. 9,020,274 granted Apr. 28, 2015 by Xiong et al., it uses a control network of super points, the disclosed embodiment is not scale invariant. In U.S. Pat. No. 6,640,201 granted Oct. 28, 2003 by Hahlweg, it discloses a method that uses transformation equations whose parameters measure similarities between point sets. The method is affine-invariant if the transformation equation is carefully chosen. In U.S. Pat. No. 7,373,275 granted May 13, 2008 by Kraft, it computes a force field that perturbs one point set to align with the other. Instead of computing a mapping between individual points, another school looks into minimizing the Hausdorff distances between point clouds. Implementations of this approach can be found in "Efficient Visual Recognition Using the Hausdorff Distance" by Rucklidge (Springer-Verlag New York, Inc., 1996) and "Comparing point clouds" by Memoli.

In U.S. Pat. No. 8,233,722 granted Jul. 31, 2012 by Kletter et al., it describes a method for querying documents using their images. Given an image of a document, a set of 2D key points is generated, where each key point corresponds to the centroid locations of a connected component in the image. For each key point, a predetermined number of fingerprints are computed, where each fingerprint consists of a series of persistent ratios capturing the local geometry of this point and its predetermined number of nearest-neighbor key points. To make it robust w.r.t. noises, various combinations of the nearest neighbors are considered; to make it rotation invariant, various permutations of the nearest neighbors are also considered. Thus a substantial number of fingerprints are needed for a key point to make it robust. Also I think if one wants to consider the geometric relationships among key points that are far away from each other using this method, neighborhoods of different sizes may need to be considered, and this may further increases the number of fingerprints. To speed up fingerprint matching, fingerprints are stored in a Fan Tree, where each path from the root to a leaf node represents a fingerprint. In U.S. Pat. No. 8,144,947 granted Mar. 27, 2017 by the same authors, the same idea is applied to photograph images where keypoints are extracted using scale space methods.

In U.S. Pat. No. 6,272,245 granted Aug. 7, 2001 by Lin, it extracts significant regions from an input image using two-dimensional window search, and generates feature vectors for the significant regions using their statistical characteristics. The feature vectors are compared with those stored in a database from a model, and for found matches the coordinates of the significant regions are placed in a candidate list. Next it compares the geometric relationships among the significant regions in the candidate list and those among the matches found in the model to validate their geometric consistencies. Exemplary geometric relationships include the distance between two significant regions, and the angle made by two significant regions to a common third significant region. Thus local statistical features are used to find candidate correspondences, and geometric consistency is used to validate the compatibilities among correspondences.

In U.S. Pat. No. 7,010,158 granted Mar. 7, 2006 by Cahill et al., it introduces a method for stitching multiple 3D panoramic scene images into a 3D model of the whole scene. After obtaining a plurality of 3D panoramic images, it converts them to surface meshes and uses Huber's algorithm to compute transformations that align the surface meshes. It then align and integrate the surface meshes, and finally integrate the textures and intensities. Referring to "Automatic 3D modeling using range images obtained from unknown viewpoints" by Huber, it in turn refers to the "spin-image" representation introduced in "Spin-Images: A Representation for 3-D Surface Matching" by Johnson. Here for each 3D surface point it generates a spin-image which is a rigid transformation invariant representation of the local geometry in the point's object centered coordinate system called the spin-map coordinates. Between the surface points of two surface meshes, it generates candidate correspondences by examining the similarities of the points' spin-images. It further checks the consistency between pairs of correspondences by examining the geometric consistencies, which essentially compares the distances in the spin-map coordinates. Correspondences that are geometrically consistent are grouped to estimate a transformation that is used to align the two meshes. Thus local geometric features are compared to find candidate correspondences, and the geometric consistency is used to filter out incompatible correspondences and select a group fo compatible correspondences.

In Yang and Keyes (2008), an affine energy model for matching point sets using SA is presented. There, a smoothness constraint is defined in terms of the Euclidean distance between the elements of the matrices of pairs of affine transformations, where the energy function depends only on the location of the points. SA is used to solve the registration problem by iteratively removing and inserting cross-edges. Its potential in avoiding local minima in the presence of global affine and nonlinear transformations is demonstrated by comparing it with non-parametric registration and affine registration models. Timothy (2011) also uses the Euclidean distance to compare affine transformations for the purpose of image registration. But since an affine transformation is a mixture of rotation, scaling, displacement and shearing, which are mingled together into the elements of an affine transformation matrix, the significant elements of the matrix do not have much physical meaning. Thus the Euclidean distance may not accurately capture the differences between affine transformations.

In my earlier U.S. Pat. No. 8,811,772 granted Aug. 19, 2014, instead of relying on the Euclidean distance, various spatial agents are constructed and transformed by affine transformations, and distance measures are computed by comparing transformed spatial agents. In my second U.S. Pat. No. 8,571,351 granted Jun. 3, 2012, distance measures are computed by taking the difference of the left sub-matrices of two affine transformations, where the two affine transformations are computed from a pair of mapped agreeable (n+1) combinations. Examples include computing the matrix norms of the difference using some of its largest singular values and equivalents, or computing the product of some largest singular values of the difference or equivalents.

In my previous U.S. application Ser. No. 16/428,970 filed on Jun. 1, 2019, it describes embodiments that generate MatchPairs from two spatial point sets and a set of candidate correspondences between them, compute compatibilities between pairs of the MatchPairs, compute weights for the MatchPairs, solve a maximum-weight clique problem using the MatchPairs, their weights, and their compatibilities, and merge the vertices of the resultant maximum-weight clique to generate a one-to-one mapping. Especially, it discloses various approaches to compute the compatibilities.

SUMMARY

The present application addresses generating a one-to-one mapping between two spatial point sets. It discloses embodiments that efficiently compute compatibilities when candidate correspondences are given.

Embodiments describe a system for generating a one-to-one mapping between a first spatial point set and a second spatial point set in nD, n=2 or 3, the system comprising a programmable processor and the GPU, and a memory coupled with the programmable processor and the GPU, and the memory embodying information indicative of instructions that cause the programmable processor and the GPU to perform operations comprising receiving a first and a second spatial point sets in nD and a plurality of candidate correspondences between the two spatial point sets; computing unit conflict lists for the candidate correspondences; generating one or more MatchPairs between the first and the second point sets computing local distance measures for the MatchPairs; converting the local distance measures to weights; computing conflict lists for the MatchPairs by computing the bitwise ORs of their candidate correspondences' unit conflict lists; computing correspondence lists for the MatchPairs; computing the compatibilities between pairs of the MatchPairs by examining for each pair the bitwise AND of one's correspondence list and the others conflict list; constructing a vertex-weighted undirected graph with its vertices corresponding to the MatchPairs, its edges representing the capabilities, and its vertices assigned the weights; computing a maximum-weight clique of the vertex-weighted undirected graph; directed graph; and merging the maximum-weight clique to generate the one-to-one mapping.

Embodiments describe a method of using a computing device comprising a CPU and a GPU coupled to the CPU to generate a one-to-one mapping between a first spatial point set and a second spatial point set in nD, n=2 or 3, where the method comprises receiving a first and a second spatial point sets in nD and a plurality of candidate correspondences between the two spatial point sets; using the computing device to compute conflict lists or the candidate correspondences; using the computing device to generate one or more MatchPairs between the first and the second point sets; using the computing device to compute local distance measures for the MatchPairs; using the computing device to convert the local distance measures to weights; using the computing device to compute conflict lists for the MatchPairs by computing the bitwise ORs of their candidate correspondences' unit conflict lists; using the computing device to compute correspondence lists for the MatchPairs; using the computing device to compute the compatibilities between pairs of the MatchPairs by examining for each pair the bitwise AND of one's correspondence list and the other's conflict list; using the computing device, to construct a vertex-weighted undirected graph with its vertices corresponding to the MatchPairs, its edges representing the compatibilities, and its vertices assigned the weights; using the computing device to compute a maximum-weight clique of the vertex-weighted undirected graph; and using the computing device to merge the maximum-weight clique to generate the one-to-one mapping.

These and other features, aspects, and advantages of the present invention will become better understood with reference to the following description, appended claims, and accompanying drawings.

DRAWINGS—FIGURES

Figure 11A:
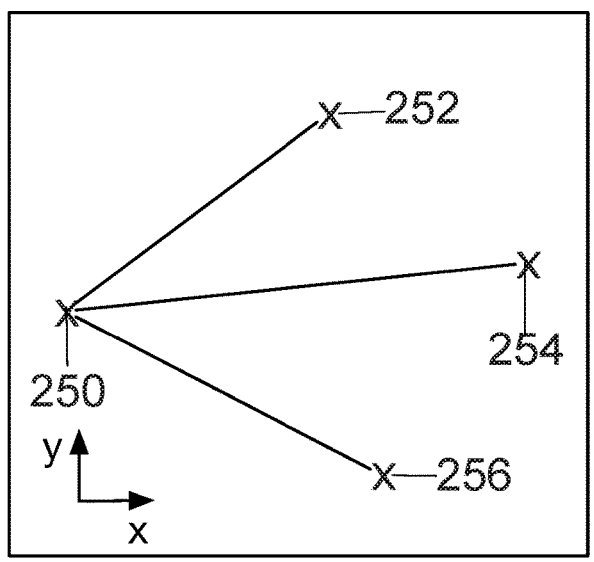
Figure 11B:
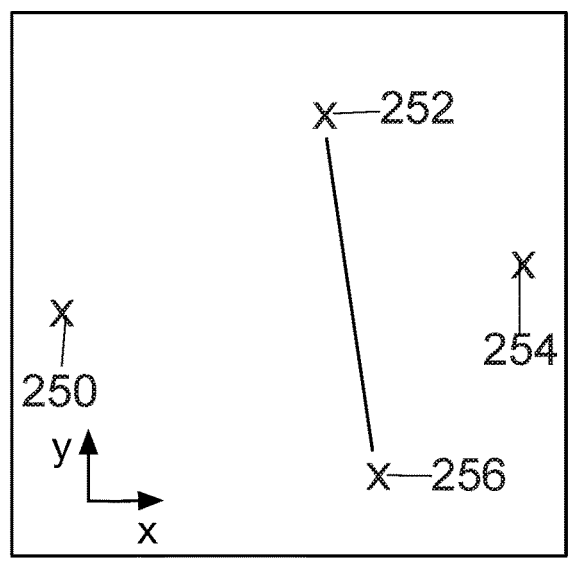

FIGS. 11a-11b visually illustrate the steps according to the common edge algorithm to check the geometric configuration of an n+2 combination and compute its candidate common edges in 2D.

Figure 12A:
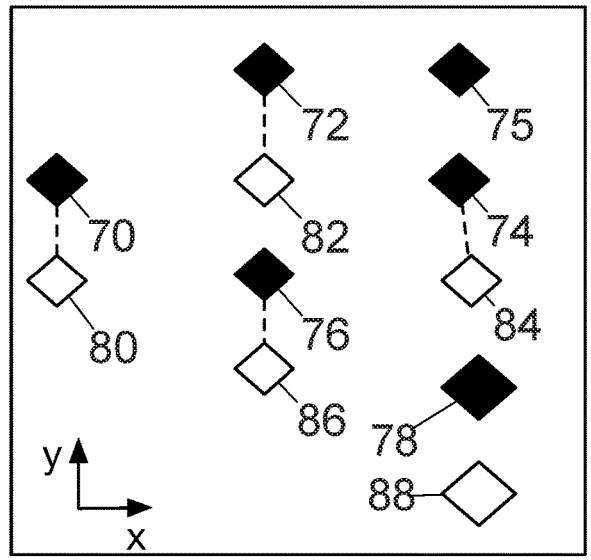
Figure 12B:
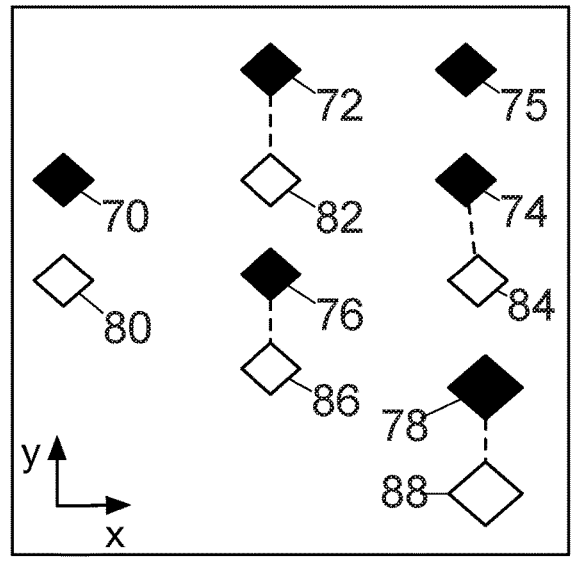
Figure 12C:
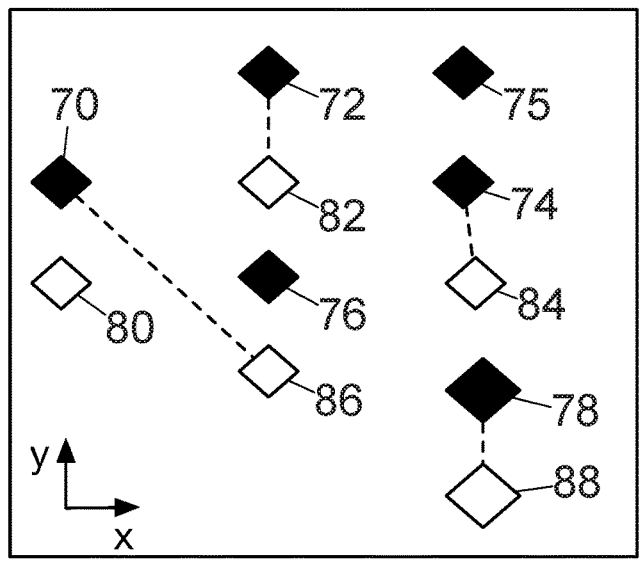

FIGS. 12a-12c show examples of compatible and non-compatible one-to-one mappings in 2D.

Figure 13:
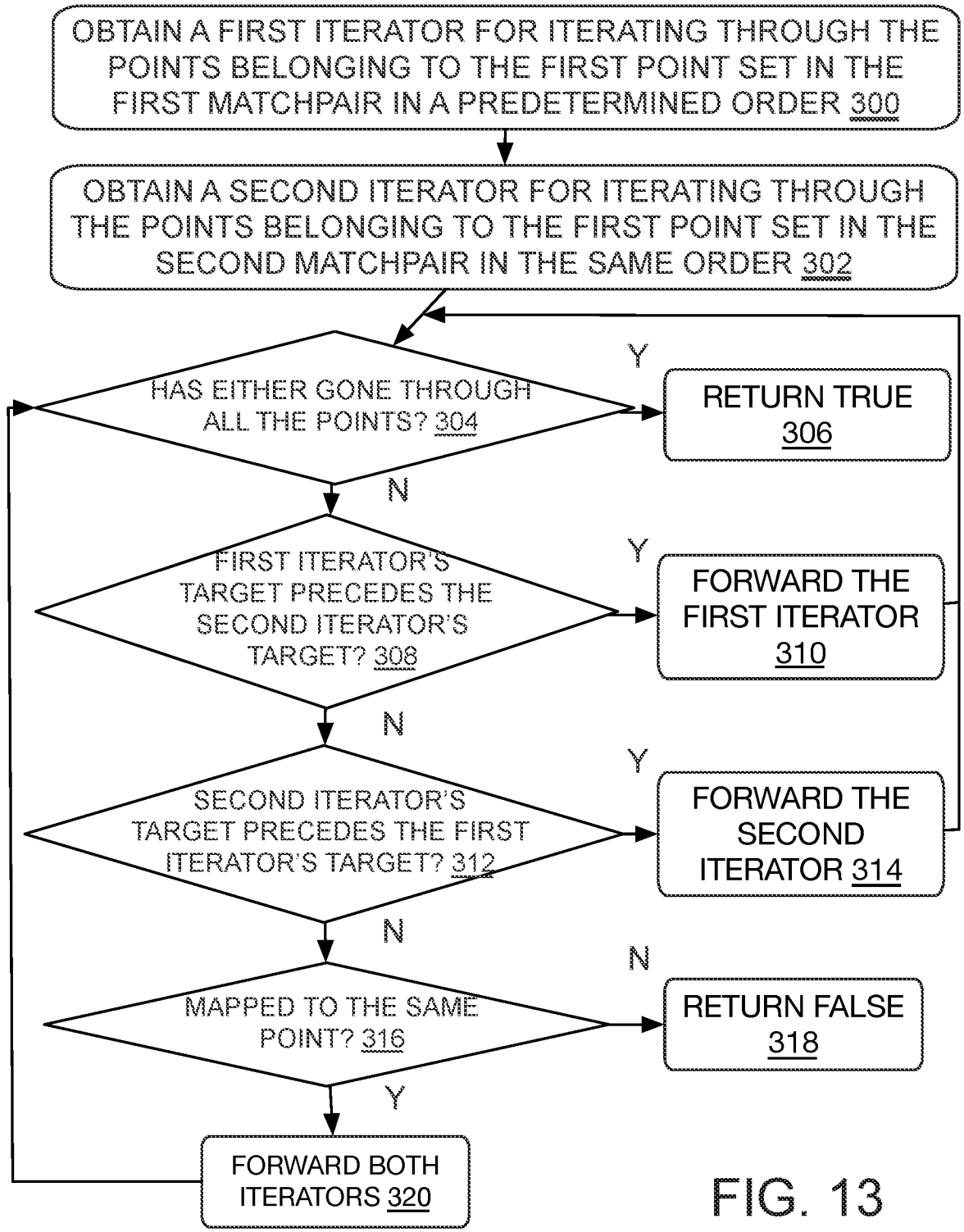

FIG. 13 shows half of an exemplary process implemented by MCU 132 for checking if two MatchPairs are compatible.

Figure 1:
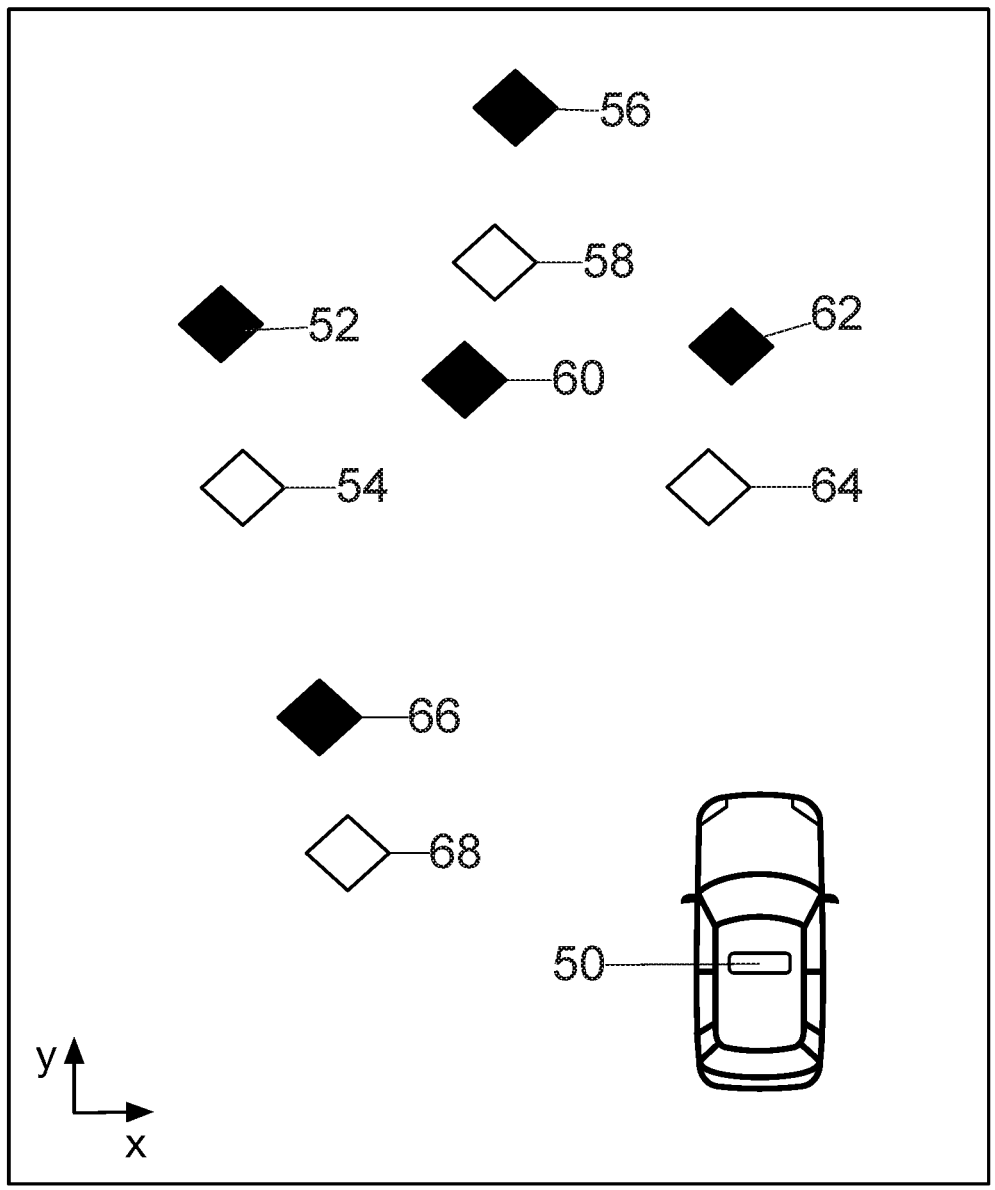
FIG. 1 is an exemplary illustration in 2D of a vehicle, a set of landmarks obtained from a digital map, and a set of points obtained from the vehicle's measurements.
Figure 2:
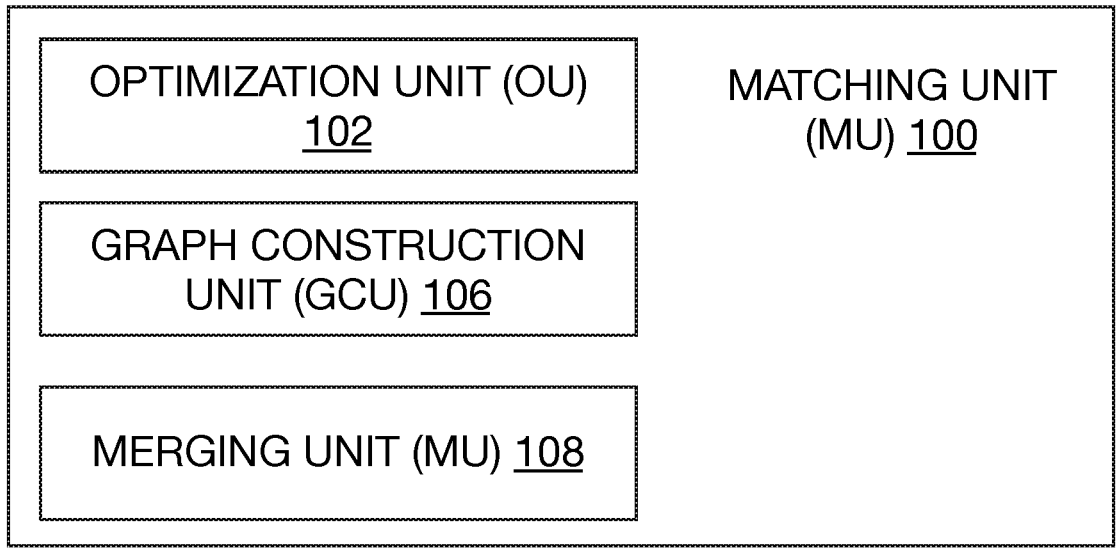
FIG. 2 is a block diagram of a Matching Unit according to one embodiment.
Figure 14:
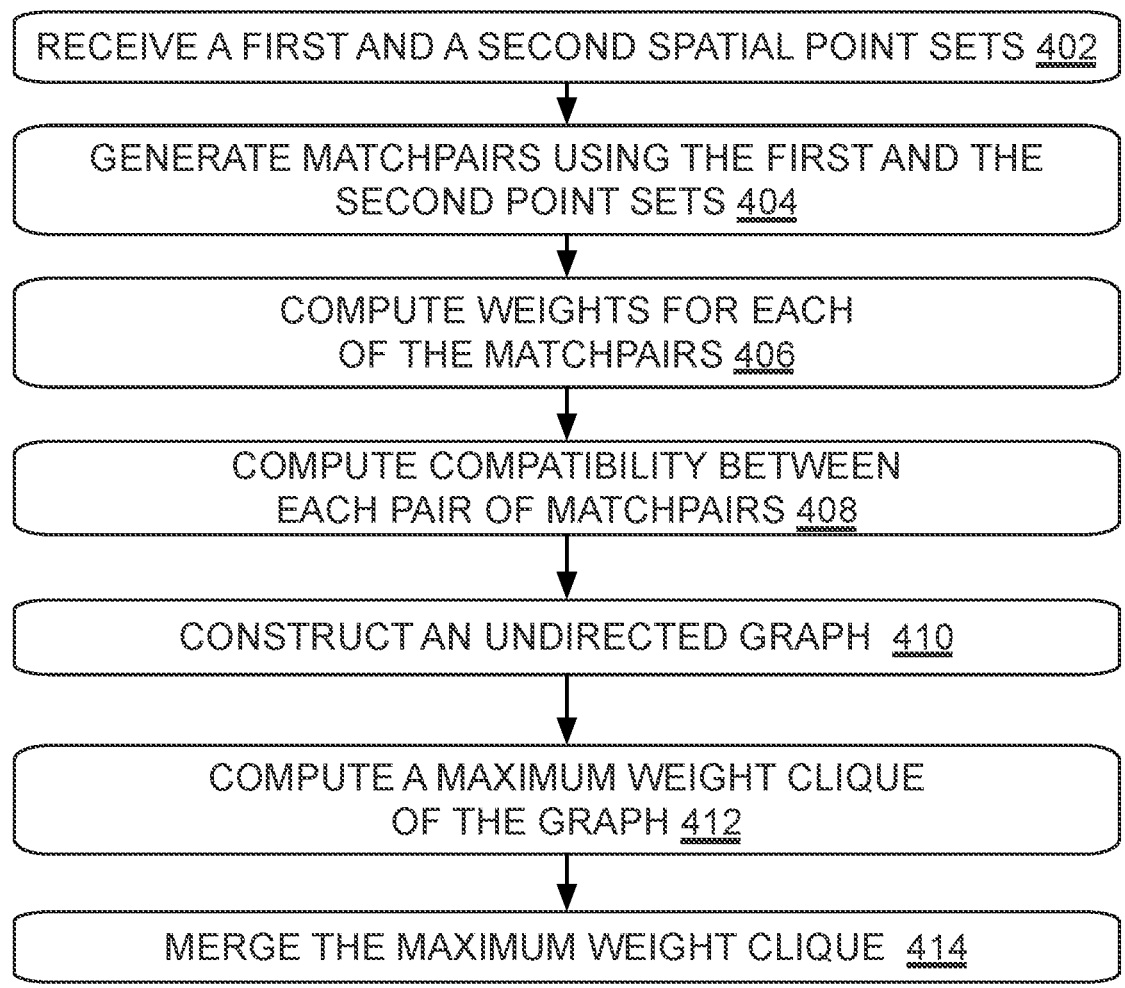
Figure 16:
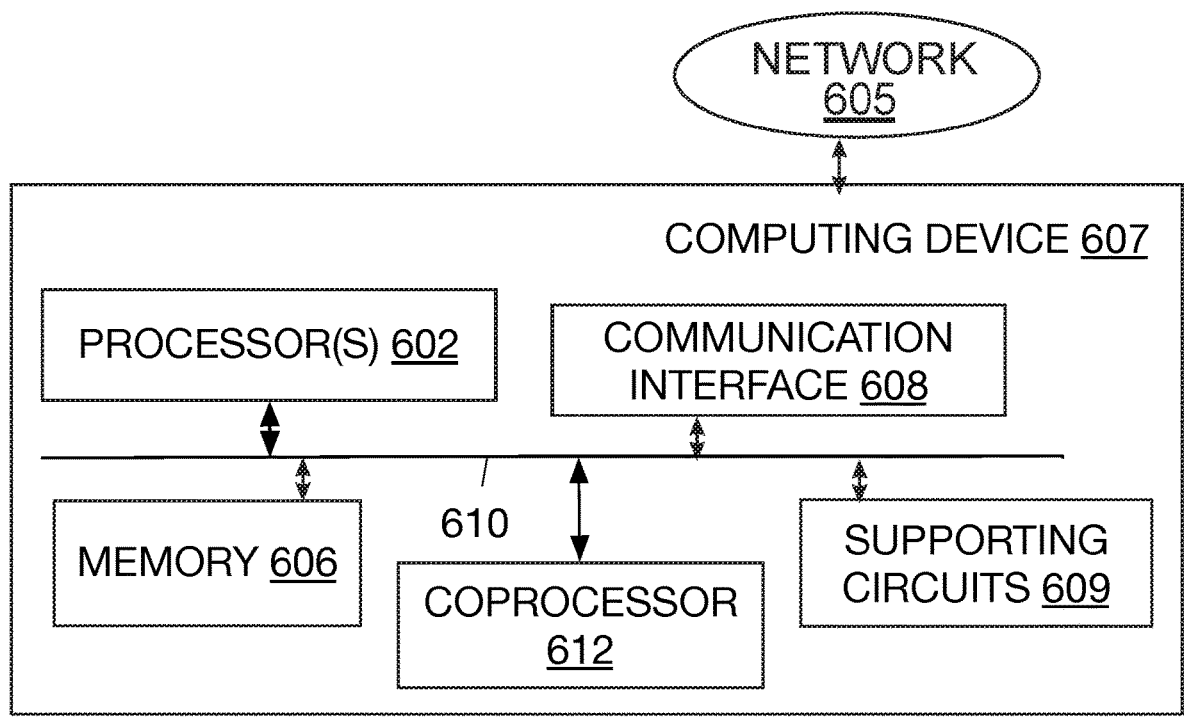

FIG. 14 shows an exemplary process carried out by the system shown in FIG. 2 and the computing device shown in FIG. 16 for generating a one-to-one mapping.

Figure 15:
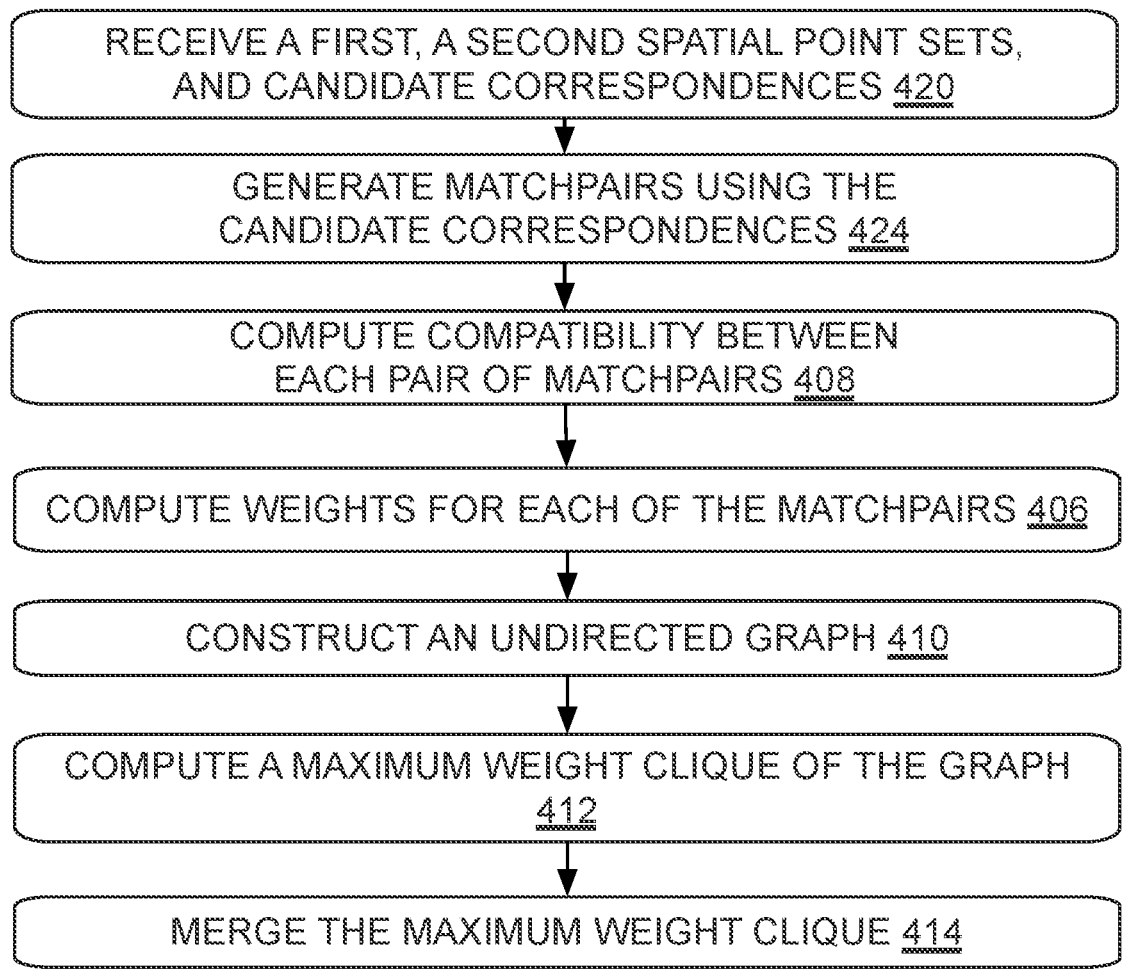

FIG. 15 shows another exemplary process carried out by the system shown in FIG. 2 and the computing device shown in FIG. 16 for generating a one-to-one mapping.

FIG. 16 shows a block diagram of an exemplary computing device.

Figure 17A:
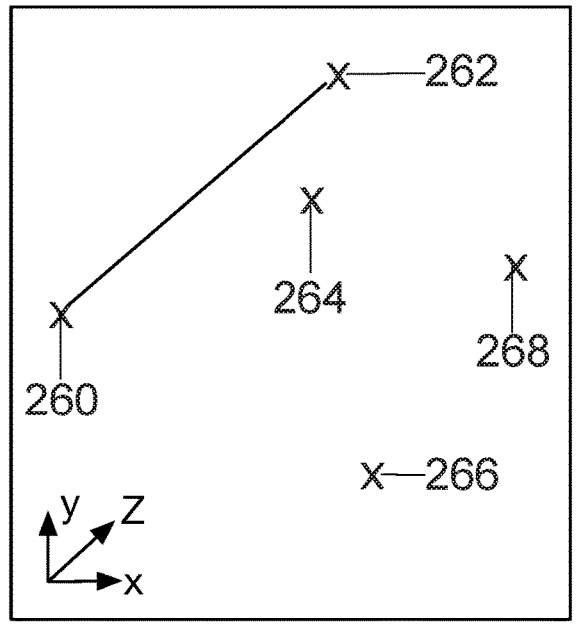
Figure 17B:
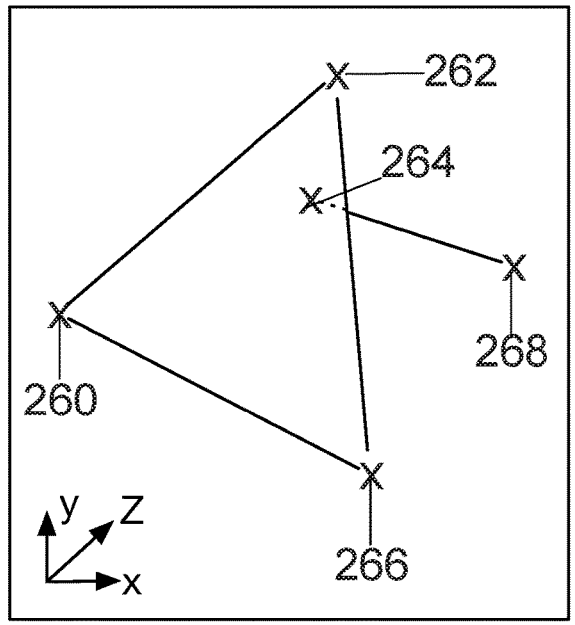
Figure 24:
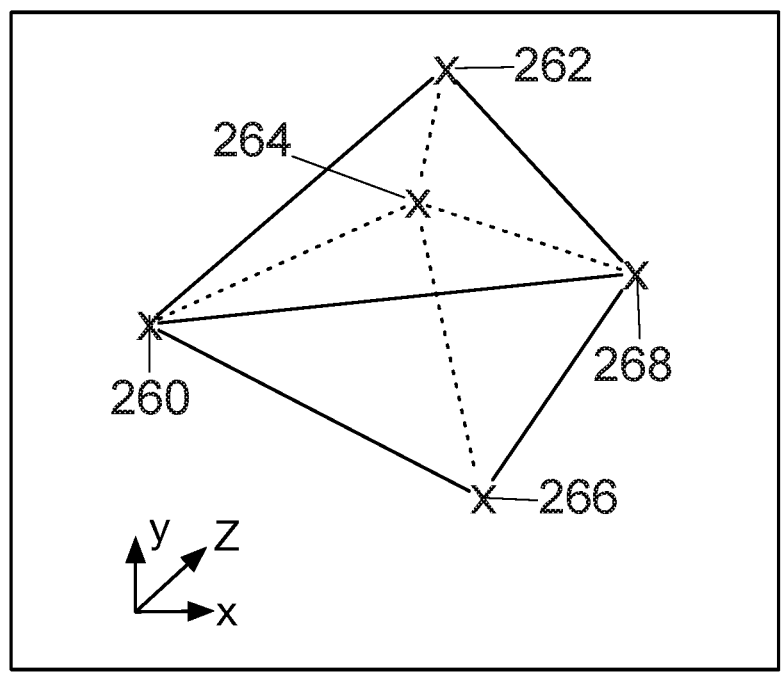

FIGS. 17a-17b visually illustrate in 3D the steps according to the common triangle algorithm to check the geometric configuration of the n+2 combination shown in FIG. 24 and compute candidate common triangles.

Figure 18A:
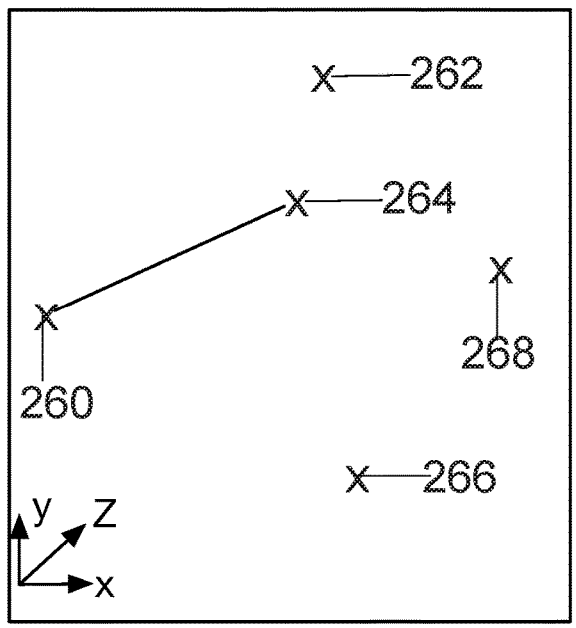
Figure 18B:
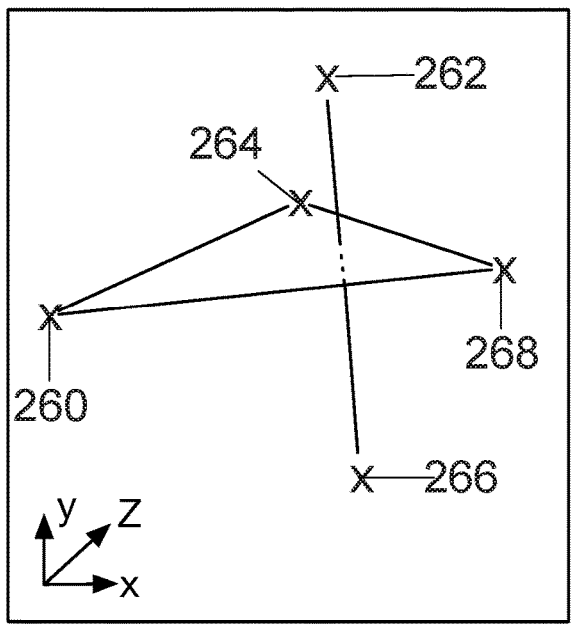

FIGS. 18a-18b visually illustrate in 3D the steps according to the common triangle algorithm to check the geometric configuration of the n+2 combination shown in FIG. 24 and compute candidate common triangles.

Figure 19:
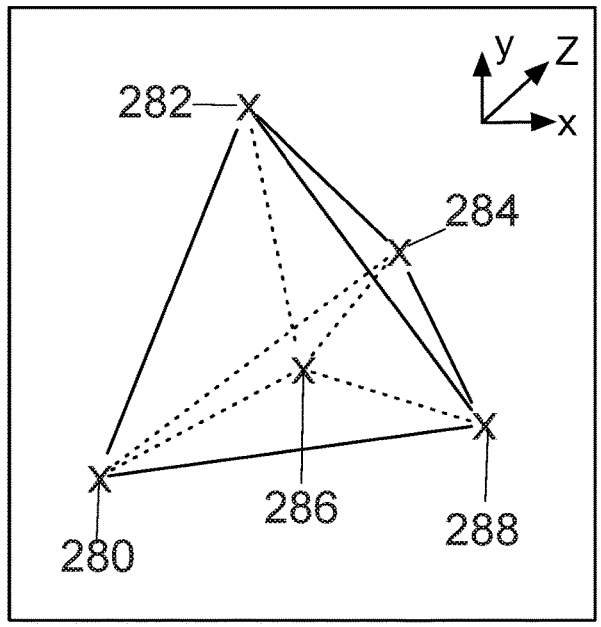

FIG. 19 illustrate in 3D an exemplary n+2 combination where one of its points is in the interior of the convex hull of the remaining points.

Figure 20A:
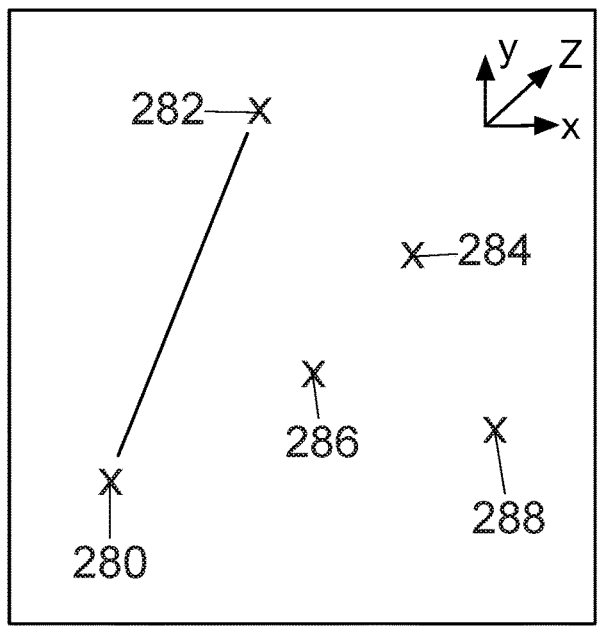
Figure 20B:
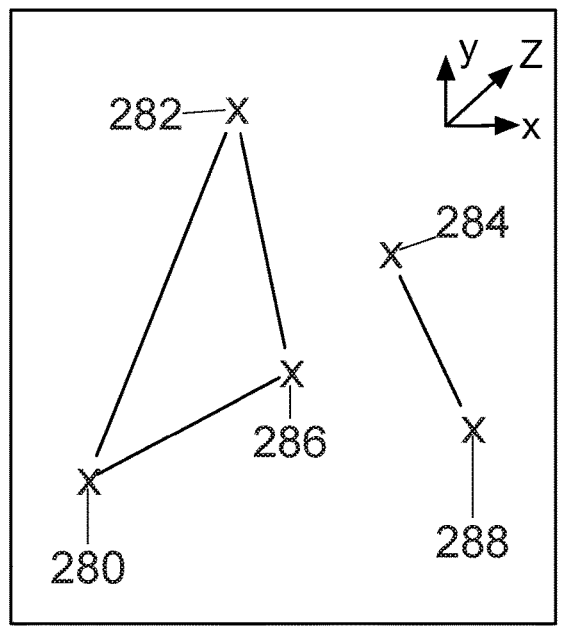

FIGS. 20a-20b visually illustrate in 3D the steps according to a custom process to check the geometric configuration of the n+2 combination in FIG. 19, to find the interior point, and to compute candidate common triangles.

Figure 21A:
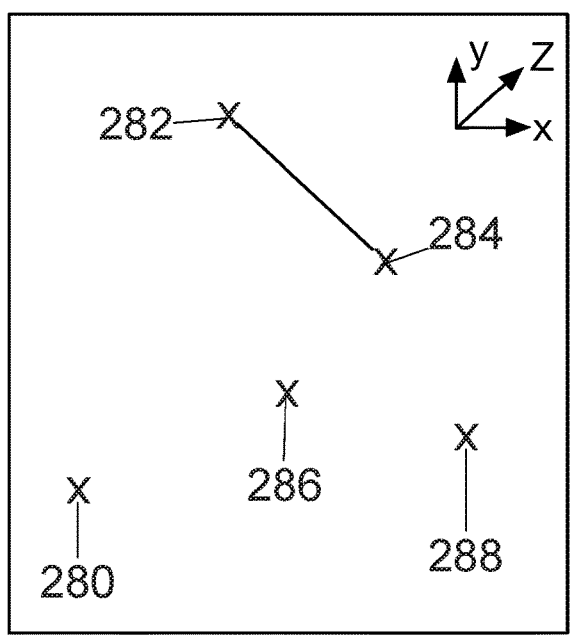
Figure 21B:
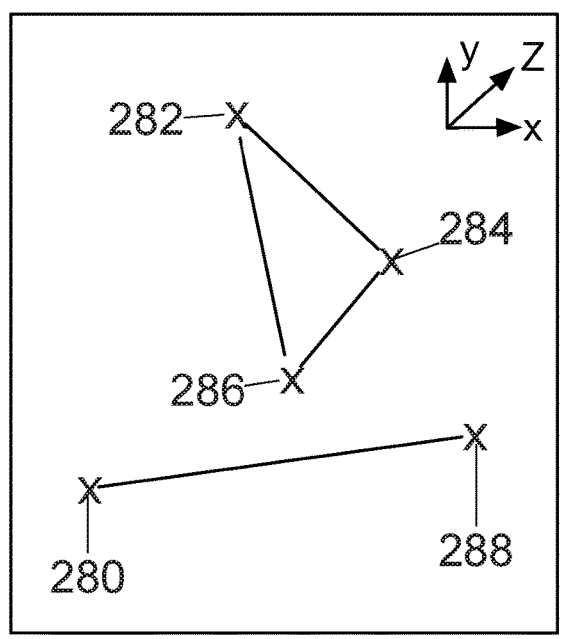

FIGS. 21a-21b visually illustrate in 3D the steps according to a custom process to check the geometric configuration of the n+2 combination in FIG. 19 to find the interior point, and to compute candidate common triangles, this time starting from a different edge on the hull.

Figure 22A:
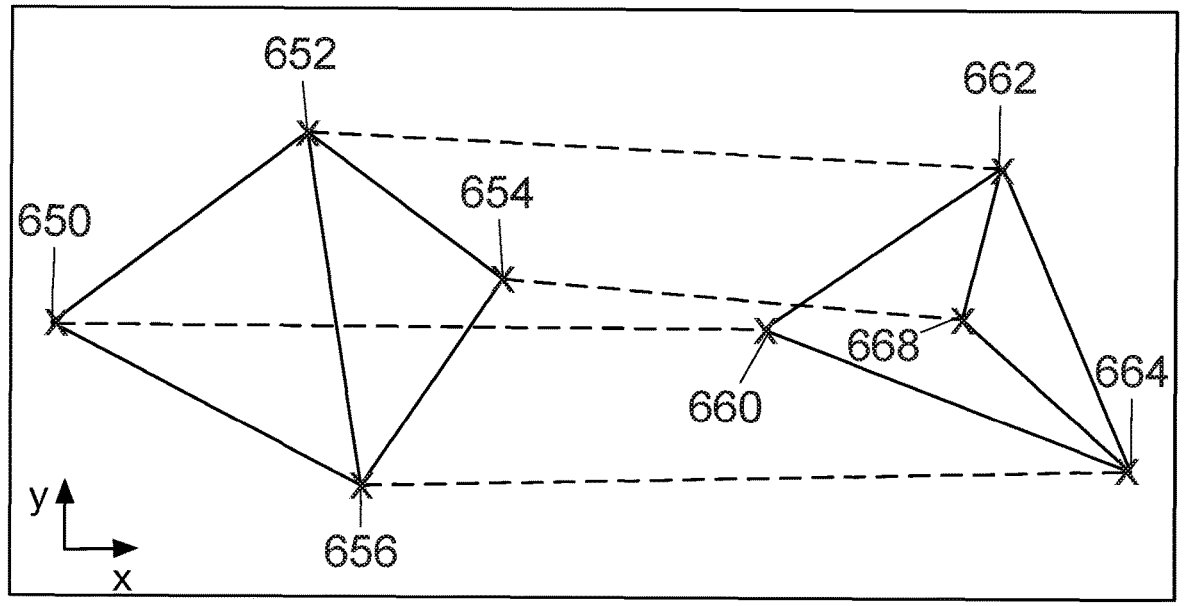
Figure 22B:
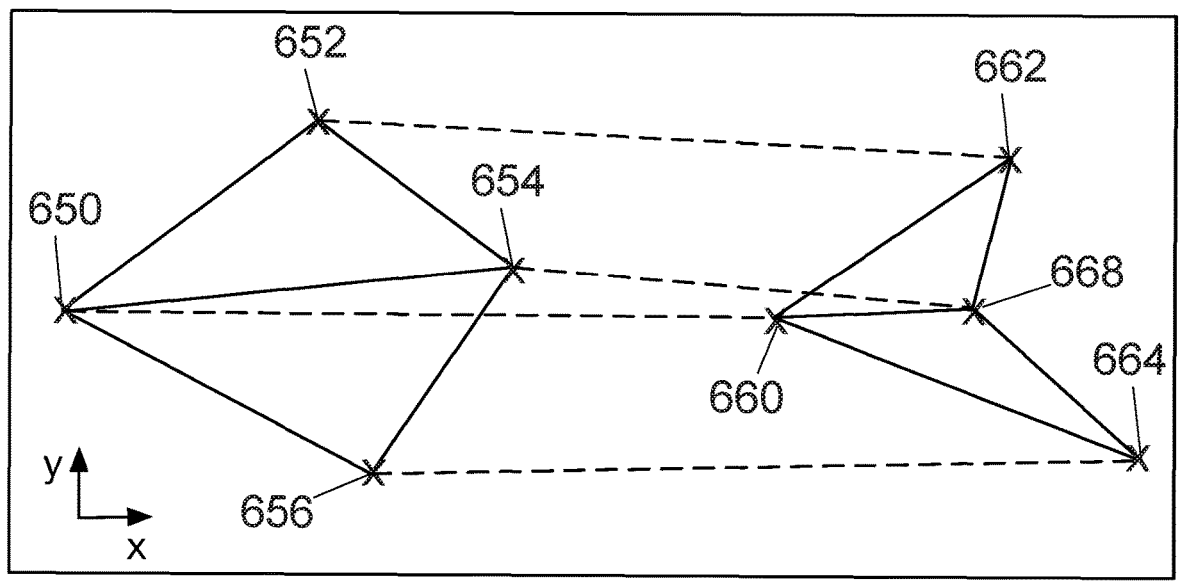

FIGS. 22a-22b illustrate an example of swapping candidate common edges to make a one-to-one mapping suitable.

Figure 23:
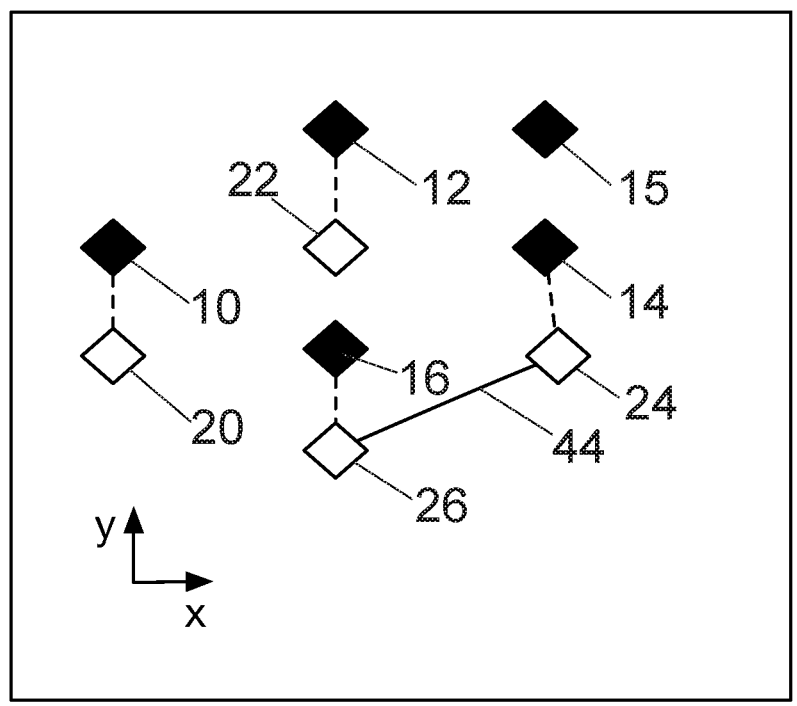

FIG. 23 shows in 2D an example of using a boundary edge of the convex hull of an (n+2) combination as the common edge for generating a pair of suitably mapped neighbor (n+1) combinations.

FIG. 24 shows in 3D an n+2 combination along with all of its edges on the hull, where all of its points are the vertices of its convex hull.

Figure 25:
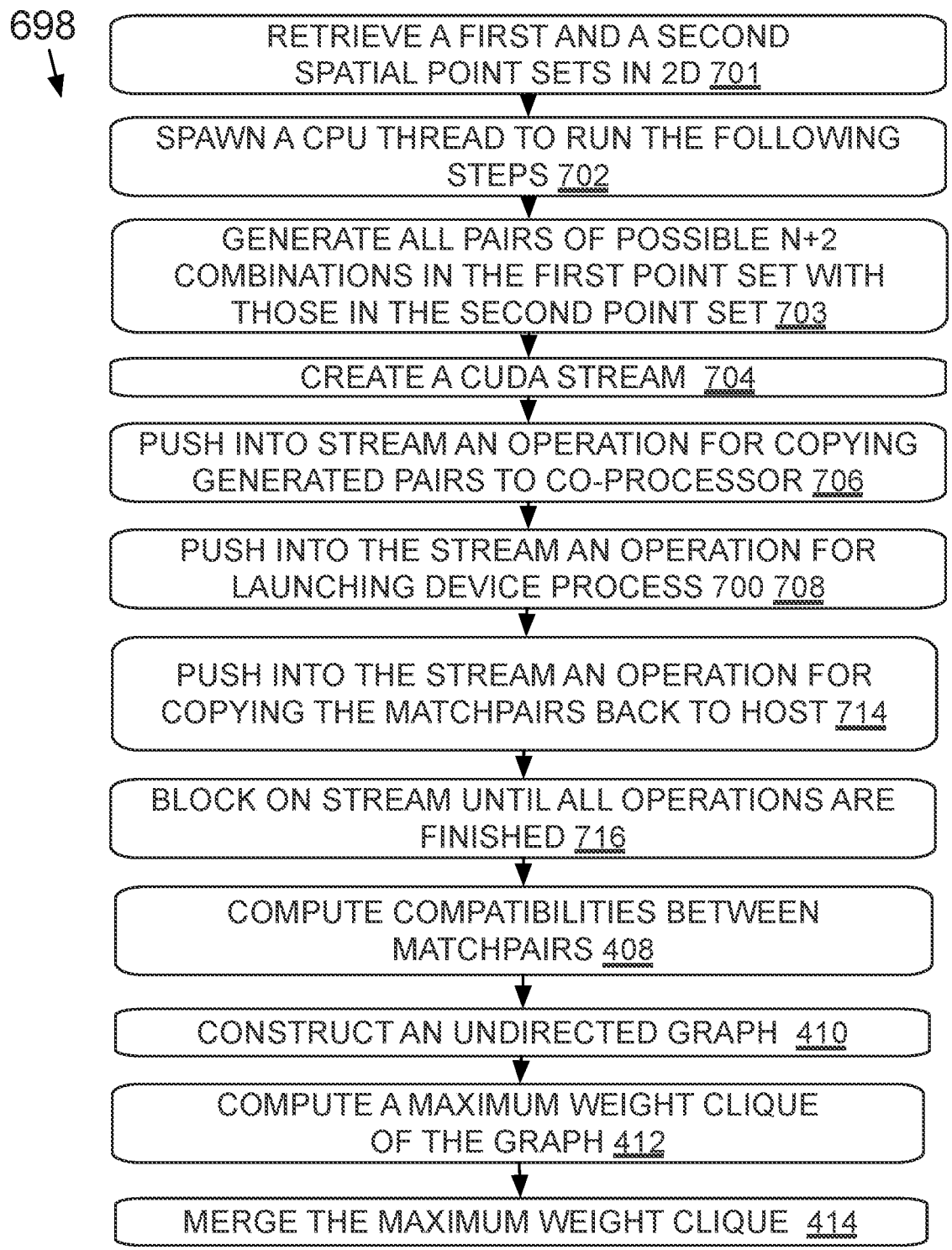

FIG. 25 shows an exemplary host process carried out by the system shown in FIG. 2 and implemented on computing device 607 shown in FIG. 16 including coprocessor 612 for generating a one-to-one mapping.

Figure 26:
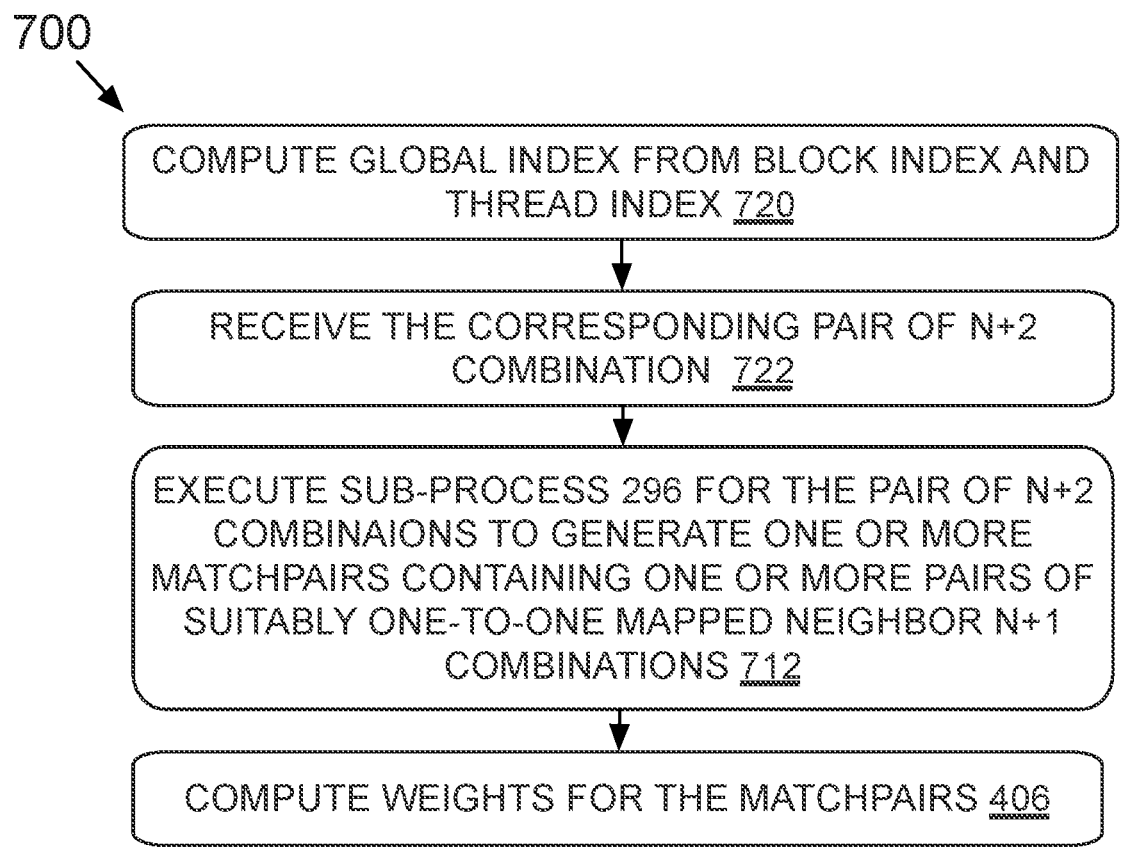

FIG. 26 shows an exemplary device process 700 launched by the host process at step 708 in FIG. 25 for generating one or more MatchPairs and computing their weights.

Figure 27:
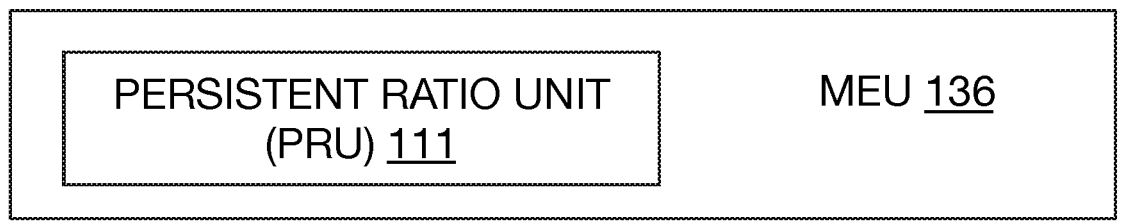

FIG. 27 shows a block diagram of a MatchPair Evaluation Unit according to another embodiment.

Figure 28A:
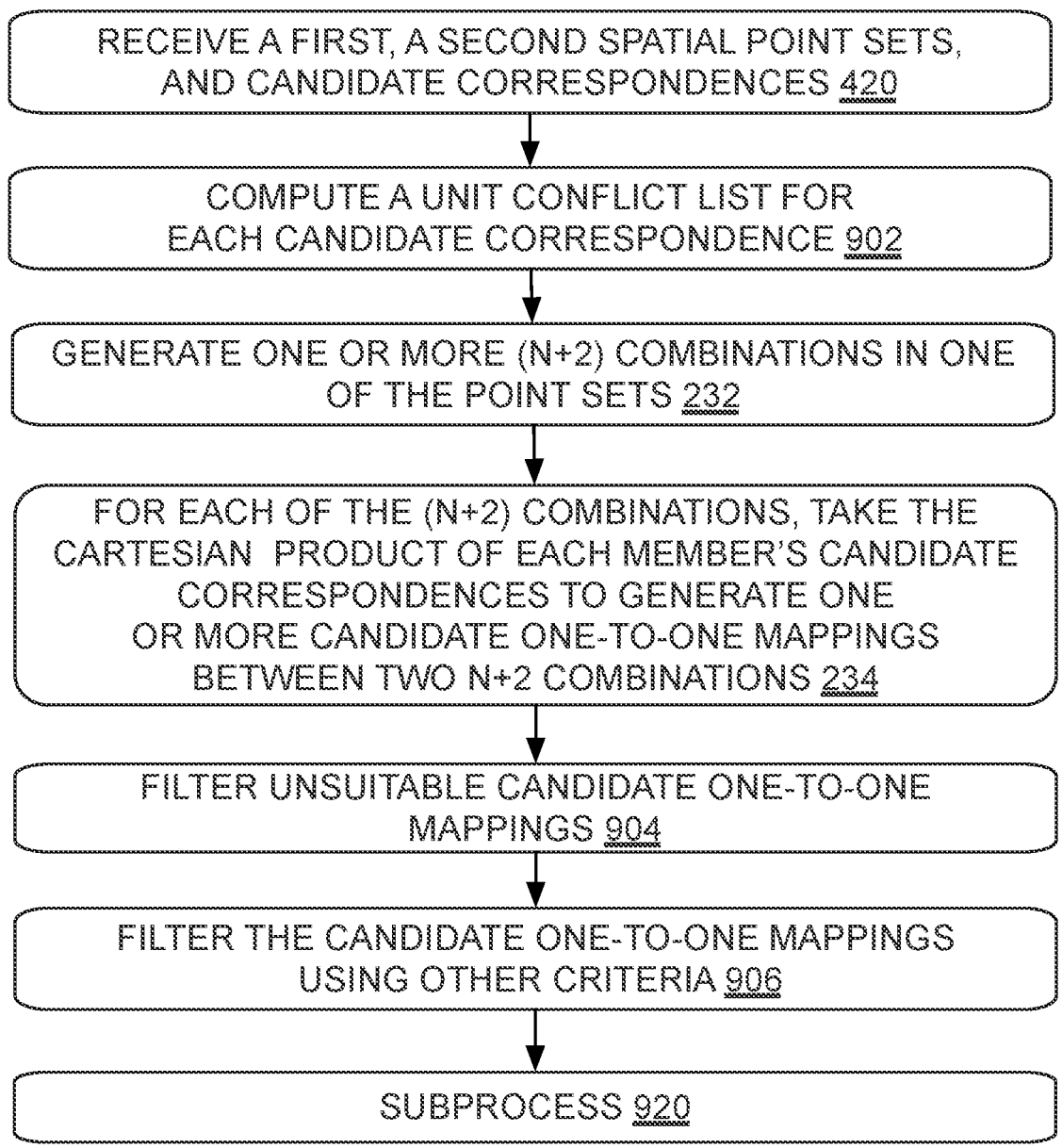
Figure 28B:
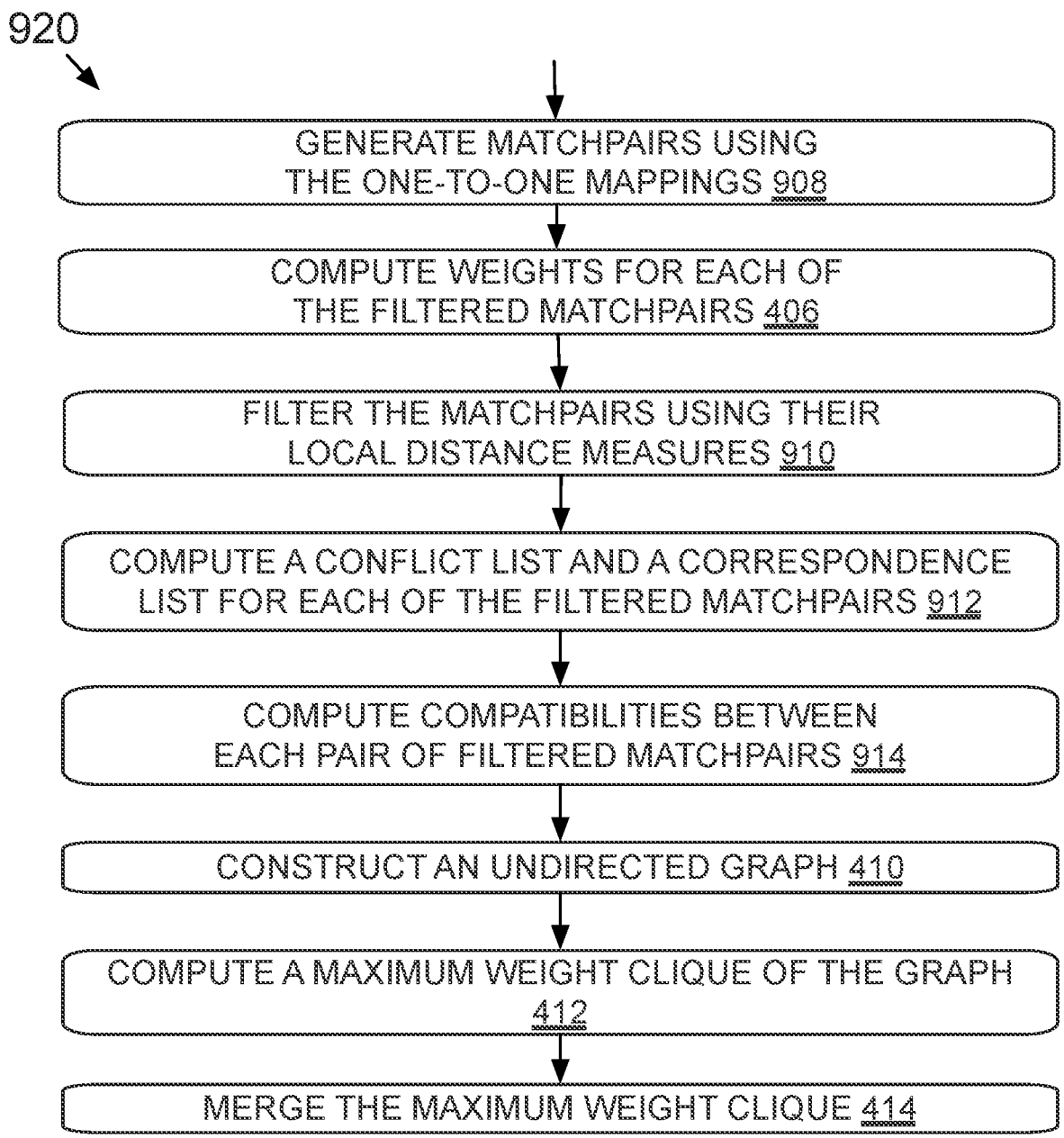

FIGS. 28a-28b show another exemplary process carried out by the system shown in FIG. 2 and the computing device shown in FIG. 16 for generating a one-to-one mapping.

DETAILED DESCRIPTION—DEFINITIONS

The affine transformation in nD is a line-preserving transformation from $R^n$ to $R^n$ that preserves parallelism and division-ratio. An affine transformation T acting on a point whose coordinate vector is $\vec{x}=[x_1, \ldots, x_n]^T \in R^n$ is denoted by $T(\vec{x})$. We have $$T(\vec{x}) = A(T)\vec{x} + \vec{t}(T)$$

where $A(T)$ is an n-by-n matrix, $\vec{t}(T)$ is an n-by-1 vector, and both are uniquely determined by T. It can be written as a single matrix-vector multiplication in homogeneous coordinates:

$$T(\vec{x}) = \begin{bmatrix} A(T) & \vec{t}(T) \\ 0 & 1 \end{bmatrix} \begin{bmatrix} x_1 \\ \vdots \\ x_n \\ 1 \end{bmatrix}$$

In homogeneous coordinates a point is usually represented in its standard form, which means that its element corresponding to the extra dimension obtained by embedding into a projective space is 1. It is also understood that in homogeneous coordinates two vectors are viewed as equal if one can be obtained by multiplying the other by a non-zero scalar.

In this invention, a spatial point is a point of interest in nD, n=2, 3. The point of interest is extracted from a digital image using some feature extractors and inserted into the space (by assigning coordinates to the point), inserted by human operators through computer user interfaces, or inserted into the space by other computer algorithms. Examples include interest points extracted using SIFT, SURF and various corner and blob detectors, centroids and corners extracted using object detection neural networks, pre-computed landmarks from digital maps, and predictions made by Bayesian Filters.

To each received spatial point there is in the input at least its coordinates and its point id. For a point whose point id is i, its coordinates is denoted by loc(i). Whether loc(•) is in homogeneous or inhomogeneous coordinates depends on the context. For example the input coordinates could be integers representing the pixels' row and column numbers in 2D, or in addition their depth coordinates in 3D. Alternatively for some other embodiments, it can also be in floating points, fixed points, rational numbers etc. In the current embodiment, a point id is a positive integer that indexes into its array of coordinates. Alternatively, a point id can be any identifier as long as it uniquely identifies a point within a point set. In one embodiment, it is the starting address of a point's coordinates in memory. In another embodiment, they are computer generated unique ids (GUID). Points' coordinates can be stored in for example arrays or records. And records can be stored in for example arrays, linked lists, or other suitable data structures.

For an affine transformation T, A(T) denotes the left sub-matrix of T, and $\vec{t}$(T) denotes the displacement component of T. An affine transformation is said to be nD if the dimension of the associated space is $R^n$. The representation of an nD affine transformation in homogeneous coordinates is an (n+1)-by-(n+1) matrix. T($\vec{x}$) denotes the image obtained by applying an affine transformation T to a point $\vec{x}$, and A(T)($\vec{x}$) denotes the image obtained by applying the left sub-matrix of T to $\vec{x}$. Similarly, ifs is a set, then T (s) denotes the set obtained by applying the affine transformation T to each point of the set, and A(T)(s) denotes the set obtained by applying the left sub-matrix of T to each point of the set s. Given two affine transformations $T_1$, $T_2$, the difference of the left sub-matrices of $T_1$, $T_2$ is either A ($T_1$)–A($T_2$) or equivalently A ($T_1$–$T_2$).

In nD, an (n+1) combination of a point set is a subset of the point set containing n+1 distinct points, where in 2D they are not all on the same line and in 3D they are not in the same plane. An (n+1) combination in general position can define a simplex in nD. For example, in 2D, three non-collinear points define a triangle, and in 3D four non-coplanar points define a tetrahedron. If two (n+1) combinations have n points in common, then they are said to be neighbors. Obviously a pair of neighbor (n+1) combinations contain exactly n+2 distinct vertices altogether. A point of a pair of neighbor (n+1) combinations can refer to any member point of either (n+1) combination. The intersection of a pair of (n+1) combinations refers to the set of points belonging to both (n+1) combinations. In 2D, two 3 combinations having 2 points in common means the corresponding triangles share a common edge, which we will refer to as the common edge of the two 3 combinations. Similarly, in 3D, two 4 combinations having 3 points in common means the corresponding tetrahedra share a common triangle, which we will refer to as the common triangle of the two 4 combinations. A mapped (n+1) combination is an (n+1) combination that contains n+1 non-isolated (defined later) points. The correspondent of a mapped (n+1) combination is defined to be the set of points consisting of the correspondents of all members of the (n+1) combination. Similarly, the correspondent of an edge refers to the edge whose two end points are the first edge's end points' correspondents.

In nD, an (n+2) combination in a point set is a subset of the point set containing n+2 distinct points, where in 2D they are not all on the same line and in 3D they are not all in the same plane. A mapped (n+2) combination is an (n+2) combination that contains n+2 non-isolated points. The correspondent of a mapped (n+2) combination is defined to be the set of points consisting of the correspondents of all members of the (n+2) combination.

A "common line" refers to the line passing through a common edge (of a pair of 3 combinations) in 2D, and a "common surface" refers to the surface passing through a common triangle (of a pair of 4 combinations)) in 3D. Moreover, depending on the context "common hyperplane" refers to either a common edge in 2D or a common triangle in 3D.

In this document, in 2D, a 3 combination is often denoted by a tuple. For example, a 3 combination denoted by ($i_1$, $i_2$, $i_3$) contains three distinct points $i_1$, $i_2$, $i_3$. A 3 combination can contain for example the vertices of a triangle. Similarly, in 3D a tuple containing four points is used to denote a 4 combination, which for example could contain the vertices of a tetrahedron. A line segment is often denoted by a tuple containing a pair of end points. For example, ($p_1$, $p_2$) represents a line segment whose two end points are $p_1$ and $p_2$. This notation is also used to denote a correspondence between two points each belonging to a different point set. The exact meaning shall be clear from the context. When an n+2 or n+1 combination is denoted by a tuple, an order among the points is not assumed unless it is either specified in the context or in its notation, for example by adding an overhead arrow to a tuple of two elements to denote an oriented line segment.

In this document, a one-to-one mapping is a correspondence between two point sets such that for each point in one point set there is at most one corresponding point in the other point set. A point of either point sets is either an isolated point, or is associated with a unique point in the other point set. This is called a correspondence with each point being the other's correspondent. Together the two points are referred to as the end points of the correspondence. In either point set a point with no correspondent is called an isolated point. A one-to-one mapping between two point sets in $R^n$ can also be represented by a displacement field, where to each non-isolated point of one point set there is attached a displacement vector, such that the point's correspondent's location coordinates can be calculated by adding the displacement vector to the point's location coordinates.

In this document, given two point sets, a "MatchPair" includes an n+2 combination in the first point set, an n+2 combination in the second point set, and a suitable one-to-one mapping between them. For the one-to-one mapping to be suitable, it needs to map n+1 combinations to n+1 combinations without changing their orientations. In addition, either one of the n+2 combinations defines at least a pair of neighbor n+1 combinations by specifying the vertices of either the common hyperplane or each of the n+1 combinations (thus the MatchPair includes one or more pairs of suitably one-to-one mapped neighbor (n+1) combinations), or it includes one or more local distance measures or weights, or combinations thereof.

In 2D, this means it maps a triangle to another triangle, and it doesn't change the orientation in the sense that if one traverses the vertices of a first triangle in for example the counter clockwise order, and at the same time traverses the correspondents, it would be in the same order with regard to the other triangle. Equivalently, if one takes any two vertices from the first triangle, arbitrarily assigns an orientation to the edge between the two vertices by selecting one vertex as the tail and the other as the head, records to which side of the oriented edge the remaining vertex of the first triangle is to, then induces an oriented edge whose tail is the original tail's correspondent and head is the original head's correspondent, the correspondent of the remaining vertex needs to be to the same side (i.e., left or right or on) of the induced oriented edge. The same applies to 3D if one replaces "oriented edge" with "oriented triangle".

Figure 6:
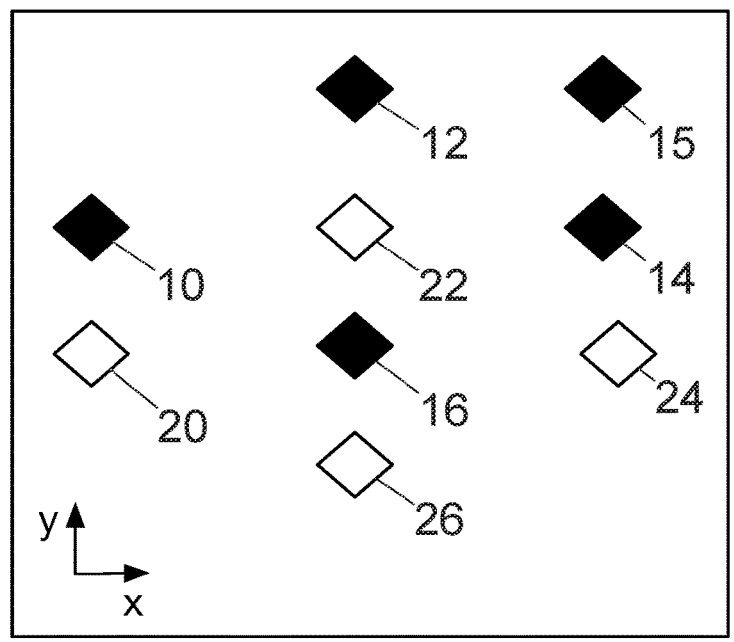
FIG. 6 shows in 2D two spatial point sets, where the first point set is represented by white diamonds, and the second point set is represented by black diamonds.

For example, referring to the two point sets shown in FIG. 6. The first point set consists of points 20, 22, 24, 26 represented by white diamonds. The second point set consists of points 10, 12, 14, 15, and 16 represented by black diamonds. In FIGS. 7a-7d, dashed lines are used to represent correspondences, solid (directed) curves are used to represent (oriented) common edges. Common edges shall be regarded as straight in computation, but in the figures they are drawn as curves to avoid overlapping with correspondences and collisions with points. Induced (oriented) common edges are also represented by solid (directed) curves.

Figure 7A:
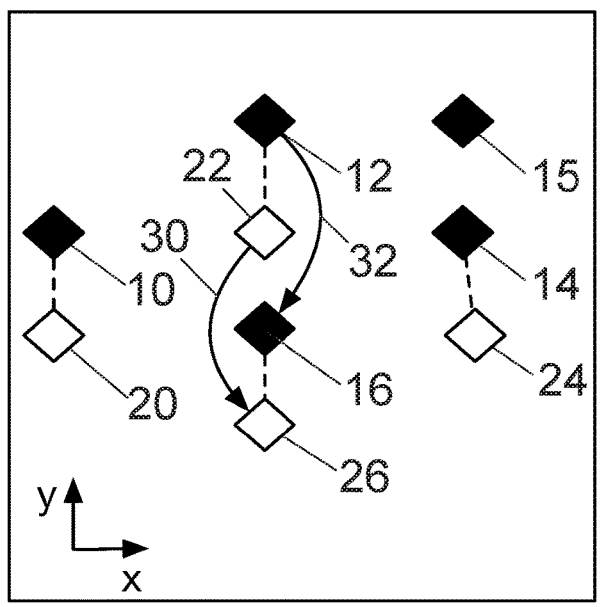
FIGS. 7a-7d are illustrations in 2D, each including a suitable one-to-one mapping between and some isolated points of the points shown in FIG. 6 as the results of using different common edges.

Orientations and induced common edges are shown for illustration purposes. They are not the necessary parts of a generated MatchPair. FIG. 7a illustrates a suitable MatchPair between the two sets of points shown in FIG. 6 consisting of the following correspondences: (20, 10), (22, 12), (26, 16), (24, 14), a common oriented edge 30 from point 22 to point 26, and an induced common oriented edge from point 12 to point 16. It is suitable since points 14 and 24 are to the same side of oriented edge 32 and 30 respectively, and points 10 and 20 are to the same side of oriented edges 32 and 30 respectively. On the other hand, the mapping in FIG. 7e consists of the following correspondences: (20, 10), (22, 14), (24, 12), (26, 16), common oriented edge 30 from 22 to 26, and an induced common oriented edge 40 from 14 to 16. It is not suitable because point 24 is to the left of common oriented edge 30, and its correspondent point 12 is to the right of the induced common oriented edge 40. FIG. 7f illustrates another example of an unsuitable one-to-one mapping. FIG. 7f consists of correspondences: (20, 14), (22, 12), (24, 10), (26, 16), common oriented edge 30 from point 22 to 26, and an induced common oriented edge 42 from 12 to 16. It is not suitable because point 20 and its correspondent 14 are not to the same side of the respective oriented edges.

A person of ordinary skill in the art will know that numerically the signed area (or one of its equivalents) is usually used to check the sideness of a point to an oriented line segment, and the signed volume (or one of its equivalents) is usually used to check the sideness of a point to an oriented triangle. In the current embodiment it is carried out in integer arithmetic. In general it is used if input coordinates either are given either as integers or can be converted to integers when resultant errors are within tolerance. In this case, a signed area of 0 means that the three points involved are collinear, and a signed volume of 0 means that the four points involved are coplanar. If it involves more than the integer arithmetic, for example if the rational arithmetic, the floating point arithmetic, or the fixed point arithmetic is used, collinearity or coplanar happens when the magnitude is close to zero with regard to a predetermined threshold within which one of skill in the art would consider to be zero in terms of its effects or results. We will refer to both cases as being "substantially 0". Moreover, the current embodiment omits the constant fractional coefficients, i.e. the ½ in computing signed areas, and the ⅙ in computing signed volumes, so that the results are integers.

In the current embodiment in MATLAB®, the exemplary code below computes twice the signed area of three points in 2D:

function [ret]=SignedArea2D(a, b, c)
% Inputs:
%
% a, b, c are all arrays of length 2 containing the xy coordinates
%
% Output:
%
% 2 times the signed area
%

$ret=(b(1)-a(1))*(c(2)-a(2))-(c(1)-a(1))*(b(2)-a(2));$

In 3D, in the current embodiment in MATLAB®, the exemplary code below computes six times the signed volume of four points in 3D:

function [ret]=SignedVolume3D(a, b, c, d)
% Inputs:
%
% a, b, c, d are arrays of length 3 containing the xyz coordinates
%
% Output:
%
% 6 times the signed volume
%

$v1=d-a;$ $v2=b-a;$ $v3=c-a;$ ret=det([v1; v2; v3]);

This essentially computes $\vec{v}_1 \cdot (\vec{v}_2 \times \vec{v}_3)$. In both functions, the order of the input arguments matters, for example by swapping the order of any two adjacent input arguments it changes the sign of the result.

A "PreMatchPair" includes at least an n+2 combination in the first point set and an (n+2) combination in the second point set. But it either doesn't have a suitable one-to-one mapping between them, or doesn't have a pair of neighbor (n+1) combinations defined for either of the (n+2) combinations, or it lacks both.

Detailed Description—Graph Construction Unit

FIG. 2 is a block diagram of an exemplary embodiment of a Matching Unit (MU) 100. As shown in FIG. 2, MU 100 includes an Optimization Unit (OU) 102, a Graph Construction Unit (GCU) 106, and a Merging Unit (MU) 108. FIGS. 2-5 illustrate the system according to functional units. In the current embodiment, MU 100 and its components are implemented as software running on the computing device shown in FIG. 16. Alternatively various components can be implemented in the form of software, hardware, firmware, ASIC, or combinations thereof.

Figure 4:
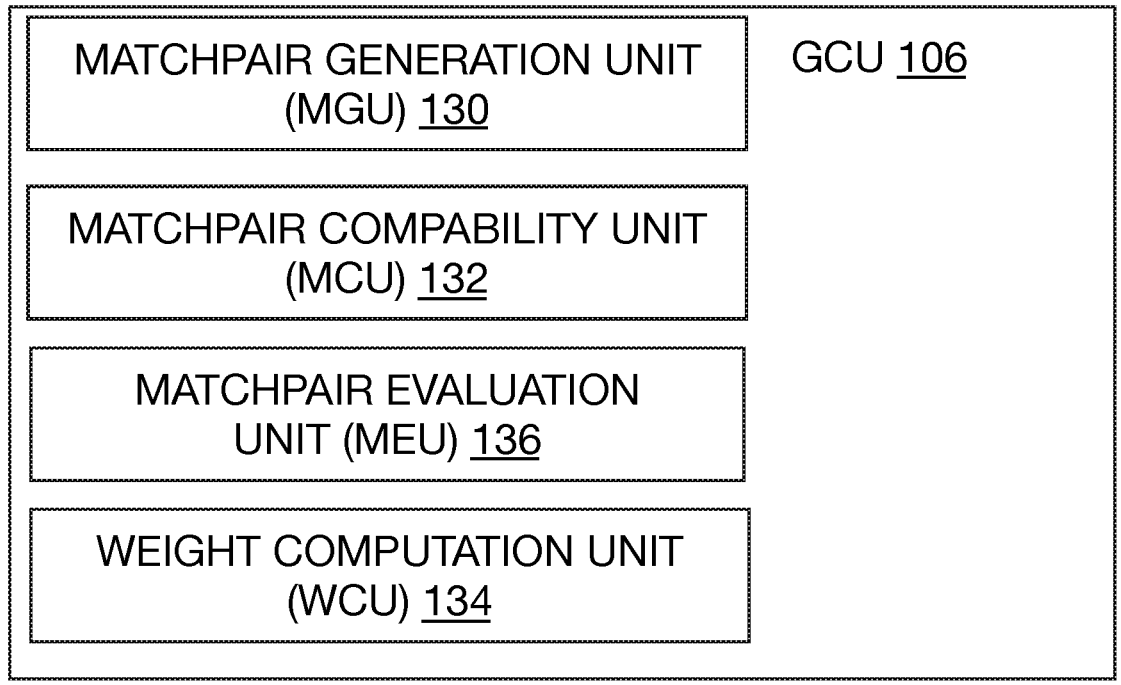
FIG. 4 is a block diagram of a Graph Construction Unit according to one embodiment.

FIG. 4 shows an exemplary embodiment of GCU 106, which includes a MatchPair Generation Unit (MGU) 130, a MatchPair Compatability Unit (MCU) 132, a MatchPair Evaluation Unit (MEU) 136, and a Weight Computation Unit (WCU) 134. According to some embodiments, GCU 106 receives a first and a second spatial point sets in nD, and uses MGU 130 to generate one or more MatchPairs between the first and the second point sets. It then uses MEU 136 to compute a local distance measure for each of the MatchPairs, and WCU 134 to convert the local distance measure to a weight that is inversely related to the local distance measure. It also uses MCU 132 to compute the compatibilities between each pair of the MatchPairs. With the MatchPairs, their weights, and their compatibilities, GCU 106 constructs an undirected graph with its vertices corresponding to the MatchPairs, its edges representing the compatibilities, and its graph vertices assigned the weights.

As a person who is ordinarily skilled in the art knows, an undirected graph can be represented by various data structures such as the adjacency matrix, or the adjacency list, etc.

The graph representation is either compatible with OU 102 or it needs to be converted to be compatible.

Detailed Description—Matchpair Generation Unit

Figure 10A:
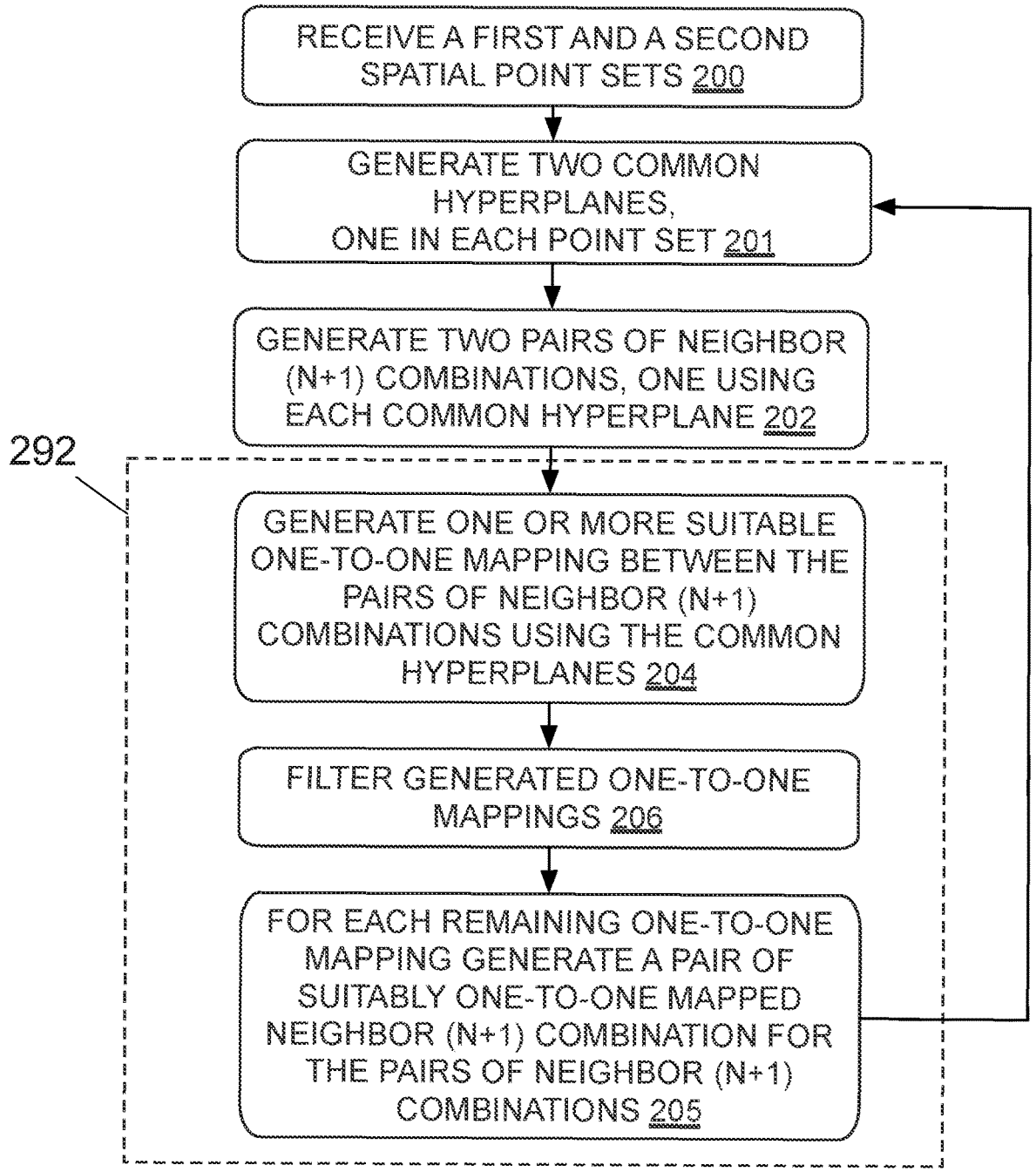
FIGS. 10a-10d illustrate exemplary processes implemented by MGU 130 for generating one or more MatchPairs according to various embodiments.
Figure 10B:
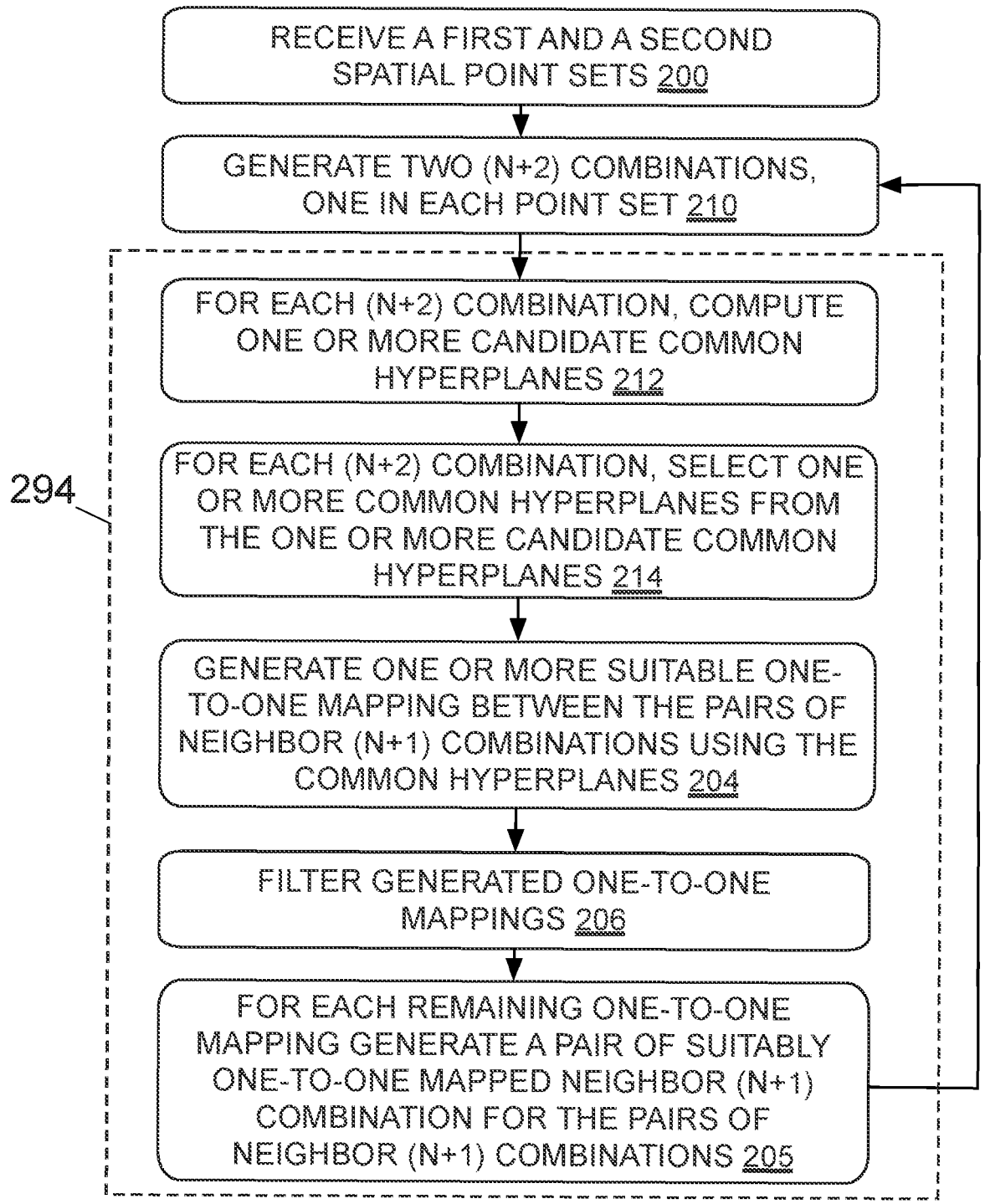
Figure 10C:
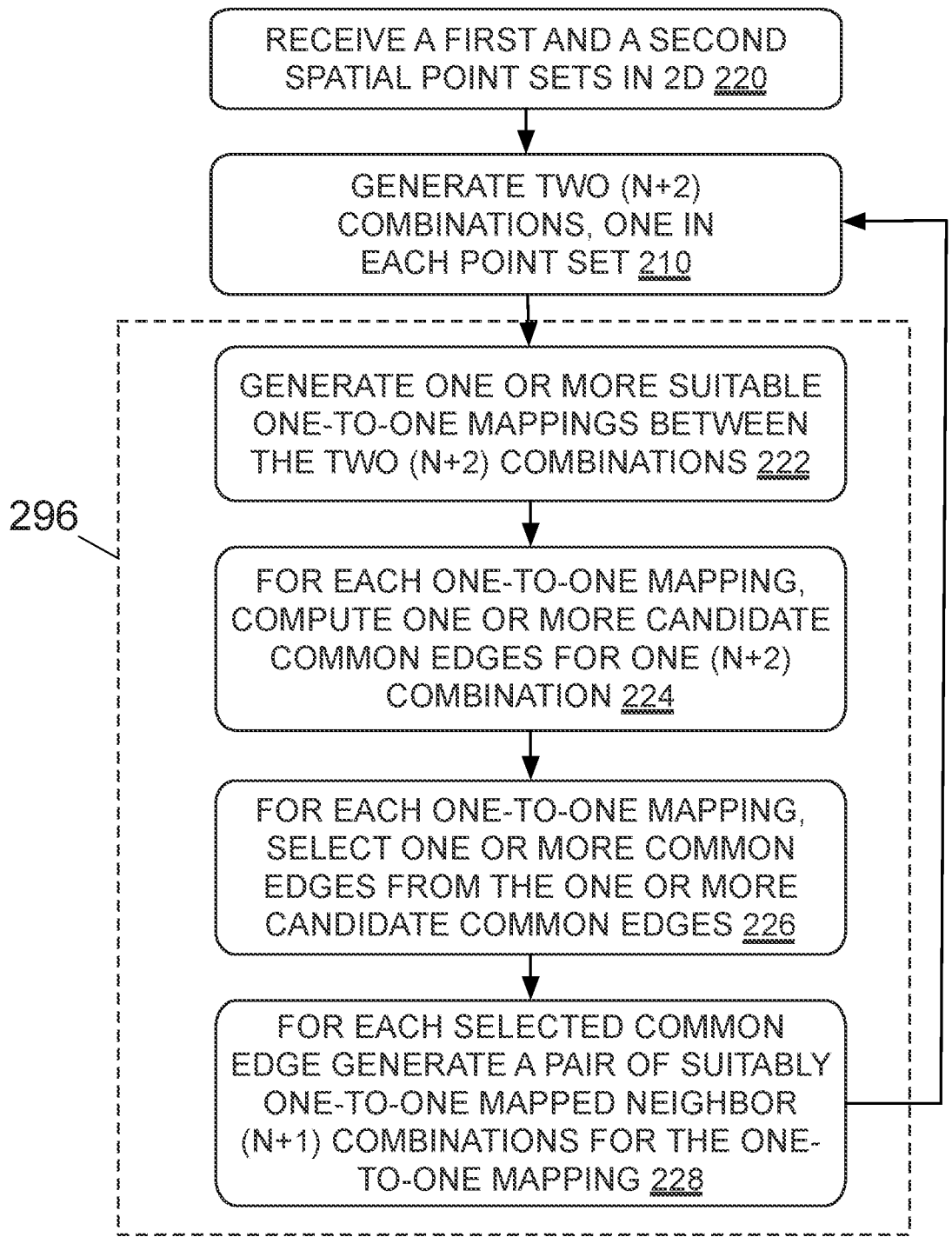
Figure 10D:
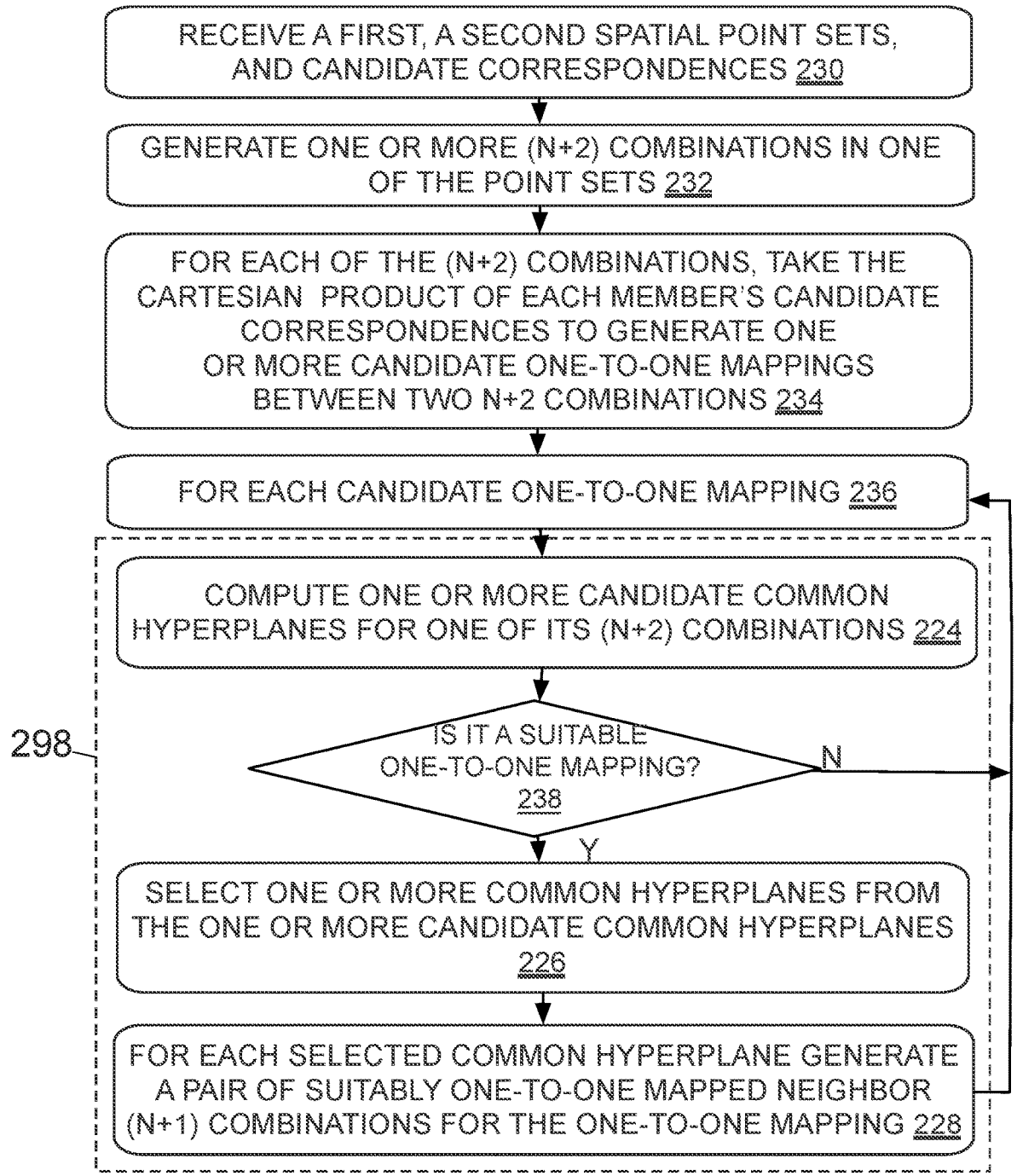

FIGS. 10a-10c show three exemplary processes for generating one or more MatchPairs given two spatial point sets. FIG. 10d shows an additional exemplary process for generating one or more MatchPairs given two spatial point sets and a set of candidate correspondences.

FIG. 10a shows an exemplary process for generating one or more MatchPairs carried out by MGU 130 according to one embodiment. At step 200, MGU 130 receives two spatial point sets.

At step 201, in each point set it computes a common hyperplane which is used at step 202 to generate a pair of neighbor (n+1) combinations. Referring to my previous U.S. Pat. No. 8,811,772 granted Aug. 19, 2014, and U.S. Pat. No. 8,571,351 granted Jun. 3, 2012, there are various approaches to compute a common hyperplane and use it to generate a pair of neighbor (n+1) combinations. For example, in 2D one embodiment uses the Delaunay triangulation to triangulate a point set and iterates through the internal edges of the triangulation to obtain for each internal edge a pair of neighbor triangles that share it. In 3D another embodiment creates 3D Delaunay triangulations of a point set and iterates through the internal triangles of the 3D triangulation to obtain for each internal triangle a pair of neighbor tetrahedra that share it. In this case, step 202 generates PreMatchPairs, each including two pairs of neighbor (n+1) combination.

Alternatively, in another embodiment in 2D, first two distinct points are randomly selected as the end points of a common edge, next a third and a fourth distinct points are selected from the remainders of the first point set, such that neither are located on the line passing through the first two points, and the third and fourth points are to different sides of the line. The same idea can be applied in 3D. For example, first three points in general position are randomly selected from a first point set as the end points of a common triangle, next a fourth and a fifth distinct points are selected from the remainders of the first point set such that neither are in the plane containing the first three points, and the fourth and fifth points are to different sides of the plane.

It then executes a subprocess 292 comprising steps 204, 206, and 205. At step 204, it generates one or more suitable one-to-one mapping between the two neighbor (n+1) combinations using the common hyperplanes. In 2D, it goes as follows according to one embodiment:

1. Map the end points of the common edges.
 2. Specify an orientation for one of the common edge.
 3. Induce an orientation for the other common edge.
 4. Suitably map the remainders.

Alternatively according to another embodiment, at step one, it specifies an orientation for each common edge, at step two it maps the common edges to each other tail to tail and head to head, and at step three it suitable maps the remainders.

For example, again using the two point sets in FIG. 6 as an example. In FIG. 7a, if the first pair of neighbor n+1 combinations comprises points 20, 22, 24, and 26 with (22, 26) being the common edge, and the second pair of neighbor n+1 combinations comprises points 10, 12, 14, and 16 with (12, 16) as the common edge. Suppose it computes a mapping between the common edges such that point 12 is mapped to point 22, and point 16 is mapped to point 26. An orientation is then picked for the first common edge so that originates from point 22 and ends in point 26. We'll denote this as $\overrightarrow{(22,26)}$. This is used to induce an orientation for the other common edge: $\overrightarrow{(12,16)}$. Thus oriented common edge 30 is mapped to oriented common edge 32. At the last step, point 20 is mapped to point 10, since they are to the same side of oriented common edges 30 and 32 respectively. Similarly, point 24 is mapped to point 14.

Figure 7B:
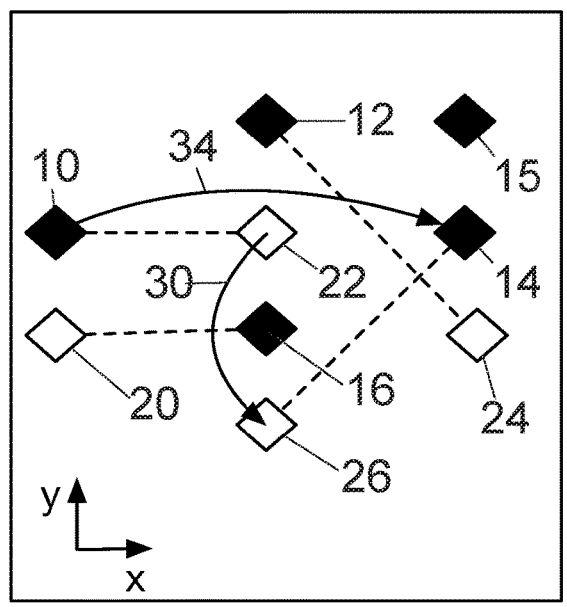
Figure 7C:
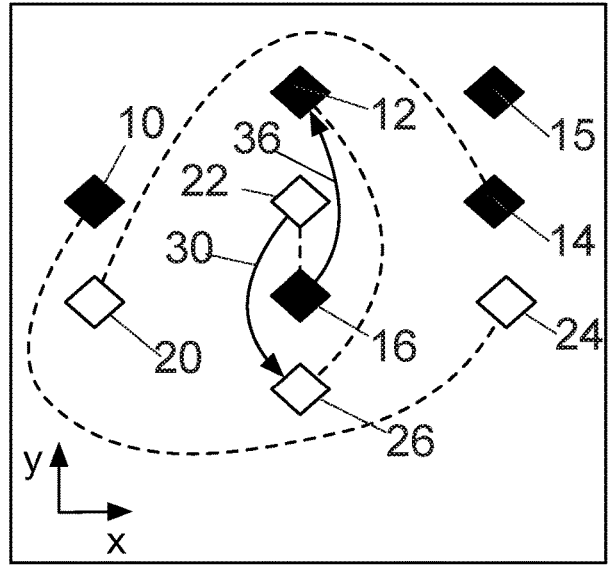
Figure 7D:
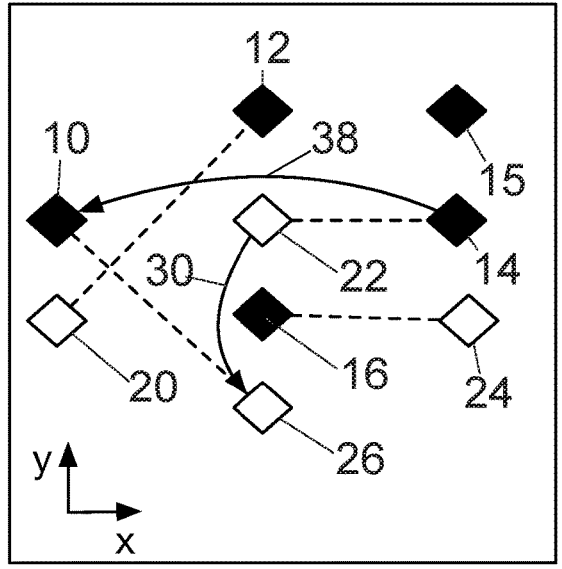
Figure 7E:
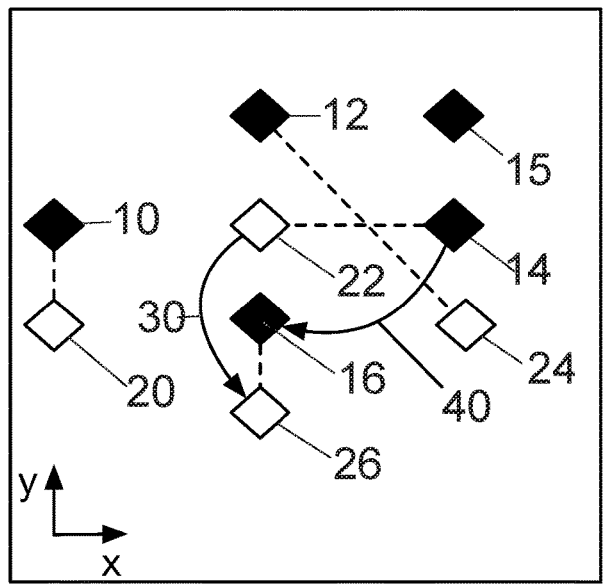
FIGS. 7e-7f illustrates in 2D two unsuitable one-to-one mappings of the points shown in FIG. 6.
Figure 7F:
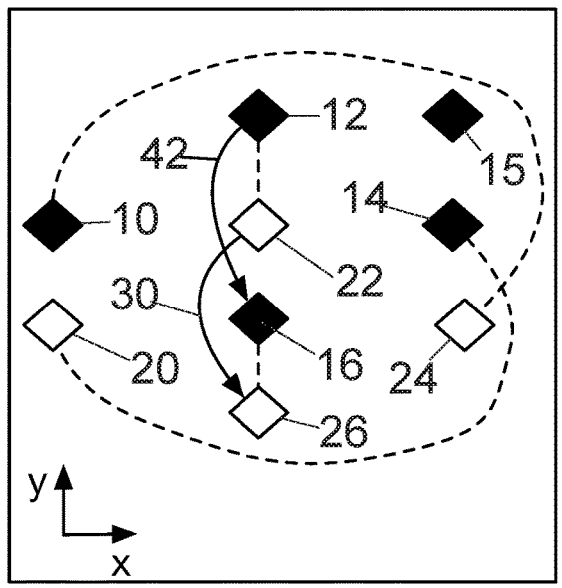

FIGS. 7b-7d illustrate what happens when different common edges or different mappings between the end points of the common edges are used when mapping between the same two (n+2) combinations. In FIG. 7b, oriented common edge 30 is mapped to oriented common edge 34: $\overrightarrow{(10,14)}$, thus point 24 is mapped to point 12, and point 20 is mapped to point 16. In FIG. 7c, oriented common edge 30 is mapped to oriented common edge 36: $\overrightarrow{(16,12)}$, thus point 24 is mapped to point 10, and point 20 is mapped to point 14. Compared this to FIG. 7a, the mappings of the remaining points are swapped as a result of swapping the correspondents of the end points of the common edge. Finally in FIG. 7d, oriented common edge 30 is mapped to oriented common edge 38: $\overrightarrow{(14,10)}$, thus point 24 is mapped to point 16, and point 20 is mapped to point 12.

Embodiments may keep one or more of such mappings for the same MatchPair or generate two MatchPairs, or discard one or more of them according to various criteria discussed later at step 206. If an embodiment keeps two or more mappings for the same MatchPair and use them to generate one or more pairs of suitably one-to-one mapped neighbor (n+1) combinations, its local distance measure could be the sum or average of the local distance measures of them.

In 3D it computes a suitable one-to-one mapping according to some other embodiments:

1. Map the vertices of the common triangles.
 2. Specify an orientation for one common triangle.
 3. Induce an orientation for the other common triangle.
 4. Suitably map the remainders.

The first step generates a one-to-one mapping to map the vertices of the common triangles. Without restrictions in 3D there are six possible ways to map the vertices. Embodiments may keep all or discard one or more of the six possible mappings base on embodiment specific, application specific, or feature specific criteria. For example, the angle between the normals of the two triangles or the displacements of each of the three vertices. More discussions will be made later.

Alternatively according to another embodiment at above step one it specifies the orientations for the common triangles, at step two it maps the vertices of the common triangles (three possible mappings given that the orientations are aligned with each other), and at step three it suitably maps the remainders.

At step 206, further restrictions can be applied at this step to discard certain one-to-one mappings according to various application specific, feature specific, or embodiment specific conditions. For example in tracking, equipped with modern sensors and processors, and assuming sufficient computation power, usually more than 10 measurement frames are generated or fused per second. At such rates, between any two consecutive frames the changes in objects' (e.g. pedestrians' or vehicles') poses are limited. An embodiment may assume that a common oriented edge can't change its orientation by more than a predetermined angle-changing threshold. The cosine of the angle can be computed by dividing their dot products by the product of the lengths of each oriented common edges. Similarly in 3D, an embodiment may assume that the normals of the common oriented triangles can't change their orientations by more than a predetermined angle-changing threshold.

For example, refer to FIGS. 7a and 7c and assume there is a predetermined angle-changing threshold of less than 90 degrees. In FIG. 7a, oriented edge 30's respondent is oriented edge 32. According to the criterion it stays since the angle between the two oriented edges is smaller than the threshold. On the other hand, in FIG. 7c, oriented edge 30's correspondent is oriented edge 36, thus it is discarded because it changes by about 180 degrees. Here the 90 degrees is used just as an example, and in practice such limits could come from sources such as historical statistics or vehicle speed limits and kinematics. As another example, an embodiment may assume that there is an upper bound that bounds the relative displacements between two objects of certain types between two consecutive frames, and it checks whether the ratio of or the difference between the lengths of a common edge and its correspondent is within the bound.

As another example, in localization, equipped with a GPS (Global Positioning System) tracker, a vehicle can locate itself with an error of about say for example 10 meters. Assuming this and counting in measurement noises, in 2D or 3D, some embodiments may restrict the distance between any point and its correspondent to be no more than for example 12 or 15 meters.

At step 205, for each remaining one-to-one mapping that is not filtered out, record it together with a common hyperplane of one of the pairs of neighbor (n+1) combinations (or alternatively one pair of neighbor (n+1) combinations) to generate a pair of suitably one-to-one mapped neighbor (n+1) combinations. This is used to generate a MatchPair. It then loops back to step 201 to process the next two common hyperplanes. As one skilled in the art knows, alternatively instead of using a loop, step 201 can be carried out multiple times to generate a batch of elements, where each element comprises two common hyperplanes. Each of the following steps 202, 204, 206, and 205 can be performed on all elements of the batch in sequence, in parallel, or in combinations thereof before proceeding to the next step.

One skilled in the art will appreciate that, for this and other processes, steps may be implemented in different orders. For example, restrictions such as the displacement criterion and/or the angle changing criteria can be applied to the mappings between the vertices of the common edges or common triangles instead at the beginning of step 204 before mapping the remainders.

FIG. 10b shows an exemplary process for generating one or more MatchPairs carried out by MGU 130 according to another embodiment. At step 200, MGU 130 receives two spatial point sets.

At step 210, it generates two (n+2) combinations, one in each point set. In one embodiment, it pairs up all possible n+2 combinations in the first point set with those in the second point set and iterates through them one pair at a time. Alternatively in another embodiment, it pairs up elements of the set of (n+2) combinations including for each point an n+2 combination consisting of itself and its n+1 closest neighbors in the same point set with those in the other point set and iterates through them one pair at a time. In yet another embodiments, it pairs up elements of the set of (n+2) combinations including for each point all n+2 combinations selected from a neighborhood in the same point set with those in the other point set and iterates through them one pair at a time. Such neighborhood could for example be a circle in 2D or a sphere in 3D, where the circle or sphere is centered at the point, and the radius being predetermined. In this case, step 210 generates PreMatchPairs, each including two (n+2) combinations, one in each point set.

If using a scientific computing library, it's likely that such functionality of generating (n+2) combinations from a given point set is already included. For example Matlab® provides function "nchoosek". In Python, "itertools.combinations" is an iterable that can be used to iterate through all combinations. In C++, the STL function next_permutation can be used, see for example the answer to the Stackoverflow question "Generating combinations in c++" retrieved from Stackprinter. Please also refer to the Stackoverflow question "Algorithm to return all combinations of k elements from n" retrieved from Stackprinter for implementing the algorithm.

It then executes a subprocess 294 comprising steps 212, 214, 204, 206, and 205. At step 212, for each of the two (n+2) combinations it computes one or more candidate common hyperplanes.

In 2D, if all points of an (n+2) combination are the vertices of its convex hull, and if restricted to internal edges, then it has two candidate common edges. Some embodiments may also consider edges on the boundary of the convex hull as candidate common edges. We mainly discuss using internal edges as candidate common edges, but we don't exclude using boundary edges as candidate common edges. When one of the n+2 points is in the interior of the convex hull of the other n+1 points, there are three candidate common edges, each of them separating two of the three internal triangles. In 3D the situation is more complex. Referring for example to "Delaunay Triangulation in 3D" by Pavel Maur, (2002), given five points in 3D such that no four points are co-planar and all five points are the vertices of their convex hull, there can still be two possible triangulations, where one of them generates two tetrahedra (we'll refer to this as type I), and the other generates three tetrahedra (we'll refer to this as type II). If required, type II candidate common triangles can be computed when we know the vertices of a type I common triangle. Otherwise it is not hard to modify the above algorithm for the purpose. Similar to 2D, although we mainly discuss using internal triangles as candidate common triangles, we don't exclude using boundary triangles.

In 3D, when one point is in the interior of the convex hull of the other four points (we'll refer to this as type III), there are six candidate common triangles and each of them separates two of the four internal tetrahedra. For example referring to FIG. 19, It shows in 3D an n+2 combination 280, 282, 284, 286, and 288, where point 286 is an interior point of the others' convex hull. It shows all edges between all pairs of vertices and four candidate common triangles. Candidate common triangle (280, 282, 286) separates tetrahedra (280, 282, 286, 284) and (280, 282, 286, 288), candidate common triangle (280, 284, 286) separates tetrahedra (280, 282, 286, 284) and (280, 284, 286, 288), candidate common triangle (280, 288, 286) separates tetrahedra (280, 282, 286, 288) and (280, 284, 286, 288), and candidate common triangle (284, 288, 286) separates tetrahedra (284, 282, 286, 288) and (280, 284, 286, 288).

In 2D there are standard algorithms for computing convex hulls and return the vertices in a certain order (e.g. counterclockwise) given an (n+2) combination. It is not hard to extend such methods to report the candidate common edges. Examples include the gift wrapping algorithm and the Graham algorithm. Please refer to standard literatures, for example the book "Computational Geometry in C" by O'Rourke for more details. Alternatively, the following custom algorithm can be used, it is inspired by Graham's algorithm, we'll refer to this as the "common edge algorithm":

1. Pick an extreme point $p_0$ on the hull. For example it could be the point with the smallest y coordinate, and if there are multiple such points pick the one with largest x coordinate. This step is similar to the Graham's algorithm, and it is understood that one can instead pick the leftest of lowest, the lowest of leftest, the leftest of highest points, etc.
2. Sort the remaining three points according to their signed areas with respect to $p_0$. Let the sorted points be denoted by $\alpha$, $\beta$, $\gamma$ in the order. At this step it can be detected if there are three collinear points including $p_0$ (when two of them have substantially the same signed area 0 w.r.t. $p_0$), or if all four points are collinear (when signed areas w.r.t. $p_0$ are substantially 0). This step is also similar to the Graham's algorithm.
3. This step deviates from the Graham's algorithm to take advantage of the small size of the problem. At this step, one checks whether the $\beta$ is to the same side of edge ($\alpha$, $\gamma$) as $p_0$, on the edge, or to a different side. If they are to the same side, then $\beta$ is an interior point, and $p_0$, $\alpha$, $\gamma$ are the vertices of the convex hull. ($p_0$, $\beta$), ($\alpha$, $\beta$), ($\gamma$, $\beta$) are the candidate common edges (again assuming it's restricted to internal edges). If on the edge, then $p_0$, $\alpha$, $\gamma$ are the vertices of the convex hull. If an embodiment allows this case, the candidate common edge is ($p_0$, $\beta$). Otherwise, all of its points are the vertices of its convex hull, and ($p_0$, $\beta$), ($\alpha$, $\gamma$) are the candidate common edges.

To compare any other two points according to their signed areas w.r.t. $p_0$, one can compute their signed area with $p_0$. Denote the two other points as m, n. If the signed area of ($p_0$, m, n) is positive, m precedes n (It's also OK to say n precedes m as long as it's used consistently). If it is negative, n precedes m. And if the result is substantially 0, they are collinear, and in this case one may further check the x or y coordinates to tell which point is in the middle.

At the third step, one only need to compute one signed areas, since the signed area of either ($p_0$, m, n) or ($p_0$, n, m) has already been computed at above step 2 when sorting the points.

Referring to FIGS. 11a and 11b they visual illustrates the steps according to an alternative embodiment of the above algorithm. They show an n+2 combination in 2D consisting of four points 250, 252, 254, and 256. At the above first step, it picks the leftest point 250 as $p_0$. At the above second step, the remaining points are sorted according to their counterclockwise angle from the vertical ray emanating from $p_0$ downwards. As a result: $\alpha$=256, $\beta$=254, $\gamma$=252. At the above third step as shown in FIG. 11b, since the signed area of ($\alpha$=256, $\gamma$=252, $\beta$=254) is negative, and the signed area of ($\alpha$=256, $\gamma$=252, $p_0$=250) is positive, points 254 and 250 are to different sides of edge (256, 252). Thus all of the n+2 combination's points are the vertices of its convex hull, and the candidate common edges are (250, 254) and (252, 256).

In 3D, there are standard algorithms to compute convex hulls. It is not hard to extend them by carrying out various tests to find type I, type II, or type III candidate common triangles. For example referring to the slides of "Convex Hulls (3D)" by Michael Misha Kazhdan. In 3D, the gift wrapping algorithm first finds a triangle on the surface of the convex hull and then iteratively pivots around the boundary edges until all surface triangles are found. Now apply it to an (n+2) combination in 3D. If in the end it finds six surface triangles, then all points are the vertices of its convex hull, and the boundary edges include all edges between any two vertices except for the one that passes through the interior of the convex hull. Take two end points of the edge, the other three vertices define a candidate common triangle that separates the convex hull into two tetrahedra. Otherwise a point is either in the interior of a surface triangle or in the interior of the convex hull. Referring to function "PivotAroundEdge" in the slides, it is not hard to extend the algorithm at the branch that compares areas when the volume is 0 to keep record of points that are in the interior of a surface triangle.

In another embodiment, the following custom method is used. In this document it'll be referred to as the "common triangle algorithm":

1. Compute an edge on the hull, we will denote it as ($p_0$, $p_1$).
2. Sort the other three points according to their signed volumes with respect to $p_0$ and $p_1$. To compare any two other points by signed volumes, let's denoted them by m and n, and compute the signed volumes of ($p_0$, $p_1$, m, n). if it is positive, m precedes n (it's also OK to say n precedes m as long as it's used consistently). If it is substantially 0, then the four points are coplanar. Otherwise n precedes m. Denote the sorted points as $q_2$, $q_3$, $q_4$ in the order.
3. Check if line segment ($q_2$, $q_4$) passes through the interior of the triangle whose vertices are the other three points, i.e., $q_3$, $p_0$, $p_1$. If the answer is yes, then the other three points are the vertices of the type I common triangle that separates the n+2 combination into two tetrahedra.
4. Otherwise, repeats steps 2 but this time use ($q_2$, $q_4$) as the edge on the hull to sort the other three points. Since the signed volume of either ($p_0$, $p_1$, $q_2$, $q_4$) or ($p_0$, $p_1$, $q_4$, $q_2$) has already been computed it can be reused. This time denote the point with the median signed volume as $\beta$.
5. Check if $\beta$ is one of $p_0$ or $p_1$. If the answer is no, then $\beta$ is an interior point. Otherwise $\beta$, $q_2$, $q_4$ is the type I common triangle that separates the n+2 combination into two tetrahedra.

Exemplary algorithms for computing an edge on the hull and computing the signed volume (alternatively the "signed perpendicular height" or equivalents) can be found in slides "Convex Hulls (3D)" by Michael Misha Kazhdan. For example, function "FindEdgeOnHull" is used to compute an edge on the hull. The function first finds an extreme point on the hull, which is returned by function "BottomMostLeftMostBackMost" (assuming bottom means the lowest z value). Next it defines a line parallel to the x axis that passes through the extreme point, and then iterates through the remaining points to find a remaining point such that the angle between the plane passing through the line and the remaining point, and the reference plane passing through the line that is also orthogonal to the z axis is the smallest from one side. Alternatively, various extreme points and correspondingly different reference planes can be used.

In this document the "common hyperplane algorithm" will be used to refer to either the common edge algorithm in 2D or the common triangle algorithm in 3D. The exact reference shall be clear from the context.

According to an answer to the Stackoverflow question "Intersection between line and triangle in 3D" by Bruno Levy, one way to check whether a line segment ($q_2$, $q_4$) passes through the interior of a triangle whose vertices are (a, b, c) is to compute the signed volumes of the three tetrahedra: ($q_2$, $q_4$, a, b), ($q_2$, $q_4$, b, c), ($q_2$, $q_4$, c, a)

(alternatively to compute the signed volumes of the three tetrahedra: ($q_4$, $q_2$, a, b), ($q_4$, $q_2$, b, c), ($q_4$, $q_2$, c, a) or their respective equivalents). When all have the same signs and none are substantially 0, the line segment passes through the interior of the triangle. If any is substantially 0, then it is degenerate with at least four points in the same plane. An embodiment may extend the common triangle algorithm to report such situations.

For example referring to FIG. 24, It shows in 3D an n+2 combination 260, 262, 264, 266, 268, where all points are the vertices of their convex hull. It also shows all edges on the hull. The only edge between two vertices that is not on the hull is (262, 266) (not shown). Now refer to FIGS. 17a-17b, they show in 3D the same n+2 combination 260, 262, 264, 266, 268. In FIG. 17a, let's assume that at above step 1 line segment (260, 262) is computed as the edge on the hull, and $p_0$=260, $p_1$=262. At above step 2, the other points are sorted in the order of 268, 266, 264.

Next as illustrated in FIG. 17b, at above step 3, it checks if line segment ($q_2$=268, $q_4$=264) passes through the interior of the triangle whose vertices are 260, 262, 266. Since it does not, at above step 4, ($q_2$, $q_4$) is used sort the other points. Among them, point 260 has the median signed volume. Since β=260=$p_0$, it is not an interior point, the type I common triangle's vertices are β=260, $q_2$=264, $q_4$=268, and it separates this n+2 combination into two tetrahedra. For another example referring to FIGS. 18a-18b. They again show in 3D the n+2 combination 260, 262, 264, 266, 268. Assuming that this time at above step 1, an embodiment computes line segment (260, 264) as the edge on the hull, and $p_0$=260, $p_1$=264. At above step 2, the other points are sorted in the order of 262, 268, 266. Next as illustrated in FIG. 18b, at above step 3, it checks if line segment ($q_2$=262, $q_4$=266) passes through the interior of the triangle whose vertices are 268, 264, 260. Since the answer is yes, 268, 264, 260 are the vertices of the type I common triangle that separates the n+2 combination into two tetrahedra.

For another example referring to FIG. 19. It shows in 3D an n+2 combination 280, 282, 284, 286, and 288, where point 286 is an interior point. It also shows all edges between each pairs of vertices. FIG. 20a shows the same (n+2) combination as in FIG. 19. At above step 1 assume that points 280 and 282 are computed as the edge on the hull, and assume that ($p_0$=280, $p_1$=282). At above step 2, the remaining points are sorted in the order of 288, 286, 284. Next as illustrated in FIG. 20b, at above step 3, it is checked if line segment ($q_2$=288, $q_4$=284) passes through the interior of the triangle whose vertices are 280, 282, 286 and the answer is no. At above step 4, ($q_2$, $q_4$) is used sort the other points. At above step 5, among them, point 286 is checked to have the median signed volume. Since β=286 is neither $p_0$ nor $p_1$, it is an interior point.

FIGS. 21a-21b show yet another example using the n+2 combination shown in FIG. 19. FIG. 21a shows the same (n+2) combination as in FIG. 19. Assume at above step 1 line segment (282, 284) is computed as the edge on the hull, and assume that $p_0$=282, $p_1$=284. At above step 2, the remaining points are sorted in the order of 288, 286, 280. Next as illustrated in FIG. 21b, at above step 3, it checks if line segment ($q_2$=288, $q_4$=280) passes through the interior of the triangle whose vertices are 282, 284, 286 and the answer is no. At above step 4, ($q_2$, $q_4$) is used sort the other points. At above step 5, among them, point 286 is checked to have the median signed volume. Since β=286 is neither $p_0$ or $p_1$, it is an interior point.

Figure 9A:
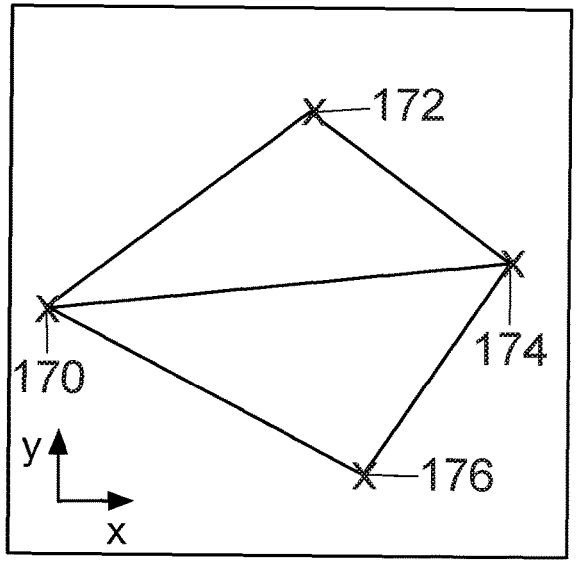
FIGS. 9a-9f show in 2D examples of candidate common edges generated from (n+2) combinations of different geometric configurations.
Figure 9B:
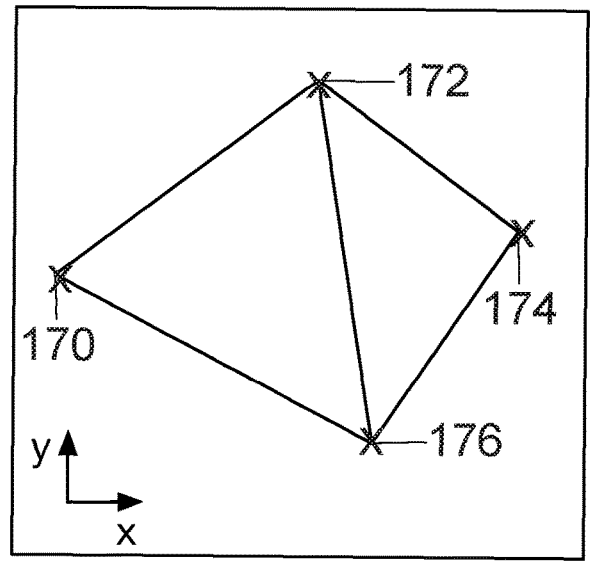

At step 214, for each of the two (n+2) combinations, it selects one or more common hyperplane from the candidate common hyperplanes. Referring to FIGS. 9a and 9b both show an n+2 combination 170, 172, 174, and 176 in 2D such that all of its points are the vertices of its convex hull. If only considering internal edges, a triangulation can be generated by adding a candidate common edge (170, 174) as shown in FIG. 9a, or another edge (172, 176) as shown in FIG. 9b. In one embodiment, both candidate common edges are selected, and two pairs of neighbor (n+1) combinations are generated. Alternatively, in another embodiment, A Max-min angle criterion can be applied like in the Delaunay Triangulation to pick one that maximizes the minimum angle. Referring to "Primitives for the manipulation of general subdivisions and the computation of Voronoi" by Leonidas Guibas and Jorge Stolfi, in 2D, the Circumcircle test is used to test the Max-min angle criterion. Suppose for an (n+2) combination when the vertices of its convex hull are traversed in counter clockwise order one gets $i_1$, $i_2$, $i_3$, and $i_4$ in that order. The test involves computing the determinant of the following matrix:

$$\begin{bmatrix} x_{i_1} & y_{i_1} & x_{i_1}^2 + y_{i_1}^2 & 1 \\ x_{i_2} & y_{i_2} & x_{i_2}^2 + y_{i_2}^2 & 1 \\ x_{i_3} & y_{i_3} & x_{i_3}^2 + y_{i_3}^2 & 1 \\ x_{i_4} & y_{i_4} & x_{i_4}^2 + y_{i_4}^2 & 1 \end{bmatrix}$$

If the determinant is greater than 0, then one chooses the edge between $i_2$ and $i_4$. If the determinant is smaller than 0, then one chooses the edge between $i_1$ and $i_3$. If it is 0, then either can be used since the four points are all on the same circle.

While in 2D the Max-min and the circle criteria are equivalent, in 3D they are not (see a counter example in "Three-Dimensional Triangulations from Local Transformations" by Barry Joe). In one embodiment steps 212 and 214 may be combined to generate a common triangle that generates two tetrahedra. Alternatively another embodiment may choose a triangulation that generates three tetrahedra and keep all three of the candidate common triangles to generate three pairs of neighbor (n+1) combinations. Alternatively, another embodiment may choose a triangulation that generates three tetrahedra and select from the three possible common triangles one according to one of the various criteria mentioned in "Delaunay Triangulation in 3D" by Pavel Maur, (2002). Examples include the MaxVol criterion: "maximizes relative volume property of tetrahedron", the MaxMinVol criterion: "maximizing minimal volume property of tetrahedron" etc. Alternatively, yet another embodiment may choose one or more of them according to one of the various application specific, feature specific, or embodiment specific conditions as described earlier for step 206 in FIG. 10a.

Figure 9C:
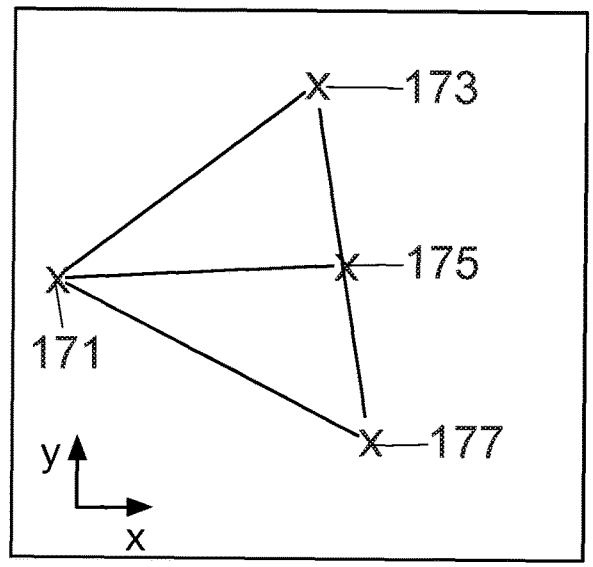

In 2D some embodiments may generate one or more common edges when n+1 of the n+2 points are the vertices of its convex hull and the remaining point is on a boundary edge. Referring to FIG. 9c, it shows an n+2 combination 171, 173, 175, and 177. Points 171, 173, and 177 are the vertices of its convex hull and edge (173, 177) passes through point 175. In this case steps 212 and 214 may be combined to generate a common edge (171, 175). Alternatively, boundary edges can also be considered.

Figure 9D:
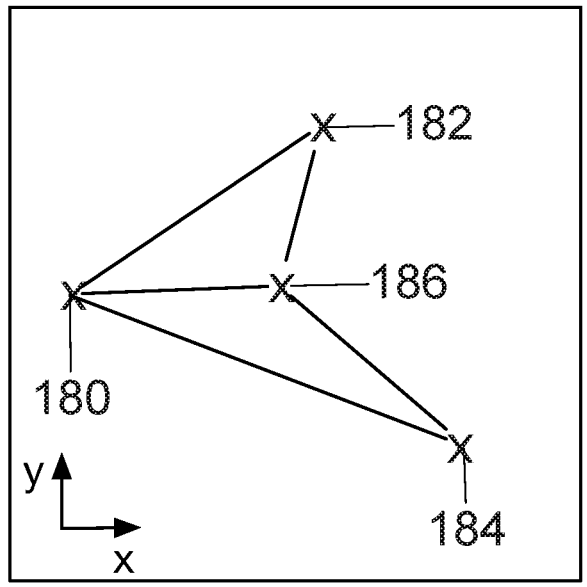
Figure 9E:
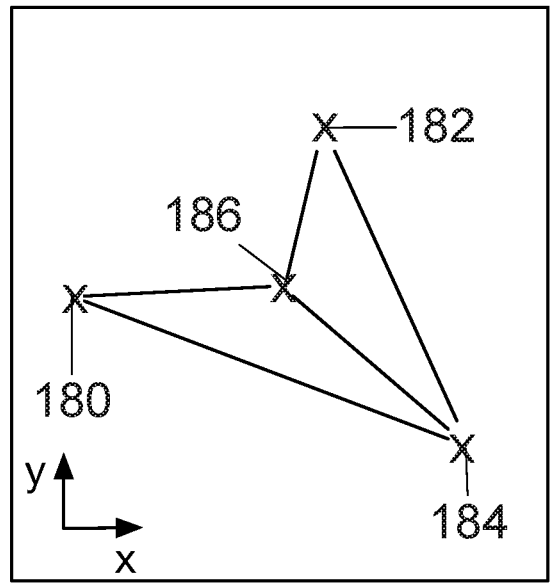
Figure 9F:
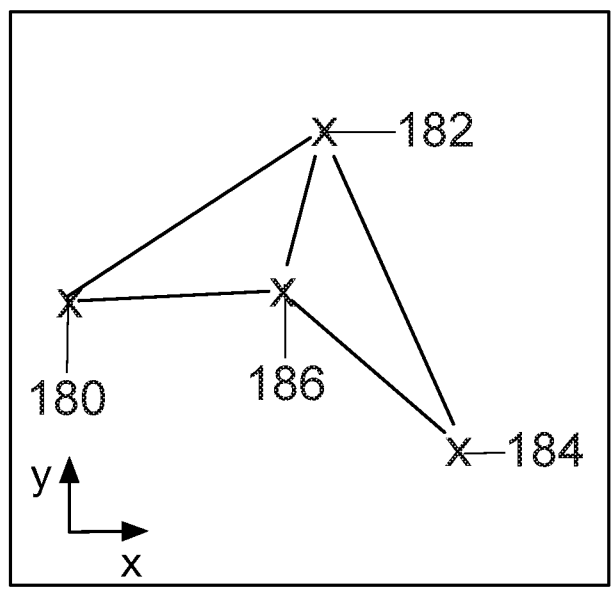

In 2D some embodiments may generate one or more common edges when there is an interior point. FIGS. 9d-9f shows an n+2 combination 180, 182, 184, 186 such that point 186 falls into the interior of the convex hull of points 180, 182, and 184. FIGS. 9*d*-9*f* shows three candidate common edges (180, 186), (184, 186), and (182, 186) along with the pairs of neighbor (n+1) combinations. In this case, according to one embodiment it picks the longest one. Alternatively, it may keep all three thus generate three pairs of neighbor (n+1) combinations.

In 3D where there is an interior point, an embodiment may choose one from the six candidate common triangles according to one of the various criteria mentioned in "Delaunay Triangulation in 3D" by Pavel Maur, (2002). Examples include the MaxVol criterion: "maximizes relative volume property of tetrahedron", the MaxMinVol criterion: "maximizing minimal volume property of tetrahedron", and others etc. Alternatively, another embodiment may choose one according to one of the various application specific, feature specific, or embodiment specific conditions as at step 206 in FIG. 10*a*. Yet another embodiment may keep all candidate common triangles.

Steps 204, 206, and 205 are similar to those in FIG. 10*a*. It then loops back to step 210 to process the next two (n+2) combinations. As one skilled in the art knows, alternatively instead of using a loop, step 210 can be carried out multiple times to generate a batch of elements, where each element comprises two (n+2) combinations, one in each point set. Each of the following steps 212, 214, 204, 206, and 205 can be performed on all elements of the batch in sequence, in parallel, or in combinations thereof before proceeding to the next step.

FIG. 10*c* shows an exemplary process for generating one or more MatchPairs carried out by MGU 130 according to the current embodiment. At step 220, MGU 130 receives two spatial point sets in 2D.

Step 210 is similar to that in the process shown in FIG. 10*b*. It generates at least two (n+2) combinations, one in each point set. In the current embodiment, it pairs up all possible (n+2) combinations in the first point set with those in the second point set and iterates through them one pair at a time. The (n+2) combinations are generated using Matlab's 'nchoosek' method.

It then executes a subprocess 296 comprising steps 222, 224, 226, and 228. At step 222, it generates one or more suitable one-to-one mappings between the two (n+2) combinations generated at step 210 as follows:

1. For each n+2 combination, arrange the boundary vertices as they appear around the boundary of its convex hull according to the same order (e.g. a counter clockwise order or clockwise order or equivalents).
2. Map the circular shifts of one of the arranged vertices to the other. If each contains an interior point, the current embodiment also maps the interior points to each other. Another embodiment may discard this mapping.

At above step 1, for each of the two n+2 combinations, the boundary vertices are arranged in the same order, for example in counter clockwise order, as they appear around the boundary of its convex hull. If both have all of their points being the vertices of their convex hull, we'll refer to this as the first case. Otherwise if both have one interior point, we'll refer to this as the second case. Thus for the first case, arranging the boundary vertices involves arranging all four vertices; and for the second case, arranging the boundary vertices involves arranging all three boundary vertices. The current embodiment uses Matlab's "convhull" method to return the boundary vertices in counter clockwise order. Alternatively a standard convex hull algorithms such as the common edge algorithm, the gift wrapping algorithm, the Graham's algorithm, or one of their variations can be used.

At above step 2, the circular shifts of one of the arranged vertices are mapped to the other to generate up to four suitable one-to-one mappings for the first case, or up to three suitable one-to-one mappings for the second case. The current embodiment generates the maximum for either case using Matlab's "circshift" method.

For example, again using the two point sets in FIG. 6 as an example, but this time to illustrate the steps according to the current process.

Suppose in FIG. 7*a*, the first (n+2) combination comprises points 20, 22, 24, 26, and the second (n+2) combination comprises points 10, 12, 14, 16. At above step 1, since both are of the first case, the vertices of the first n+2 combination is arranged as [20, 26, 24, 22] in counter clockwise order and is stored in an array in memory (alternatively it can be stored in a sequential container such as the vector or the linked list, or an associative container such as the hashmap whose keys are their indices in that order, and values are the point ids), and the vertices of the other n+2 combination is arranged as [10, 16, 14, 12] in the same order. At above step 2, it circularly shifts the second arranged vertices to obtain four arrays of shifted arranged vertices: [10, 16, 14, 12], [16, 14, 12, 10], [14, 12, 10, 16], [12, 10, 16, 14]. Each of the four arrays is mapped to the array of [20, 26, 24, 22] such that the first elements are mapped to each other, the second elements are mapped to each other and so on. Thus four one-to-one mappings are generated according to the current embodiment.

FIG. 7*a* shows one of the resultant one-to-one mappings where one of the circular shifts [20, 26, 24, 22] is mapped to the first arranged vertices [10, 16, 14, 12]. The resultant one-to-one mapping includes four correspondences: (20, 10), (26, 16), (24, 14), and (22, 12). FIG. 7*b*-7*d* show the mappings between the other three circular shifts and the first arranged vertices. In this case, steps 210 and 222 both generates PreMatchPairs.

At step 224, for each of the one-to-one mappings between the two (n+2) combinations computed at step 222, it computes one or more candidate common edges for one of the (n+2) combinations. For the current embodiment, it is assumed that candidate common edges are internal edges. For the first case, using an array of arranged vertices or any of its circularly shifts (if available), one candidate common edge is the line segment between its first and third elements, another candidate common edge is the line segment between its second and fourth elements. For the second case, candidate common edges include all edges between the interior point and any vertex of the hull.

For example again referring to FIG. 7*a*, suppose for the first n+2 combination the arranged vertices is [20, 26, 24, 22]. One candidate common edge is (20, 24) whose end points are the first and the third elements, and the other candidate common edge is (26, 22) whose end points are the second and fourth elements.

At step 226, for each of the one-to-one mappings between the two (n+2) combinations generated at step 222, it selects one or more common edges from the one or more candidate common edges computed at step 224. For the first case, in the current embodiment, a common edge is chosen according to the Circumcircle test. Alternatively in another embodiment, it may just select a common edge for example the one whose end points are the first and the third vertices, or it may use both candidate common edges and generate two pairs of suitably one-to-one mapped neighbor (n+1) combinations at below step 228, and steps 224 and 226 are combined to directly generate all common edges. For the second case, the current embodiment uses all three candidate common edges. Alternatively, an embodiment may select one of the common edges according to other criterion, for example the median length common edge, etc.

At step 228, combining the suitable one-to-one mapping generated at step 222 and a common edge generated at step 226, it records a pair of suitably mapped neighbor (n+1) combination. Thus according to the current embodiment, for the first case a pair of suitably one-to-one mapped neighbor (n+1) combinations is generated for a MatchPair, and for the second case three pairs of such neighbor (n+1) combinations are generated for a MatchPair. As discussed later, for the second case, in the current embodiment a local distance measure is computed for each pair, and the MatchPair's local distance measure is the sum (alternatively it could be the average, the median, the maximum, etc.) of the three local distance measures.

The current embodiment can be extended when three points are collinear in one of the (n+2) combinations, when one of them is on the boundary edge between the other two. At step 222, depending on the geometric configuration of the other (n+2) combination, the point on the boundary can be mapped to another point on a boundary, to a vertex of the hull, or to an interior point. Steps 224 and 226 can be combined to generate one candidate common edge between the non-collinear vertex and the vertex on the boundary.

The current embodiment can also be extended to compute a boundary edge for the candidate common edge. For example referring to FIG. 23, it shows the same two sets of points as in FIG. 6. Suppose that at step 222, an array of arranged vertices [20, 26, 24, 22] is mapped to another array of arranged vertices [10, 16, 14, 12] to generate four correspondences: (20, 10), (26, 16), (24, 14), (22, 12). At step 224, an embodiment may compute four boundary edges (24, 26), (22, 24), (20, 22), (26, 20) as candidate common edges. At step 226, suppose it arbitrarily selects (24, 26) as a common edge. At step 228, the two neighbor (n+1) combinations in the first point set are thus (26, 24, 20) and (26, 24, 22), and they are suitably one-to-one mapped to two neighbor (n+1) combinations in the second point set: (16, 14, 10) and (16, 14, 12).

After step 228, it loops back to step 210 to process the next two (n+2) combinations if more are available. As one skilled in the art knows, alternatively instead of using a loop, step 210 can be carried out multiple times to generate a batch of elements, where each element comprises two (n+2) combinations, one in each point set. Each of the following steps 222, 224, 226, and 228 can be performed on all elements of the batch in sequence, in parallel, or in combinations thereof before proceeding to the next step.

FIG. 10d shows an exemplary process for generating one or more MatchPairs carried out by MGU 130 according to yet another embodiment.

At step 230, MGU 130 receives two spatial point sets and a set of candidate correspondences. As an example, in some embodiments, candidate correspondences are generated by a tracker for multi-object tracking (MOT). In MOT, each observed trajectory could be tracked by a Bayesian Filter such as a Kalman Filter, an Extended Kalman Filter, etc. At each time step, the tracker generates a new set of predictions for the objects using the Bayesian filters according to their past trajectories and elapsed times. The predictions are sometimes given as multivariate normal distributions, from which gating areas can be defined as all points whose Mahalanobis distances to the means are below a predetermined threshold(s). Candidate correspondences for a prediction thus include all correspondences between its mean and measured interest points in its gating area. See for example "Multiple Hypothesis Tracking Revisited" by Kim et al.

As another example, referring to "Distinctive Image Features from Scale-Invariant Keypoints" by David Lowe, associated with each interest point a SIFT feature vector of 128 elements is computed. The feature vector summarizes the local texture around the interest point. Thus a candidate correspondence is generated between two interest points in two point sets only if the Euclidean distance between the feature vectors is below a certain predetermined threshold, will be selected according to the application as one skilled in the art determines. As another example, in U.S. Pat. No. 6,272,245 granted Aug. 7, 2001 by Lin, distances between local statistical features are used to find candidate correspondences. As yet another example, in "Spin-Images: A Representation for 3-D Surface Matching" by Johnson, local geometries captured in spin-images are used to find candidate correspondences. Embodiments presented in this invention can be applied to such applications to find an optimal group of geometrically consistent correspondences.

At step 232, it generates one or more (n+2) combinations in one of the point sets. This is similar to step 210 in FIG. 10b, except at this step it is in one of the two point sets instead of in both point sets. An embodiment may use the point set with less points to generate all of its (n+2) combinations. Since measurements could be noisy, this operation usually is performed on landmarks for localization, and predictions for MOT. One or more of the following measures could be further used to reduce the number of (n+2) combinations or to speed up the computation:

1. Divide the total region into multiple areas whose boundary regions overlap, and generate (n+2) combinations using only points from the same area. (If a coprocessor such as an NVIDIA® CUDA® device is used, as we'll discuss later, this may be used so that the number of threads in a grid fit into the number of available threads, considering not only the maximum number of available threads, but also the limitations imposed by available registers and shared memories).
2. Pre-compute such combinations and cache them in memory.

At step 234, it then computes for each of the generated n+2 combinations the Cartesian Products of all the n+2 points' candidate correspondences to obtain a set of candidate mappings where each of them is a mapping between two (n+2) combinations. If a measurement appears simultaneously in two gate areas, then multiple predictions may be mapped to a single measurement. Such mappings are not one-to-one and thus are discarded. Since this only happens when two gate areas overlap, it doesn't need to be checked otherwise. As one skilled in the art knows, it can count the number of distinct points in the other point set (i.e., not the one from which the (n+2) combinations are generated). Alternatively as discussed later, it can also compute for each candidate mapping a conflict list and a correspondence list and examine their bitwise AND. After filtering out the none one-to-one mappings, step 234 generates PreMatchPairs, each including two (n+2) combinations, one in each point set, and a candidate one-to-one mapping between them. Alternatively, the PreMatchPairs could include candidate mappings that are not yet one-to-one. As one skilled in the art knows, Cartesian products can be computed using iterators or recursions. See for example answers to the Stackoverflow question "How can I create cartesian product of vector of vectors?" retrieved from Stackprinter.

Figure 8:
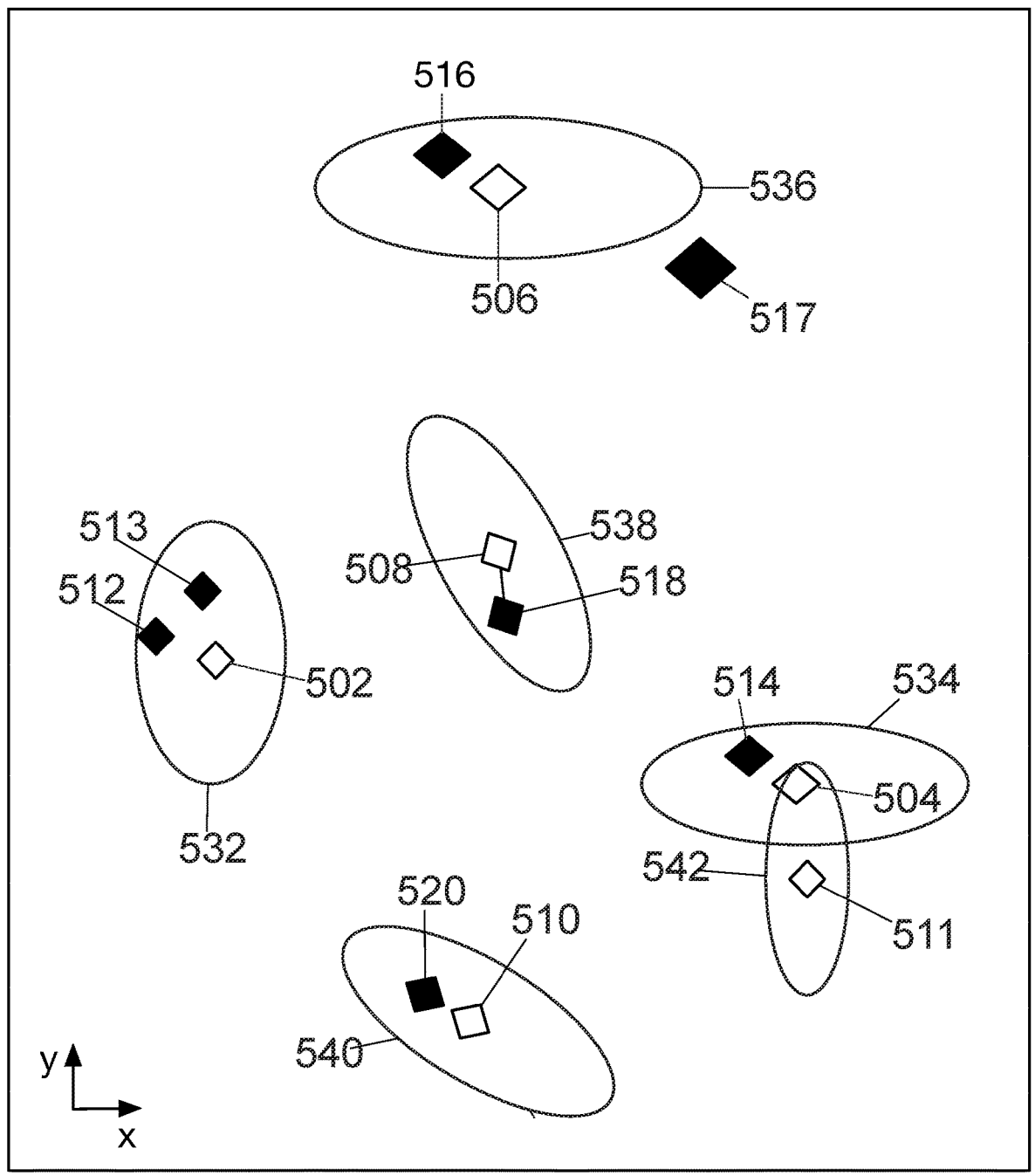
FIG. 8 shows two point sets in 2D where the first point set is represented by white diamonds and the second point set is represented by black diamonds. One of them is illustrated with the points' gate areas.

For example, FIG. 8 shows in 2D a first point set 502, 504, 506, 508, 510, 511, and a second point set 512, 513, 514, 516, 517, 518, and 520. For point 502, there is a gate area 532. Since points 512 and 513 from the second point set are within the gate area, candidate correspondences (502, 512) and (502, 513) are generated. Similarly, for point 504 it has a gate area 534 and generates a candidate correspondence (504, 514), point 506 has gate area 536 and generates a candidate correspondence (506, 516), point 508 has gate area 538 and generates a candidate correspondence (508, 518), point 510 has gate area 540 and generates a candidate correspondence (510, 520). Point 511 has gate area 542, but since there's no points from the other point set in its gate area, there is no candidate correspondences for this point.

Suppose that at step 232, it generates an (n+2) combination comprising points 502, 504, 506 and 508, and at step 234 it takes the Cartesian Product of their candidate correspondences:

{(502, 512), (502, 513)}×{(504, 514)}×{(506, 516)}× {(508, 518)}, we get two candidate mappings of four correspondences (in 3D there will be five correspondences):

{{(502, 512), (504, 514), (506, 516), (508, 518)} {(502, 513), (504, 514), (506, 516), (508, 518)}}

Selecting a different set of four points we get more of such mappings. They are not MatchPairs yet since common edges haven't been selected.

At step 236, for each of the candidate one-to-one mappings generated at step 234, it executes a subprocess 298 comprising steps 224, 238, 226, and 228.

Steps 224 is similar to that in FIG. 10c except here it's not restricted to 2D. For the candidate one-to-one mapping, it computes one or more candidate common hyperplanes for one of the (n+2) combinations.

At step 238, it checks if the current candidate one-to-one mapping is suitable. If the answer is no, it loops back to step 236 to work on the next candidate one-to-one mapping if one is available. Otherwise it continues to step 226.

To check whether a one-to-one mapping is suitable, as described earlier, one embodiment uses one of the candidate common hyperplanes generated at step 224, assigns an orientation to the common hyperplane, uses it to induce another oriented common hyperplane, and for each of the remainders, check whether it and its correspondent are to the same side of their corresponding oriented common hyperplanes. If it turns out that the candidate one-to-one mapping is unsuitable, it is either discard, or the candidate common hyperplane is swapped with another candidate common hyperplane. For example in 2D, refer to FIGS. 22a-22b. Suppose that after taking Cartesian Products at step 234, one of the candidate mappings is {{(650, 660), (656, 664), (654, 668), (652, 662)} as shown in FIG. 22a. It also shows all the boundaries of all the (n+1) combinations.

If at step 224, a candidate common edge (652, 656) is generated according to this candidate common edge, it is obviously not suitable because if one traverses the vertices of triangle (652, 656, 654) in the counter clockwise order, and at the same time traverses the correspondents, it would be in the order of (662, 664, 668), which is clockwise. From FIG. 22a to FIG. 22b, candidate common edge (652, 656) is replaced by candidate common edge (650, 654). The resulting one-to-one mapping is suitable because if one traverses the vertices of triangle (652, 654, 650) in the clockwise order, and at the same time traverses the correspondents, it would be in the order of (662, 668, 660) which is also clockwise; and if one traverses the vertices of triangle (650, 654, 656) in the clockwise order, and at the same time traverses the correspondents, it would be in the order of (660, 668, 664) which is also clockwise. In practice the signed area can be used to test for whether a point $p_0$ is to the left of an oriented edge from $p_1$ to $p_2$, and if so to traverse $p_1$, $p_2$, $p_0$ in the order is counter clockwise.

Alternatively in another embodiment in 2D to check whether a one-to-one mapping is suitable, it traverses the vertices of the convex hull of one of the (n+2) combinations in a certain order, and check that the correspondents are traversed in the same order. For example, in FIG. 7e, if one traverse the vertices of the convex hull of one n+2 combination in the counter clockwise order of 20, 26, 24, 22, the correspondences are traversed in the order of 10, 16, 12, 14, which is not counter-clockwise with regard to their convex hull. In FIG. 7f, if one traverse the vertices of the convex hull of one n+2 combination in the counter-clockwise order of 20, 26, 24, 22, the correspondents are traversed in the order of 14, 16, 10, 12, which is in contrast clockwise with regard to their convex hull. Here the order of step 238 and 224 can be switched, and after that steps 224 and 226 may be combined to generate common hyperplanes directly.

Note that in 2D besides the standard convex hull algorithms (or their extensions) that return the vertices of the convex hull in certain orders, the common edge algorithm can also be extended to return the vertices of an (n+2) combination in order. For example, given an (n+2) combination in 2D, let $p_0$ be the bottom most then left most point. If it is determined that all the points are the vertices of their convex hulls, and the remaining points are sorted in the order of α, β, γ according to their signed areas with $p_0$, where a positive signed area of ($p_0$, m, n) indicates that point m precedes point n, then the vertices can be traversed counter clockwise in the order of $p_0$, α, β, γ. On the other hand, if it is determined that β is an interior point, and if the other remaining points are sorted in the order of α, γ, then the vertices of the convex hull can be traversed counter clockwise in the order of $p_0$, α, γ.

Steps 226 and 228 are similar to those in FIG. 10c except that it is not limited to 2D.

After step 228, it loops back to step 236 to process the next candidate mapping if more are available. As one skilled in the art knows, alternatively instead of using a loop, step 236 can be omitted. Each of the following steps 224, 238, 226, and 228 can be performed on all candidate mappings generated at step 234 in sequence, in parallel, or in combinations thereof before proceeding to the next step.

Detailed Description-Matchpair Compatibility Unit

Two MatchPairs are compatible if after merging their one-to-one mappings one gets another one-to-one mapping. For example, FIGS. 12a-12c all show a first point set 80, 82, 84, 86, 88 represented by white diamonds, and a second point set 70, 72, 74, 75, 76, 78 represented by black diamonds. FIG. 12a shows a one-to-one mapping consisting of correspondences (80, 70), (82, 72), (84, 74), and (86, 76). FIG. 12b shows a one-to-one mapping consisting of correspondences (82, 72), (84, 74), (86, 76), and (88, 78). Merged together, the resultant one-to-one mapping (not shown) consists of correspondences (80, 70), (82, 72), (84, 74), (86, 76), and (88, 78). Since it is still a one-to-one mapping, they are compatible. On the other hand, FIG. 12c shows a one-to-one mapping consisting of correspondences (86, 70), (82, 72), (84, 74), and (88, 78). Merging this with the one-to-one mapping shown in FIG. 12a, the result mapping (not shown) consists of correspondences (86, 70), (82, 72), (84, 74), (88, 78), (80, 70), and (86, 76). This is not a one-to-one mapping because point 70 is mapped to two different points 80 and 86.

Referring to FIG. 13, there is shown a half part of an exemplary process used by the current embodiment to check if two MatchPairs are compatible, where the process is implemented by MCU 132. At step 300, MCU 132 obtains an iterator for iterating through the points belonging to the first point set in the first MatchPair in a predetermined order. For example, it could be in ascending order or in descending order with regard to their point ids. At step 302, it obtains a second iterator for iterating through the points belonging to the first point set in the same order in the second MatchPair. For an iterator, its target is the point that the iterator is currently pointing to. Once the two iterators are obtained, in the remaining steps they are used to combinedly iterate through their targets. At step 304 it checks if either of the two iterators has iterated through all its targets. If the answer is yes, it returns true at step 306 since no incompatibilities have been found. Otherwise it continues to step 308. If the first iterator's target precedes the second iterator's target in the order, then it forwards the first iterator at step 310 and goes back to step 304. Otherwise at step 312, if the second iterator's target precedes the first iterator's target, then it forwards the second iterator at step 314 and then goes back to step 304. If neither precedes the other, the two iterators are pointing to the same target, and at step 316 it checks if the target's correspondents in the two MatchPairs are the same. If the answer is yes, it forwards both iterators at step 320 and goes back to step 304. Otherwise it returns false at step 318 since the target has more than one distinct correspondents.

In the current embodiment, for each MatchPair it computes a set of two integer arrays, each of them has length n+2. Example of various integer arrays include arrays of unsigned integers, short integers, or bytes etc. The integer array records the n+2 correspondences from the first point set to the second point set where points are within the MatchPair. The ith element of the first integer array records the point id of the ith point in the MatchPair in the first point set in the order, and the ith element of the second integer array records its correspondent's point id (in the second point set in the MatchPair). The iterators are thus pointers to the first integer arrays, their targets are the point ids in the first integer arrays, and the targets' correspondents are point ids in the second integer arrays.

Since the above process only checks in one direction, MCU 132 repeats the process with the roles of the two point sets swapped, i.e., it obtains iterators for the second point sets in both MatchPairs, the iterators traverses the second point sets in the same order, but the order doesn't need to be the same order used for traversing the first point sets. Thus for each MatchPair it computes another set of two integer arrays, each of length n+2. This second set of integer arrays records correspondences from the second point set to the first point set within the MatchPair.

Alternatively, for the process shown in FIG. 13, instead of integer arrays, other embodiments may use other data structures for example vectors of records where each record contains a first field for the target and a second field for its correspondent, linked lists of records, maps etc., and use vector iterators, vector indices, pointers to nodes of linked lists, map iterators as the iterators. A set of two integer arrays each of length n+2 may be combined into one integer array of length 2n+4 when stored in memory, as long as the program uses the correct offsets to access the targets and the correspondents.

Alternatively, in one embodiment an adjacency matrix is used. Each non-zero element in the i-th row and j-th column represents a correspondence from point i in the first point set to point j in the second point set. When checking the compatibility between two MatchPairs, MCU 132 records the 2n+4 correspondences (repetitions may exist) into the adjacency matrix. It also maintains a counter for each row and each column to record the number of records in the row or column. Before recording each correspondence, it checks the counters to find out if there's already another record at the same row but at a different column, or at the same column but at a different row. if the answer is yes, then it is not one-to-one. If there's already another record at the same row and at the same column, it means the same correspondence appeared in both MatchPairs, and it does not indicate incompatibility.

In another embodiment, two global integer arrays are used to check the compatibility between two MatchPairs. The first integer array is used to record correspondences from the first point set to the second point set, where its indices represent point ids of points in the first point set, its values are point ids of the points in the second point set. For the second integer array, the roles of the first point set and the second point set are reversed. Neither integer arrays are restricted to a single MatchPair. MCU 132 iterates through both MatchPairs, and records the 2n+4 correspondences into the arrays. Before recording each correspondence, it checks whether a different point id has already been recorded in the value field.

Detailed Description—Matchpair Evaluation Unit and Weight Computation Unit

Figure 5:
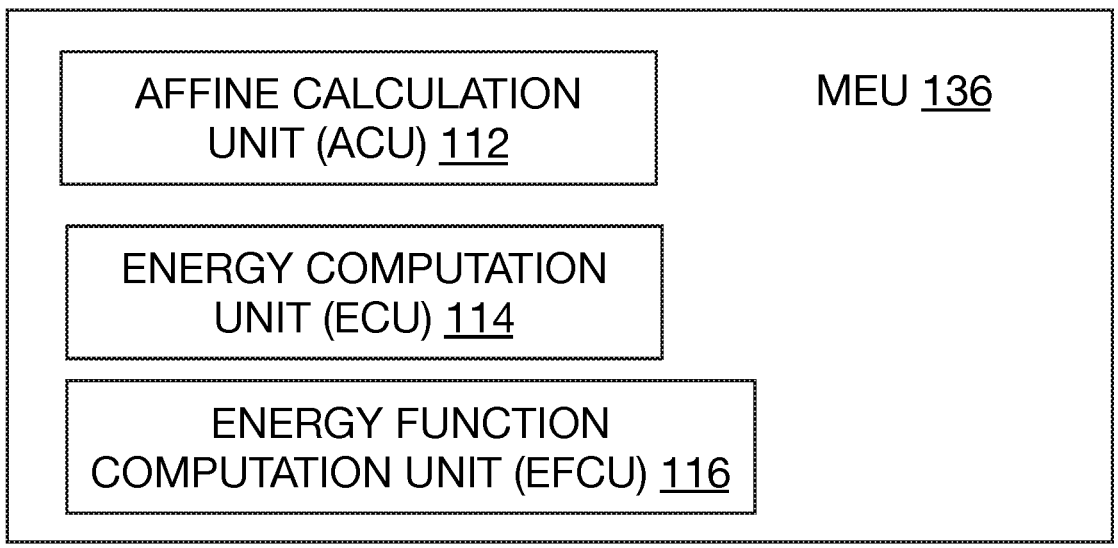
FIG. 5 is a block diagram of a Matching Evaluation Unit according to one embodiment.

For each received MatchPair, MatchPair Evaluation Unit (MEU) 136 computes a local distance measure for each of its pairs of suitably one-to-one mapped neighbor (n+1) combinations, then use these to compute a local distance measure for the MatchPair. Weight Computation Unit (WCU) 134 then converts the local distance measure into a weight. FIG. 5 shows a block diagram of an exemplary embodiment of MEU 136. In the figure, MEU 136 comprises an Affine Calculation Unit (ACU) 112, an Energy Computation Unit (ECU) 114, and an optional Energy Function Computation Unit (EFCU) 116. ACU 112 receives one or more pairs of mapped neighbor (n+1) combinations in a MatchPair and for each of them computes a pair of affine transformations that satisfy the following relationship, where A is the affine matrix, $x_1$, $x_2$, $x_3$ are the three points of a mapped n+1 combination, $loc(x_1)$, $loc(x_2)$, $loc(x_3)$ are their coordinates in homogeneous coordinates, and $u_1$, $u_2$, $u_3$ are their displacements as column vectors respectively with the extra dimension set to 0:

$$A[loc(x_1),loc(x_2),loc(x_3)]=[loc(x_1),loc(x_2),loc(x_3)]+[u_1,u_2,u_3]$$

This equation is used to specify the numerical relationship, although it can be used to compute A, it doesn't necessarily demand that A should be computed using this matrix equation in homogeneous coordinates. Instead referring to my previous U.S. Pat. Nos. 8,811,772 and 8,571,351, various approaches to compute affine transformations from mapped n+1 combinations have been discussed. Examples include computing matrix inverses analytically using determinants and cofactors, solving matrix equations using matrix decompositions or Gauss Eliminations, or solving linear systems using the Direct linear transformation (DLT) algorithm (see "Direct linear transformation" retrieved from Wikipedia for more details), etc. MEU 136 necessarily involves more than the integer arithmetic. In the current embodiment the floating point arithmetic is used. Alternatives include for example the fixed point arithmetic, etc.

ECU 114 receives at least a pair of affine transformations $T_1$, $T_2$ generated from a pair of suitably one-to-one mapped neighbor (n+1) combinations in a MatchPair, and use them to compute a local distance measure. Various local distance measures have been discussed. Referring to my U.S. Pat. No. 8,571,351 granted Jun. 3, 2012, embodiments compute the difference of the left sub-matrices of the two affine transformations, and compute a local distance measure based on the difference. For example the patent discloses embodiments of ECU 114 that computes its singular values using a Matrix Decomposition Unit (MDU) and then computes matrix norms such as the Ky Fan p-k norm or the (c,p)-norm etc. using a distance computation unit (DCU). The patent also discloses embodiments of ECU 114 that computes local distance measures such as the Frobenius norm or the trace norm without using an MDU. The current embodiment in 2D computes the Frobenius norm of $A(T_1)$–$A(T_2)$.

Alternatively, referring to my earlier U.S. Pat. No. 8,811,772 granted Aug. 19, 2014, embodiments compute a local distance measure by defining a spatial agent, applying the two affine transformations to the spatial agent to generate two transformed spatial agents, and computing the local distance measure based on the transformed spatial agents.

Alternatively, in yet another embodiment, the local distance measure comprises the Euclidean distance between the corresponding elements of the matrices of the pair of affine transformations.

As described earlier, If an embodiment keeps two or more pairs of suitably one-to-one mapped neighbor (n+1) combinations for a MatchPair, its local distance measure summarizes the local distance measures, for example by taking their sums or averages.

An optional EFCU 116 receives local distance measures from ECU 114 and adds one or more terms to them. Each additional term has a multiplicative coefficient that represents the term's significance relative to the other terms. For example, in an alternative embodiment of the process in FIG. 14, at step 402, it also receives for each point a feature vector. The previous patents disclose embodiments of EFCU 116 adding intensity-based distance measures or feature based distance measures. For an example of such feature vectors, referring to "Distinctive Image Features from Scale-Invariant Keypoints" by David Lowe, associated with each interest point a SIFT feature vector of 128 elements is computed. The feature vector summarizes the local geometry around the interest point. Thus an additional term could comprise the Euclidean distance between the feature vector associated with a point, and the feature vector associated with its correspondent. As another example, such terms could include the Frobenius norms or the Ky Fan p-k norms of $A(T_1)$ and $A(T_2)$. As yet another example, such terms could include the Euclidean distance between the textures within an (n+1) combination, and the textures transformed from its corresponding (n+1) combination using the affine transformation from the corresponding (n+1) combination to the (n+1) combination, where the transformed textures are interpolated at the pixel positions of the textures within the first (n+1) combination. Alternatively in another embodiment, referring to FIG. 27, it shows another embodiment of MEU 136 comprising a Persistent Ratio Unit (PRU) 111. It uses PRU 111 to compute two persistent ratios for each pair of suitably one-to-one mapped neighbor (n+1) combinations. According to U.S. Pat. No. 8,233,722 granted Jul. 31, 2012 by Kletter et al., the persistent ratio is the ratio between the areas of two neighbor triangles. Denote the convex hulls of the two (n+1) combinations in a pair of suitably one-to-one mapped neighbor (n+1) combinations by $c_1$, $c_2$, and the convex hulls of the corresponding (n+1) combinations by $d_1$, $d_2$, assuming that $\text{AREA}(c_1) \geq \text{AREA}(c_2)$. Then the two persistent ratios can be computed as $$p_1 = \frac{\text{AREA}(c_1)}{\text{AREA}(c_2)} \text{ and}$$

$$p_2 = \frac{\text{AREA}(d_1)}{\text{AREA}(d_2)}.$$

A local distance measure can be computed for example as: $(p_1-p_2)^2$, $|p_1-p_2|$, $p_1/p_2$, etc. This can be extended to 3D if one replaces "AREA" with "VOLUME".

WCU 134 receives local distance measures and computes weights that are inversely related to them. Let M be the number of MatchPairs, $d_1, \ldots, d_M$ be the local distance measures, and $w_1, \ldots, w_M$ be the weights. There are various approaches to compute weights from local distance measures. For example, in the current embodiment, $w_i = \max_{j=1}^{M}(d_j)-d_i$. In another embodiment, $w_i = \max_{j=1}^{M}(d_j)/d_i$. In yet another embodiment, $w_i = 1 - \text{softmax}(d_i)$, where "softmax" refers to the softmax function:

$$\text{softmax}(d_i) = \frac{\text{Exp}(d_i)}{\Sigma_j \text{Exp}(d_j)}.$$

Given one or more MatchPairs, their compatibilities, and their weights, GCU 106 constructs an undirected graph. Each of the undirected graph's vertices corresponds to one MatchPair; its edges correspond to the compatibilities, where an edge is inserted between two graph vertices if and only if the two corresponding MatchPairs are compatible; and to each node is associated the weight of the corresponding MatchPair.

Detailed Description—Optimization Unit

Figure 3:
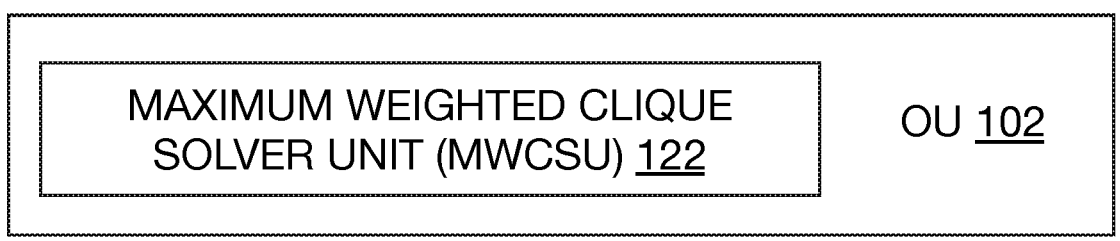
FIG. 3 is a block diagram of an Optimization Unit according to one embodiment.

FIG. 3 shows a block diagram of an exemplary embodiment of OU 102. As shown in the figure, OU 102 comprises a maximum-weight clique solver unit (MWCSU) 122. For an undirected graph: a vertex-induced subgraph contains a subset of the vertices, and it inherits from the original graph all edges whose both end points are in the subset; to be a complete subgraph, any two vertices in the subgraph are connected by an edge; a clique is a complete vertex-induced subgraph. A maximum-weight clique is one with the maximal total weight. A maximum-weight clique solver tries to find a maximum-weight clique. But unless it's an exact solver, the result is not guaranteed to be a global maximum. Nevertheless we still refer to the result as "a maximum-weight clique".

In this embodiment, MWCSU 122 involves the exact maximum-weight clique solver according to "A New Algorithm For The Maximum-Weight Clique Problem" by Patric R. J. Östergård. It uses a branch-and-bound scheme to find a maximum weight clique, where the bounds are used to prune the search space. It starts from small cliques and grow them by adding in more and more vertices. During the computation, it maintains a global array to record the largest weight found so far for cliques of subsets of vertices $\{v_i, v_{i+1}, \ldots, v_n\}$, where n is the number of vertices and i runs from n to 1. The algorithm is an extension to the algorithm described in the author's earlier paper "A fast algorithm for the maximum clique problem", which solves for the maximum clique problem where vertices are not associated with weights (or equivalently all have the same weights). The algorithm has been integrated into the open source project GNU Linear Programming Kit. At the time of writing, one can retrieve the source from http://ftp.gnu.org/gnu/glpk/glpk-4.65.tar.gz. Inside there is a file "wclique.c" that implements the algorithm.

Currently the input weights are required to be integers. In order to convert floating point weights to integer valued weights, in the current embodiment, the floating point weights are first sorted in ascending order. The sorted array is used to find the minimum difference between adjacent elements. Then a scaling factor is computed such that it scales the minimum difference to be at least a little bit greater than 1. This scaling factor is used to scale the floating point weights, and the results are rounded to integers. Alternatively, one embodiment normalizes floating point weights to a predetermined range, for example [1, 1000], such that the maximum weight is scaled to integer value 1000, and the minimum is scaled to 1.

Alternatively in another embodiment, MWCSU 122 comprises a QUALEX-MS (QUick Almost Exact Motzkin-Straus-based) solver. According to "A new trust region technique for the maximum weight clique problem" by Stanislav Busygin, the problem of finding a maximum-weight clique is formulated as a Motzkin-Straus problem, and it is in turn converted into a trust region problem that optimizes a quadratic program constrained to a ball. The algorithm finds as a starting point a maximal clique using a greedy procedure, next it finds stationary points of the trust region problem with smaller radii, and then applies the greedy procedure to further improve the solutions. It returns the best clique that it has found during the process, thus the result may not be a global maximum-weight clique. One can find detailed descriptions and pseudo codes in "A new trust region technique for the maximum weight clique problem" by Stanislav Busygin. There is a software package that implements the algorithm. It is available at http://www.stasbusygin.org.

Alternatively in yet another embodiment, MWCSU 122 comprises a stochastic solver according to the paper "Optimisation of unweighted/weighted maximum independent sets and minimum vertex covers" by Wayne Pullan. It solves for the maximum weighted independent set problem which is complement to the maximum-weight clique problem. It comprises an iterative scheme, where at each iteration it alternates between an iterative improve phase that adds more vertices and a plateau search phase that swaps vertices. The algorithm is also not exact. The algorithm is an extension to the algorithm described in the author's earlier paper "Phased local search for the maximum clique problem", where vertices are not assigned weights. At the time of writing, the open source software package open-PLS can be retrieved online from https://github.com/darrenstrash/open-pls.

It is well known that the maximum-weight clique problem is complementary to the maximum weight independent set problem (a.k.a. weighted node packing). To convert from one to the other, instead of inserting an edge between two graph vertices when the two corresponding MatchPairs are compatible, an edge is inserted between two graph vertices only when the two corresponding MatchPairs are not compatible. Thus a solver for solving the maximum-weight clique problem can be applied to solve the maximum weight independent set problem and vice versa.

Detailed Description—Merging Unit

In FIG. 2, MU 100 also comprises a Merging Unit (MU) 108. It receives a maximum-weight clique computed by OU 102 and merges all the one-to-one mappings of the Match-Pairs corresponding to the vertices of the clique. Since the MatchPairs belong to the same clique, thus the one-to-one mappings are all compatible with each other, and the result is also a one-to-one mapping. To do this, MU 108 iterates through the MatchPairs, and for each MatchPair it records its n+2 correspondences in a common data structure that represents a one-to-one mapping. Note that a correspondence could appear more than once in different MatchPairs.

Various data structures can be used to represent a one-to-one mapping between a first point set and a second point set. For example, it could be an adjacency matrix such that each non-zero element in the i-th row and j-th column records a correspondence from point i in the first point set to point j in the second point set, it could be an integer array where the array indices represent point ids of the first point set, and the values are the correspondents' point ids in the second point set, or it could be a map whose keys are point ids of the first point set, and the values are point ids of their correspondents.

Detailed Description—Hardware Components

A computing device implements MU 100 in the form of software, hardware, firmware, ASIC, or combinations thereof. FIG. 16 depicts an exemplary computing device 607 comprising one or more processor(s) 602, memory module(s) 606, bus modules 610, and supporting circuits 609. Some embodiments may further include a communication interface 608 that receives inputs from and send outputs to an external network 605. Processor(s) 602 may be microprocessors in desktop machines, Digital Signal Processors (DSPs) or general purpose microprocessors in embedded systems, virtual CPUs such as those found in cloud computing environments, or any other suitable type of processors for executing required instructions. Supporting circuits 609 comprise well-known circuits such as various I/O controllers, power supplies, and the like. Bus 610 comprises data buses and instruction buses between processors, memories and various peripherals. If a coprocessor is included, bus 610 also includes the connections between the coprocessor and the rest of the system (called the host). An example is the PCI Express bus. Memory 606 comprises storage devices for example read-only memory (ROM), dynamic random-access memory (DRAM), and the like. Memory 606 provides temporary storage for operation system instructions, which provides an interface between the software applications being executed and the hardware components. Memory 606 is further loaded with instructions for operating control structures (e.g., if, else, loop, etc.), and various computations in MU 100 as described earlier when embodiments require. Embodiments may involve various suitable operating systems, such as LINUX, UNIX, various real time operating systems (RTOS) and the like. Processor(s) 602 and memory 606 may be local (e.g. contained in a single PC or in an embedded system), distributed (e.g. in a computer cluster), or located remotely (e.g. in cloud based virtual machines) and accessed via a network or other communication link (e.g. using communication interface 608). Computing device 607 may further comprise storage devices (not shown) for recording instructions of computer programs into a record medium, or loading instructions from a record medium into memory. For example, such record medium may include internal hard drive, external hard drives, FLASH drives, optical disks, and cloud based storages accessible through Internet.

Components of MU 100 that generates MatchPairs from PreMatchPairs, computes local distance measures, and computes weights from local distance measures can be parallelized. Thus embodiments may implement some components of MU 100 on an optional coprocessor 612 if one is provided. Examples of coprocessor 612 include various NVIDIA® CUDA® devices, various OpenCL devices such as AMD® GPUs and Intel® GPUs and FPGA-based acceleration platforms, etc. For example, an NVIDIA CUDA coprocessor comprises a large amount of CUDA cores, which are grouped into multiple Stream Multiprocessors (SM). Each SM includes a fixed amount of CUDA cores and a limited amount of shared memories/L1 cache (configurable), registers, special function units (SFUs), and controlling units, where the exact numbers depend on the GPU architecture. The coprocessor also includes a global memory for communicating with the host machine, storing global data and kernel code, etc. Alternatively an AMD GPU that supports OpenCL includes multiple compute units, and each compute unit includes multiple processing elements. For an OpenCL device its memory can be divided into global memories, local memories, and private memories, where global memories can be used for communicating between hosts and devices, and private memories can be off-chip memories or registers that allows faster accesses.

According to the CUDA programming model, a user code is divided into a host code that runs on the host and a device code that runs on the coprocessor. The device code is in one or more device functions called kernels. Each time a user launches a kernel on a coprocessor, a number of GPU threads are spawned. Kernel launches are asynchronous so that host codes can run in parallel with device codes after kernels are launched. The total of the GPU threads created for a kernel launch is called a grid. Each grid consists of multiple thread blocks, and each thread block consists of multiple GPU threads. The user specifies the dimensions of a grid and the dimensions of its blocks at the time of the kernel launch. The CUDA coprocessor receives the grid and assigns its thread blocks to SMs. Each thread block is assigned to one SM while each SM can be assigned multiple thread blocks. There is an upper bound that limits the number of allowed thread blocks on an SM, and this number varies among different GPU architectures. In practice, at any time the actual number of thread blocks that can be assigned to an SM is also restricted by the supplies and demands of shared memories and registers. The GPU threads in a thread block are further divided into multiple warps, which is the unit of scheduling. High throughput is achieved by efficiently switching to other warps when one is stalled. A typically warp consists of 32 GPU threads. The GPU threads in a thread block can synchronize and communicate with each other using various mechanisms. For a GPU thread, the kernel runs as a sequential program. At run time a GPU thread can access shared memories and registers in the SM and global memories in the coprocessor.

Similar concepts apply to the OpenCL programming model. Each time a user program enqueues a kernel into a command queue for an OpenCL device, multiple work-items are spawned, and the user specifies the dimensions of the total of the work-items by an NDRange. Work-items within an NDRange are grouped into work-groups, within which the work-items can synchronize with each other using various synchronization mechanisms provided by the OpenCL runtime. The OpenCL runtime assigns the work-groups to the device's compute units. Similar to warps for CUDA devices, a wavefront for AMD GPUs typically consists of 64 work-items and is the unit of scheduling. In order to communicate with OpenCL devices, a host program creates a context to manage a set of OpenCL devices and a command queue for each OpenCL device. Commands that are enqueued into the command queues could include kernels, data movements, and synchronization operations. The OpenCL API defines events similar to the CUDA programming model. Comparable to how streams are used in the CUDA programming model, commands associated with different events can be overlapped while those associated with the same event are carried out in sequence. Kernel launches are asynchronous, but if required the OpenCL runtime provides APIs for hosts to block on events until kernels are completed. In addition, the OpenCL programming model provides several mechanisms for exchanging data between hosts and OpenCL devices including for example buffers, images, and pipes. For each work-item, the kernel runs as a sequential program. Note that some of the discussions in this paragraph may apply only to AMD GPUs.

Detailed Description—Processes

Referring to FIG. 14, there is an exemplary process carried out by the system shown in FIG. 2 for generating a one-to-one mapping. At step 402, MU 100 receives two spatial point sets.

At step 404, MGU 130 generates one or more MatchPairs using the first and the second point sets according to for example one of the processes shown in FIGS. 10*a*, 10*b*, and 10*c*.

At step 406, a local distance measure is computed for each MatchPair using MEU 136, and the local distance measure is converted to a weight using WCU 134.

At step 408, MCU 132 computes the compatibility between each pair of MatchPairs according to for example the process shown in FIG. 13.

At step 410, GCU 106 constructs an undirected graph with its vertices corresponding to the MatchPairs, its edges representing the compatibilities, and its graph vertices assigned the weights. This graph is passed to OU 102 to compute a maximum-weight clique at step 412.

Finally, at step 414, MU 108 merges the one-to-one mappings of the MatchPairs corresponding to the nodes of the clique to generate a resultant one-to-one mapping.

Referring to FIG. 15, there is shown another exemplary process carried out by the system shown in FIG. 2 for generating a one-to-one mapping. At step 420, MU 100 receives two spatial point sets and a set of candidate correspondences.

At step 424, one or more MatchPairs are generated using the candidate correspondences according to for example the process shown in FIG. 10*d*.

Steps 408, 406, 410, 412, and 414 are similar to those in FIG. 14.

Referring to FIGS. 28*a* and 28*b*, there is shown an exemplary process carried out by the system shown in FIG. 2 for generating a one-to-one mapping according to the current embodiment. Starting with FIG. 28*a*, at step 420, MU 100 receives two spatial point sets and a set of candidate correspondences.

At step 902, in the current embodiment, for each candidate correspondence it computes a bit field, which is referred to as its unit conflict list. The candidate correspondences are stored in an array, and each one is indexed by its relative position from the start of the array. Thus the first one is indexed by 0, the second one is indexed by 1, etc. Alternatively in another embodiment the candidate correspondences are stored in a map and the keys are their relative positions. When the i-th bit of the unit conflict list of a candidate correspondence is set to 1, it means it conflicts with the i-th candidate correspondence. For example if bit 0 is set to 1, then the candidate correspondence conflicts with the candidate correspondence located at the start of the array or indexed by 0 (other suitable indexing schemes can also be used). Two candidate correspondences are in conflict with each other when their end points in one point set are identical, and in the other are not. Thus to compute a unit conflict list for a candidate correspondence, it finds all other candidate correspondences that share a common end point with it by either iterating through all candidate correspondences or store all the candidate correspondences in for example two maps indexed by the end points in the respective point sets. This operation may be carried out in parallel with multiple CPU or GPU threads.

Steps 232 and 234 are similar to those in FIG. 10*d*. As a result, it generates one or more candidate one-to-one mappings (a.k.a. PreMatchPairs), each between two (n+2) combinations.

At step 904, it filters the candidate one-to-one mappings according to whether they are suitable. In the current embodiment, it carries out steps 224 and 238 (or their alternatives) in FIG. 10*d*.

At optional step 906, it further filters the candidate one-to-one mappings according to embodiment specific, application specific, or feature specific criteria. For example, in one embodiment it computes the centroids of the two (n+2) combinations, and discards the one-to-one mapping if the distance between the centroids is larger than a predetermined threshold computed from a reasonable estimation of the maximum distance that a set of objects can travel between two frames. In another embodiment, it computes the dispersions of the two (n+2) combinations, and discards the one-to-one mapping if the difference between the dispersions is beyond a predetermined threshold computed according to a reasonable estimation of the maximum change that can happen to the dispersions of a set of traveling objects between two frames (see "Spatial descriptive statistics" retrieved from Wikipedia for more details). Alternatively, some embodiments compare the centroids or the dispersions of the candidate mappings before checking whether they are one-to-one mappings.

Step 906 is followed by a subprocess 920 shown in FIG. 28*b*.

Now referring to subprocess 920 shown in FIG. 28*b*. At step 908, one or more MatchPairs are generated according to steps 226 and 228 shown in FIG. 10*d* using the one-to-one mappings passed down from step 906.

Step 406 is similar to that in FIG. 15.

At optional step 910, the MatchPairs are filtered according to their local distance measures. In the current embodiment, it discards MatchPairs whose local distance measures are larger than a predetermined quantile (for example 50% or 25%, etc.) Alternatively, a threshold can be determined according to various application specific criteria for example the maximum deformations and/or relatively movements using deformation or motion estimations. Alternatively some other embodiments, for example an embodiment that runs in a hard real time environment, may cap the runtime of the maximum-weight clique solver by imposing a hard limit on the maximum number of graph vertices. The number needs to be computed or estimated according to various factors such as the worst case scenario and the computation power of the hardware platform.

Alternative an embodiment may filter the MatchPairs according to their weights instead of the local distance measures. For example, one embodiment may discard MatchPairs whose weights are smaller than a predetermined quantile, and another embodiment may retain a predetermined number of MatchPairs with the largest weights according to runtime caps.

At step 912, for each MatchPair it generates a bit field, which is referred to as its conflict list. When the i-th bit is set to 1, it means the MatchPair conflicts with the i-th candidate correspondence. For example if bit 0 is set to 1, then the MatchPair conflicts with the candidate correspondence located at the start of the array or indexed by 0. In order to compute the conflict list, notice that a candidate correspondence conflicts with a MatchPair if it conflicts with any of the MatchPair's candidate correspondences. Thus it computes the bitwise ORs of the unit conflict lists of the MatchPair's candidate correspondences. If an embodiment provides a coprocessor, then the computation can be carried out in parallel such that each GPU thread processes the conflict lists for one or a chunk of the MatchPairs. Alternatively the conflict lists can be computed on the fly, i.e. when they are first used.

It also computes for each MatchPair a bit field called its "correspondence list". A bit in the correspondence list is set to 1 when the MatchPair contains the corresponding candidate correspondence. Thus the correspondence list of a MatchPair includes (n+2) non-zero bits.

Notice that for a candidate mapping, if its correspondence list and conflict list are generated and bitwise ANDed, and if the resultant bit field is not all 0s, then it does not define a one-to-one mapping. Thus according to another embodiment, step 912 is carried out within step 234 in FIG. 28*a*. The lists are then inherited by the corresponding MatchPairs for example by passing a reference, a pointer, or a copy (that is if the candidate one-to-one mappings manage to reach the stage without being filtered out).

At step 914, MCU 132 computes the compatibilities between each pair of the MatchPairs. To check if two MatchPairs are compatible, it carries out a bitwise AND operation between one's conflict list and the other's correspondence list. If the resultant bit field is not all 0s, then they conflict with each other. Alternatively if the lists are computed within step 234 in FIG. 28*a* as described above, step 914 can be carried out for pairs of the candidate one-to-one mappings at step 234, and the results are inherited by pairs of the corresponding MatchPairs.

Steps 410, 412, and 414 are similar to those in FIG. 15.

Referring to FIGS. 25-26, there is shown an exemplary process carried out by the system shown in FIG. 2 and implemented on computing device 607 shown in FIG. 16 including coprocessor 612 for generating a one-to-one mapping. It is written with NVIDIA® CUDA® in mind, however similar concepts shall be applicable to for example OpenCL enabled coprocessors and FPGAs, or other suitable systems. The process is divided into a host process 698 that runs on the host, and a device process 700 that runs on the coprocessor.

FIG. 25 illustrates host process 698. At step 701 it receives two spatial point sets in 2D.

At step 702, it spawns a CPU thread on processor(s) 602 to run the following steps for the current two spatial point sets, which is referred to as the current frame. The spawning thread then goes on with other things including for example waiting for the next frame, etc. Alternatively for another embodiment, the spawning thread runs the following steps by itself.

At step 703, it generates a batch consisting of all pairs of possible (n+2) combinations in the first point set with those in the second point set as PreMatchPairs. It is similar to step 210 in FIG. 10c but instead of iterating through them, here all are generated and stored in host memory 606. Alternatively, multiple batches are generated, each containing a portion of all such pairs, and steps 706-714 are carried out for each of the batches before the process blocks at step 716.

At step 704, it creates a CUDA stream for processing the current batch. A CUDA stream is CUDA's equivalent of a worker queue. The user adds jobs into the stream and they are executed first in first out (FIFO). Grid level parallelism is achieved by putting steps 706, 708, and 714 for the same frame into a separate stream, and overlapping the steps belonging to different streams. Thus while carrying out step 718 for a frame, at the same time the coprocessor can be sending computing results from the previous frame back to the host, and at the same time receiving inputs for the next frame from the host. Alternatively for another embodiment, it doesn't use a stream and at step 708 blocks on the kernel until it finishes.

At step 706, it pushes an operation into the stream to copy all PreMatchPairs of the current batch from host memory 606 to the global memory (not shown) in coprocessor 612.

At step 708, it pushes an operation into the stream to launch a kernel on the coprocessor. Each GPU thread can be programmed to process one or a chunk of the PreMatchPairs to generate one or more MatchPairs and compute their weights. The kernel executes a process 700 that is shown in FIG. 26.

At step 714, it pushes an operation into the stream to copy the MatchPairs from the coprocessor to the host. In this case the returned MatchPairs comprise the one-to-one mappings of the MatchPairs generated at step 712 of process 700, and the weights computed for them at step 406 of process 700. When returned from a coprocessor, a MatchPair may comprise an (n+2) combination in the first point set, an (n+2) combination in the second point set, a one-to-one mapping between them, and one or more local distance measures or weights. However if the corresponding PreMatchPair already includes the one-to-one mapping, and it is are not updated in the kernel, then it doesn't need to be returned as long as after receiving the returned MatchPair the host code can locate the one-to-one mapping (an example is given later for adapting a combination of the processes shown in FIGS. 10d and 14 to a coprocessor). If the device code converts local distance measures to weights, returned MatchPairs shall include computed weights; otherwise if the host code does the conversion, MatchPairs shall include computed local distance measures.

At step 716, it blocks on the stream until all operations in the stream are finished. Alternatively, an embodiment can push a stream callback function to be called in the host code once all other operations in the stream are finished. In that case, step 702 may be omitted, since the stream callback function will execute steps 408-414 below. Alternatively if multiple batches are used, in one embodiment it loops back to step 706 and performs steps 706, 708 and 714 for the next batches. Another embodiment may also create multiple streams for the multiple batches.

Steps 408, 410, 412, and 414 runs in the host code and they are similar to those in FIG. 14.

Referring to FIG. 26, it shows device process 700 carried out by coprocessor 612 for generating MatchPairs and computing their weights. At step 720, GPU threads retrieve their block indices and thread indices, which are generated by the CUDA runtime, to compute their corresponding global thread indices. At step 722, they use the global thread indices to access the array elements or array chunks consisting of the PreMatchPairs, which in this case are pairs of (n+2) combinations. They are stored in the global memory received from the host. It doesn't show the step of receiving the PreMatchPairs from the host since it is implicitly handled by the CUDA runtime.

At step 712, they run the steps in subprocess 296 shown in FIG. 10c to generate MatchPairs, where multiple instances of subprocess 296 can run concurrently on multiple cores in the coprocessor. (As an alternative, step 222 of subprocess 296 can run in the host code, and the PreMatchPairs are the one-to-one mappings). At step 406, a local distance measure is computed for each MatchPair, and the local distance measure is converted to a weight. This step is also similar to that in FIG. 10c, except that multiple instances can run concurrently. Alternatively according to another embodiment, the local distance measures are converted to weights in the host code.

In this embodiment, when they are computed the one-to-one mappings of the MatchPairs and the weights are stored together in the coprocessor's global memory in two adjacent arrays, and there is a third array adjacent to the first two arrays that stores the flags indicating whether the corresponding elements of the first two arrays are valid, thus it doesn't require a separate step of extracting the one-to-one mappings and weights and storing them together. Alternatively such a step may be required.

Although the example is given for adapting the combination of the processes shown in FIGS. 10c and 14 to run on a computing device including a coprocessor, and some of the alternatives are discussed, it's not hard to adapt it to other combinations. They more or less follow the same pattern: Generating one or more batches of PreMatchPairs in the host code; sending the batches to the coprocessor; launching kernels to generate MatchPairs and compute weights; and copying MatchPairs to the host. For example, one embodiment combines the processes shown in FIGS. 10d and 14 and implement it on computing device including a coprocessor. First the host runs steps 230, 232, 234 in FIG. 10d to generate one or more batches of PreMatchPairs each of which consists of a candidate mapping between pairs of (n+2) combinations. It then use CUDA streams to send the batches to the coprocessor in arrays, launch kernels to process the batches, and receive MatchPairs from the coprocessor. In the device code, GPU threads compute global thread indices, and use them to access the array elements or array chunks. They then run the steps in subprocess 298 shown in FIG. 10c to either generate a MatchPair and use step 406 in FIG. 14 to compute its weight, or update a flag indicating non-suitability at step 238 of process 298. Multiple instances of such GPU threads can run concurrently. As one skilled in the art knows, the parallel reduction pattern can be used to compute the sum, the maximum, or the sum of the exponentials of local distance measures for computing the weights according to various embodiments. The weights and the flags are stored together in the coprocessor's global memory in two adjacent arrays, where for each weight and flag that are computed by the same GPU thread, their offsets in the array are consistent (i.e. one offset can be derived from the other) with the offset of the corresponding PreMatchPair. The rest of the steps are similar to the above process.

A coprocessor can also be used for other components. For example, one embodiment may further use the coprocessor to compute the compatibilities between the MatchPairs. Let n denote the number of generated MatchPairs, then a total number of n(n−1)/2 compatibilities need to be computed. The work load is divided among a number of GPU threads so that each GPU thread handles a chunk of the compatibilities. Furthermore, these kernels may be launched within the device using device-side enqueuing for OpenCL or dynamic parallelism for CUDA on supported devices and runtimes.

Alternatively, an embodiment uses multiple CPU threads. Since the number of CPU threads is usually much smaller than the number of GPU threads in a typical coprocessor, each CPU thread is required to handle a larger chunk of PreMatchPairs than a GPU thread. Different programming languages may provide different mechanisms to manage CPU threads. For C++, examples include Pthreads and OpenMP. When using Pthreads, a user is required to manage CPU threads manually using APIs. In comparison, OpenMP provides special compiler instructions such as the "parallel for" directive that instructs the compiler to generate multi-thread code under the hood.

One skilled in the art will appreciate that, for this and other processes, steps may be implemented in different orders. For example, in the process shown in FIG. 13, steps 300 and 302 are exchangeable, and one can exchange steps 308, 310 with steps 312, 314 respectively. Furthermore, some steps may be optional, combined into fewer steps, or expanded into additional steps. Further, the outlined components are provided as examples. That is, units may be combined, sub-units may be organized in different ways, or parent units may be expanded to include additional units without distracting from the essence of the disclosed embodiments. For example, an embodiment may separate the component that generates PreMatchPairs from MGU 130 into a separate unit. For generating one or more MatchPairs, embodiments may recombine and/or reorder various steps shown in the processes in FIGS. 10a-10d or their alternatives. For example, in another embodiment in 2D, it recombines some steps in the process shown in FIG. 10a with some of those in the process in FIG. 10b. First it generates a first set of pairs of neighbor (n+1) combination from one point set using the internal edges of a Delaunay triangulation of the point set, and generates a second set of pairs of neighbor (n+1) combinations from the other point set generated by selecting all (n+2) combinations from the second point set and then computing common edges using steps 212 and 214 in FIG. 10b. Next it generates suitable mappings between members of the two sets similar to step 204 and continues with steps 206 and 205 in FIG. 10a.

I claim:

1. A system for associating spatial points between spatial point sets in nD, n=2 or 3, the system comprising:
   (a) a programmable general purpose processor;
   (b) a GPU coupled to the programmable general purpose processor;
   (b) a memory coupled with the programmable general purpose processor and the GPU, the memory embodying information indicative of instructions that cause the programmable general purpose processor and the GPU to perform operations comprising:
   receiving, in the memory a first and a second spatial point sets in nD, and a plurality of candidate correspondences between the first and the second spatial point sets indexed by a plurality of candidate correspondence indices, wherein each member of the spatial point sets comprises n coordinates, and each of the plurality of candidate correspondences comprising a first reference to one member of the first spatial point set and a second reference to one member of the second spatial point set;
   generating in the memory a plurality of MatchPairs between the first and the second spatial point sets based on the plurality of candidate correspondences and the plurality of candidate correspondence indices, wherein each of the plurality of MatchPairs comprises n+2 of the plurality of candidate correspondence indices indexing n+2 corresponding candidate correspondences in the plurality of candidate correspondences, the net corresponding candidate correspondences being between n+2 members of the first spatial point set and n+2 members of the second spatial point set, and a pair of neighbor n+1 combinations whose vertices are the n+2 members of the first spatial point set, the n+2 corresponding candidate correspondences mapping the two n+1 combinations of the first pair of neighbor n+1 combinations to the n+2 members of the second spatial point set while maintaining their sidedness, meaning that for each n+1 combination of the first pair of neighbor n+1 combinations, its any one member is to the same side of the oriented hyperplane determined by the remaining members of the n+1 combination of the first pair of neighbor n+1 combinations as the any one member's correspondent according to the n+2 corresponding candidate correspondences is to the oriented hyperplane induced by the remaining members of the n+1 combination of the first pair of neighbor n+1 combinations according to the n+2 corresponding candidate correspondences;
   computing in the memory a plurality of local distance measures based on the first and the second spatial point sets and the plurality of MatchPairs, wherein each of the plurality of MatchPairs is associated with a corresponding local distance measure in the plurality of local distance measures;
   converting the plurality of local distance measures to a plurality of weights based on the plurality of local distance measures, wherein each of the plurality of MatchPairs is associated with a corresponding weight in the plurality of weights;
   computing in the memory a plurality of unit conflict lists based on the plurality of candidate correspondences, wherein each of the plurality of candidate correspondences has a corresponding unit conflict list in the plurality of unit conflict lists, each of the plurality of MatchPairs is associated with n+2 of the plurality of unit conflict lists that are the n+2 corresponding unit conflicts of the n+2 candidate correspondences indexed by the MatchPairs n+2 candidate correspondence indices, and for each of the plurality of candidate correspondences, its corresponding unit conflict list in the plurality of unit conflict lists comprises a bit field, a bit of the bit field being set to 1 if and only if the candidate correspondence shares an end point in the first spatial point set with the candidate correspondence whose candidate correspondence index in the plurality of candidate correspondence indices is the same as the index of the bit in the bit field;

computing in the memory a plurality of conflict lists based on the plurality of MatchPairs and the plurality of unit conflict lists, wherein each of the plurality of Match-Pairs is associated with a corresponding conflict list in the plurality of conflict lists, and for each of the plurality of MatchPairs, its corresponding conflict list in the plurality of conflict lists comprises a bit field that is computed by taking the bitwise ORs of the n+2 unit conflict lists associated with the MatchPair in the plurality of unit conflict lists;

computing in the memory a plurality of correspondence lists based on the plurality of MatchPairs, wherein each of the plurality of MatchPairs has a corresponding correspondence list in the plurality of correspondence lists, and for each of the plurality of MatchPairs, its corresponding correspondence list in the plurality of correspondence lists comprises a bit field, in which only the n+2 bits indexed by the n+2 candidate correspondence indices contained in the MatchPair in the bit field are set to 1;

computing in the memory a plurality of compatible subsets of two members of the plurality of MatchPairs based on the plurality of correspondence lists and the plurality of conflict lists comprising the sub-steps of generating all the subsets of two members of the plurality of MatchPairs, and for each of the all the subsets of two members of the plurality of MatchPairs, taking the bitwise AND of the correspondence list associated with one of the two members and the conflict list associated with the other of the two members to generate a resultant bit field, and comparing the resultant bit field with 0s to determine whether the subset of two members of the plurality of MatchPairs belongs to the plurality of compatible subsets of two members of the plurality of MatchPairs;

constructing in the memory a vertex-weighted undirected graph having a plurality of weighted vertices and a plurality of edges each of which connecting two of the plurality of weighted vertices based on the plurality of MatchPairs, the plurality of compatible subsets of two members of the plurality of MatchPairs, and the plurality of weights, wherein each of the plurality of weighted vertices is associated with a corresponding MatchPair in the plurality of MatchPairs and vice versa, the weighted vertex being assigned the March-Pair's corresponding weight in the plurality of weights, and each of the plurality of edges is associated with a corresponding member of the plurality of compatible subsets of two members of the plurality of MatchPairs, the edge being between the two weighted vertices associated with the two members of the edge's corresponding compatible subset of two members of the plurality of MatchPairs;

computing in the memory a maximum-weight clique of the vertex-weighted undirected graph using a maximum-weight clique solver; and collecting the candidate correspondences whose indices are contained in the maximum-weight clique's weighted vertices' corresponding MatchPairs to generate in the memory an optimal one-to-one mapping between the first and the second spatial point sets.

2. The system in claim 1, wherein the generating in the memory the plurality of MatchPairs between the first and the second spatial point sets based on the plurality of candidate correspondences and the plurality of candidate correspondence indices comprises generating a first plurality of n+2 combinations in the first spatial point set; for each member of the first plurality of n+2 combinations collecting n+2 subsets of the plurality of candidate correspondence indices such that all the candidate correspondences indexed by all the members of each of the n+2 subsets of candidate correspondence indices have a common end point in the member of the first plurality of n+2 combinations, and computing the Cartesian products of the n+2 subsets of the plurality of candidate correspondence indices to generate a plurality of candidate mappings each comprising n+2 candidate correspondence indices each of which being in a different subset of the n+2 subsets of the plurality of candidate correspondence indices; and generating one or more of the plurality of MatchPairs based on the plurality of candidate mappings, the first spatial point set, and the second spatial point set.

3. The system in claim 1, wherein the maximum-weight clique solver comprises an exact solver.

4. The system in claim 3, wherein the exact solver implements a branch-and-bound algorithm.

5. The system in claim 1, wherein the maximum-weight clique solver comprises a trust-region based solver.

6. The system in claim 1, wherein the computing in the memory the plurality of local distance measures based on the first and the second spatial point sets and the plurality of MatchPairs comprises for each of the plurality of Match-Pairs computing two left sub-matrices based on the Match-Pair, the first spatial point set, and the second spatial point set, and computing the MatchPair's corresponding local distance measure based on the two left sub-matrices.

7. The system in claim 6, wherein the computing one of the plurality of local distance measures based on the two left sub-matrices comprises computing the Frobenius norm of the differences of the corresponding components of the two left sub-matrices.

8. A method of associating spatial points between spatial point sets in nD, n=2 or 3, the system comprising:
  (a) providing a computing device comprising a programmable general purpose processor and a GPU coupled with the programmable general purpose processor;
  (b) receiving, by the computing device, a first and a second spatial point sets in nD, and a plurality of candidate correspondences between the first and the second spatial point sets indexed by a plurality of candidate correspondence indices, wherein each member of the spatial point sets comprises n coordinates, and each of the plurality of candidate correspondences comprising a first references to one member of the first spatial point set and a second reference to one member of the second spatial point set;
  (c) generating, by the computing device, a plurality of MatchPairs between the first and the second spatial point sets based on the plurality of candidate correspondences and the plurality of candidate correspondence indices, wherein each of the plurality of Match-Pairs comprises n+2 of the plurality of candidate correspondence indices indexing n+2 corresponding candidate correspondences in the plurality of candidate correspondences, the n+2 corresponding candidate correspondences being between n+2 members of the first spatial point set and n+2 members of the second spatial point set, and a pair of neighbor n+1 combinations whose vertices are the n+2 members of the first spatial point set, the n+2 corresponding candidate correspondences mapping the two n+1 combinations of the first pair of neighbor n+1 combinations to the n+2 members of the second spatial point set while maintaining their sideness, meaning that for each n+1 combination of the first pair of neighbor n+1 combinations, its any one member is to the same side of the oriented hyperplane determined by the remaining members of the n+1 combination of the first pair of neighbor n+1 combinations as the any one member's correspondent according to the n+2 corresponding candidate correspondences is to the oriented hyperplane induced by the remaining members of the n+1 combination of the first pair of neighbor n+1 combinations according to the n+2 corresponding candidate correspondences;

(d) computing, by the computing device, a plurality of local distance measures based on the first and the second spatial point sets and the plurality of MatchPairs, wherein each of the plurality of MatchPairs is associated with a corresponding local distance measure in the plurality of local distance measures;

(e) converting, by the computing device, the plurality of local distance measures to a plurality of weights based on the plurality of local distance measures, wherein each of the plurality of MatchPairs is associated with a corresponding weight in the plurality of weights;

(f) computing, by the computing device, a plurality of unit conflict lists based on the plurality of candidate correspondences, wherein each of the plurality of candidate correspondences has a corresponding unit conflict list in the plurality of unit conflict lists, each of the plurality of MatchPairs is associated with n+2 of the plurality of unit conflict lists that are the n+2 corresponding unit conflicts of the n+2 candidate correspondences indexed by the MatchPairs n+2 candidate correspondence indices, and for each of the plurality of candidate correspondences, its corresponding unit conflict list in the plurality of unit conflict lists comprises a bit field, a bit of the bit field being set to 1 if and only if the candidate correspondence shares an end point in the first spatial point set with the candidate correspondence whose candidate correspondence index in the plurality of candidate correspondence indices is the same as the index of the bit in the bit field;

(g) computing, by the computing device, a plurality of conflict lists based on the plurality of MatchPairs and the plurality of unit conflict lists, wherein each of the plurality of MatchPairs is associated with a corresponding conflict list in the plurality of conflict lists, and for each of the plurality of MatchPairs, its corresponding, conflict list in the plurality of conflict lists comprises a bit field that is computed by taking the bitwise ORs of the n+2 unit conflict lists associated with the MatchPair in the plurality of unit conflict lists;

(h) computing, by the computing device, a plurality of correspondence lists based on the plurality of MatchPairs, wherein each of the plurality of MatchPairs has a corresponding correspondence list in the plurality of correspondence lists, and for each of the plurality of MatchPairs, its corresponding correspondence list in the plurality of correspondence lists comprises a bit field, in which only the n+2 bits indexed by the n+2 candidate correspondence indices contained in the MatchPair in the bit field are set to 1;

(i) computing, by the computing device, a plurality of compatible subsets of two members of the plurality of MatchPairs based on the plurality of correspondence lists and the plurality of conflict lists comprising the sub-steps of generating all the subsets of two members of the plurality of MatchPairs, and for each of the all the subsets of two members of the plurality of MatchPairs, taking the bitwise AND of the correspondence list associated with one of the two members and the conflict list associated with the other of the two members to generate a resultant bit field, and comparing the resultant bit field with Os to determine whether the subset of two members of the plurality of MatchPairs belongs to the plurality of compatible subsets of two members of the plurality of MatchPairs;

(j) constructing, by the computing device, a vertex-weighted undirected graph having a plurality of weighted vertices and a plurality of edges each of which connecting two of the plurality of weighted vertices based on the plurality of MatchPairs, the plurality of compatible subsets of two members of the plurality of MatchPairs, and the plurality of weights, wherein each of the plurality of weighted vertices is associated with a corresponding MatchPair in the plurality of MatchPairs and vice versa, the weighted vertex being, assigned the MarchPair's corresponding weight in the plurality of weights, and each of the plurality of edges is associated with a corresponding member of the plurality of compatible subsets of two members of the plurality of MatchPairs, the edge being between the two weighted vertices associated with the two members of the edge's corresponding compatible subset of two members of the plurality of MatchPairs;

(k) computing, by the computing device, a maximum-weight clique of the vertex-weighted undirected graph using a maximum-weight clique solver; and (l) collecting, by the computing device, the candidate correspondences whose indices are contained in the maximum-weight clique's weighted vertices' corresponding MatchPairs to generate an optimal one-to-one mapping between the first and the second spatial point sets.

9. The method in claim 8, wherein the generating by the computing device the plurality of MatchPairs between the first and the second spatial point sets based on the plurality of candidate correspondences and the plurality of candidate correspondence indices comprises using the computing device to generate a first plurality of n+2 combinations in the first spatial point set; for each member of the first plurality of n+2 combinations using the computing device to collect n+2 subsets of the plurality of candidate correspondence indices such that all the candidate correspondences indexed by all the members of each of the n+2 subsets of candidate correspondence indices have a common end point in the member of the first plurality of n+2 combinations, and using the computing device to compute the Cartesian products of the n+2 subsets of the plurality of candidate correspondence indices to generate a plurality of candidate mappings each comprising n+2 candidate correspondence indices each of which being in a different subset of the n+2 subsets of the plurality of candidate correspondence indices; and using the computing device to generate one or more of the plurality of MatchPairs based on the plurality of candidate mappings, the first spatial point set, and the second spatial point set.

10. The method in claim 8, wherein the maximum-weight clique solver comprises an exact solver.

11. The method in claim 10, wherein the exact solver implements a branch-and-bound algorithm.

12. The method in claim 8, wherein the maximum-weight clique solver comprises a trust-region based solver.

13. The method in claim 8, wherein the computing using the computing device the plurality of local distance measures based on the first and the second spatial point sets and the plurality of MatchPairs comprises for each of the plurality of MatchPairs using the computing device to compute two left sub-matrices based on the MatchPair, the first spatial point set, and the second spatial point set, and using the computing device to compute the MatchPairs corresponding local distance measure based on the two left sub-matrices.

14. The method in claim 13, wherein the using the computing device to compute one of the plurality of local distance measures based on the two left sub-matrices comprises using the computing device to compute the Frobenius norm of the differences of the corresponding components of the two left sub-matrices.

* * * * *